(12) United States Patent
Weigert

(10) Patent No.: US 10,664,243 B2
(45) Date of Patent: *May 26, 2020

(54) SYSTEM AND METHOD FOR ITERATIVE GENERATING AND TESTING OF APPLICATION CODE

(71) Applicant: UniqueSoft, LLC, Palatine, IL (US)

(72) Inventor: Thomas J. Weigert, Lake Barrington, IL (US)

(73) Assignee: UniqueSoft, LLC, Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,125

(22) Filed: Sep. 20, 2017

(65) Prior Publication Data

US 2018/0024815 A1 Jan. 25, 2018

Related U.S. Application Data

(63) Continuation of application No. 13/222,995, filed on Aug. 31, 2011, now Pat. No. 9,778,916, which is a (Continued)

(51) Int. Cl.
*G06F 8/30* (2018.01)
*G06F 8/10* (2018.01)
(Continued)

(52) U.S. Cl.
CPC .............. *G06F 8/30* (2013.01); *G06F 8/10* (2013.01); *G06F 8/311* (2013.01); *G06F 8/355* (2013.01); *G06F 11/3684* (2013.01)

(58) Field of Classification Search
CPC ... G06F 8/30; G06F 8/10; G06F 8/355; G06F 11/3684; G06F 8/311
See application file for complete search history.

(56) References Cited

U.S. PATENT DOCUMENTS 6,212,672 B1 4/2001 Keller et al.
7,886,273 B2 2/2011 Hinchey et al.
(Continued)

OTHER PUBLICATIONS

A. Letichevsky. et al.; "Basic Protocols. Message Sequence Charts, and the Verification of Requirements Specifications;" Jun. 2, 2005; pp. 1-16.

*Primary Examiner* — Jacob D Dascomb
(74) *Attorney, Agent, or Firm* — Garlick & Markison; Timothy W. Markison

(57) ABSTRACT

A method begins by generating application system state transitions from inputted requirements and parameters. For a current implementation of generating application code, the method continues by entering a loop. The loop begins by generating a current intermediate result based on a previous implementation and in accordance with current application code development factors. The loop continues by generating at least one test case based on the one or more of the application system state transitions. The loop continues by testing the current intermediate result in accordance with the at least one test case. When the testing is unfavorable, the loop continues by modifying one or more of: the one or more of the plurality of application system state transitions, the one or more of the parameters, and the one or more implementation tools. The loop then continues by repeating the loop using the modified current application code development factors.

20 Claims, 43 Drawing Sheets

Related U.S. Application Data continuation of application No. 13/221,595, filed on Aug. 30, 2011, now Pat. No. 8,972,928.

(51) Int. Cl.
  *G06F 8/35* (2018.01)
  *G06F 11/36* (2006.01)

(56) References Cited

U.S. PATENT DOCUMENTS

| | | |
|---|---|---|
| 8,099,712 B2 | 1/2012 | Kodosky et al. |
| 8,146,007 B2 | 3/2012 | Ramamoorthy et al. |
| 8,156,474 B2 | 4/2012 | Teplitsky et al. |
| 8,291,374 B2 | 10/2012 | Cullum et al. |
| 2002/0199168 A1 | 12/2002 | Namito |
| 2006/0265691 A1 | 11/2006 | Klinger et al. |
| 2007/0038977 A1 | 2/2007 | Savage |
| 2008/0178154 A1* | 7/2008 | Basler .................. G06F 8/20 717/124 |
| 2008/0263506 A1* | 10/2008 | Broadfoot .............. G06F 8/10 717/104 |
| 2010/0211932 A1 | 8/2010 | Jones et al. |
| 2011/0055813 A1 | 3/2011 | Calendino et al. |
| 2011/0099532 A1* | 4/2011 | Coldicott .............. G06F 8/10 717/105 |

\* cited by examiner

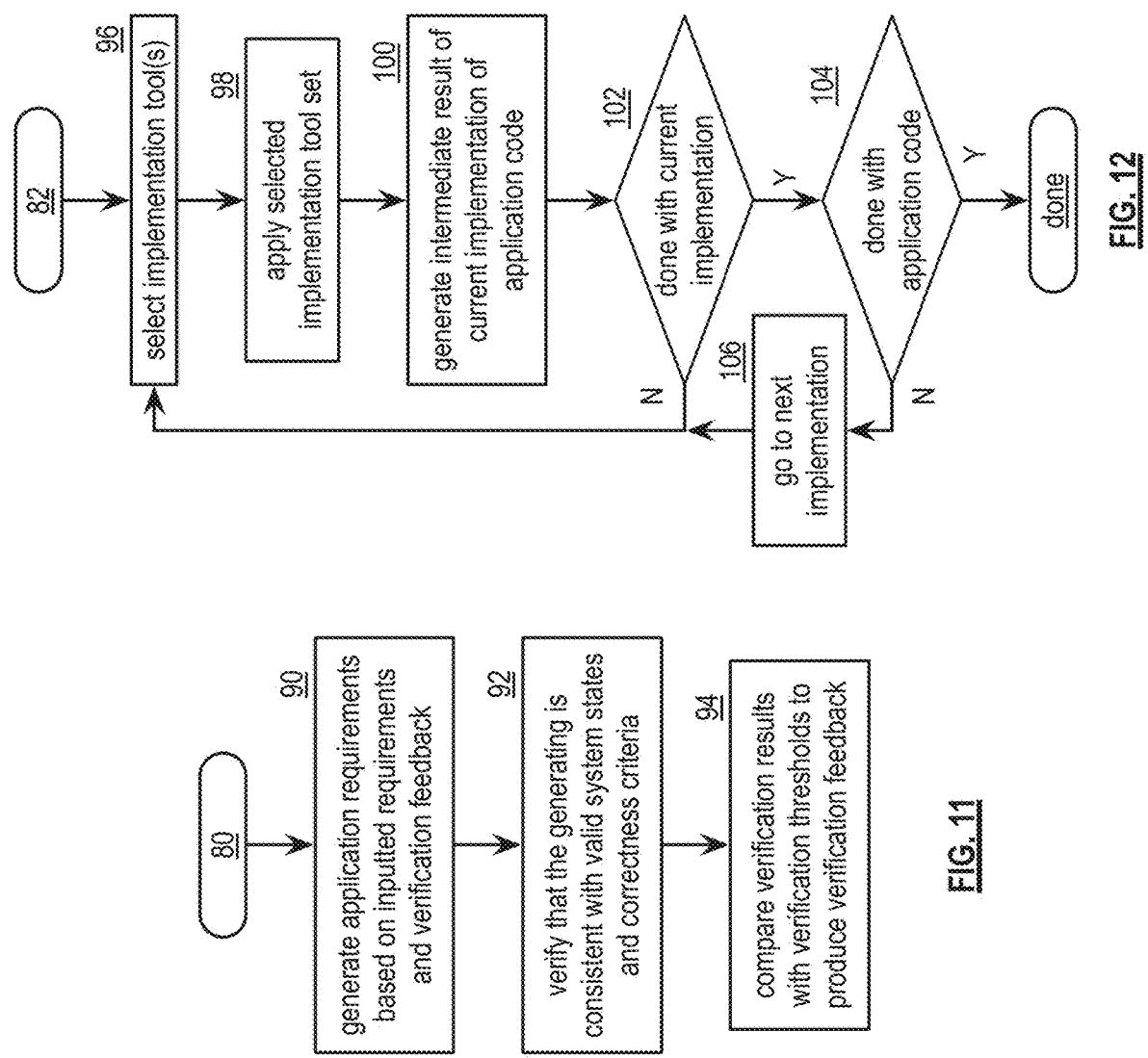

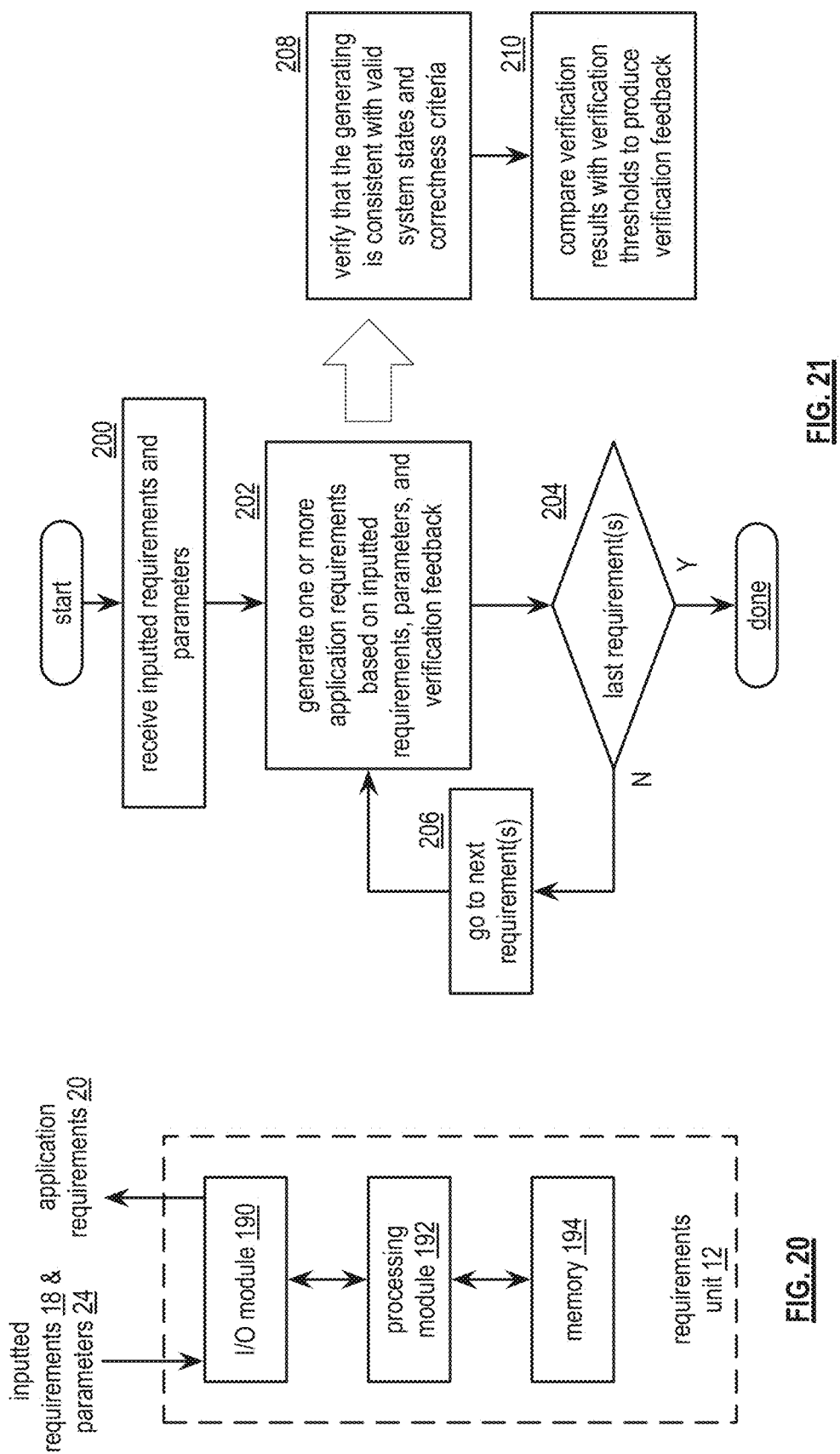

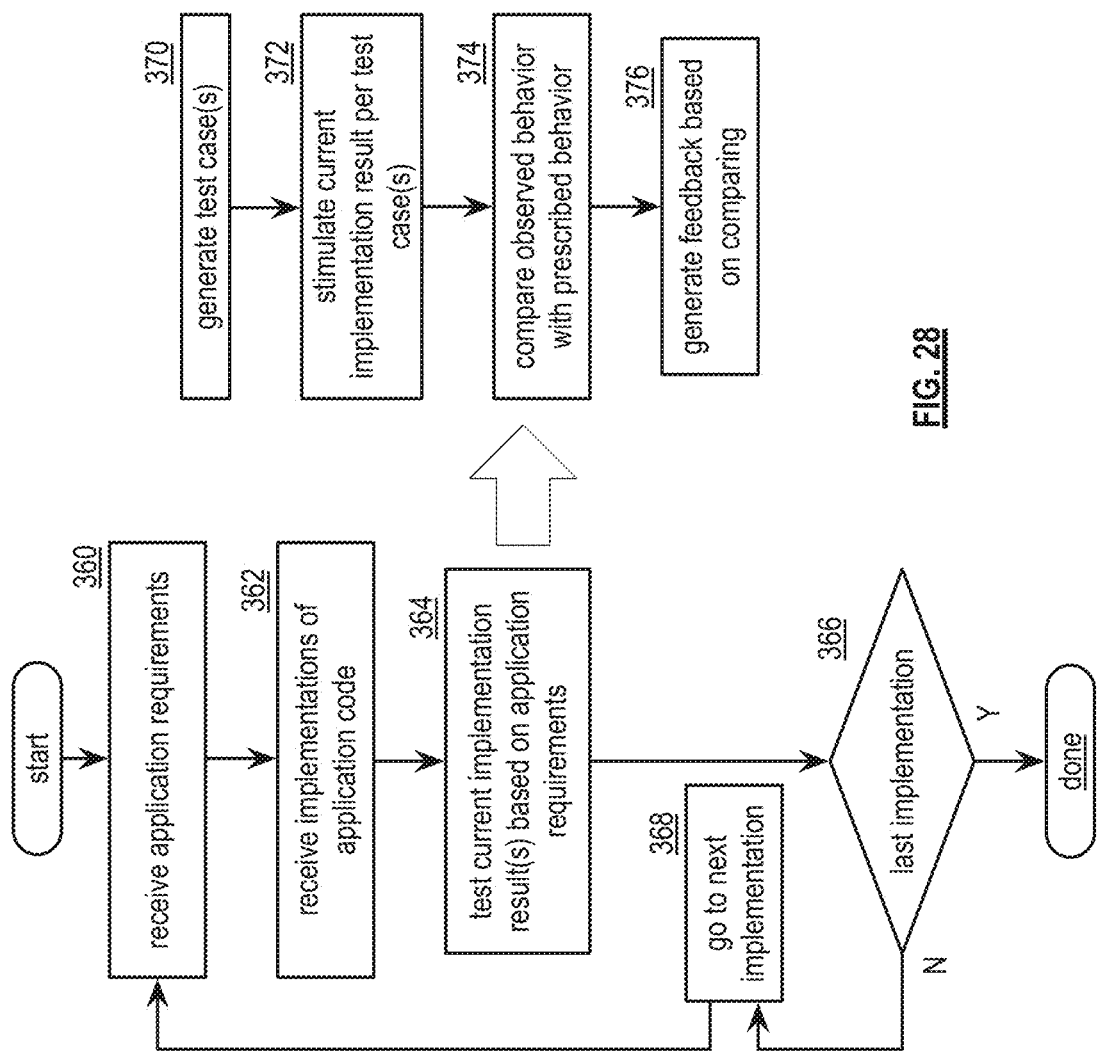

IF: Day = Monday, Tuesday, Wednesday, Thursday, or Friday:
THEN: IF: (4AM <= Time < 6AM) or (9AM <= Time < 3PM) or (6PM <= Time <11PM);
    THEN: N-S dominate, equal priority
    ELSE: IF: 6AM <= Time < 9AM;
        THEN: N to S priority;
        ELSE: IF: 3PM <= Time , 6PM;
            THEN: S to N priority;
            ELSE: N-S yellow flash & E-W red flash ELSE: IF: 6AM <= Time < 11PM;
    THEN: N-S dominate, equal priority
    ELSE: N-S yellow flash & E-W red flash state space for an intersection

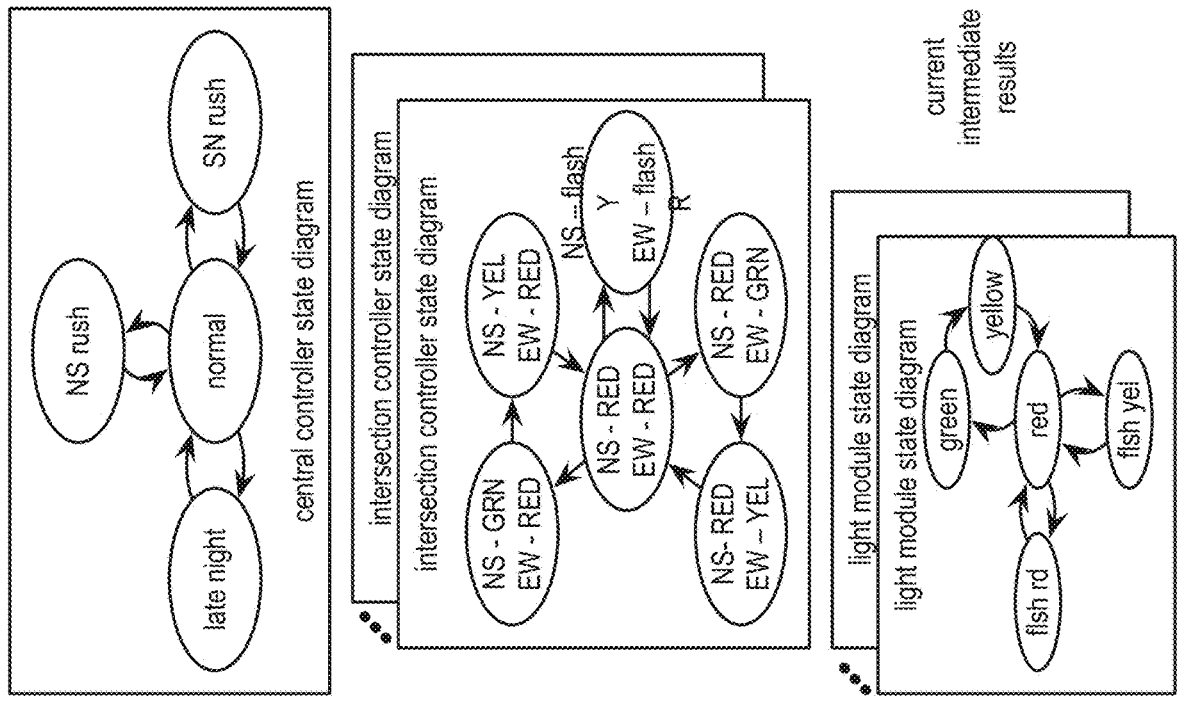
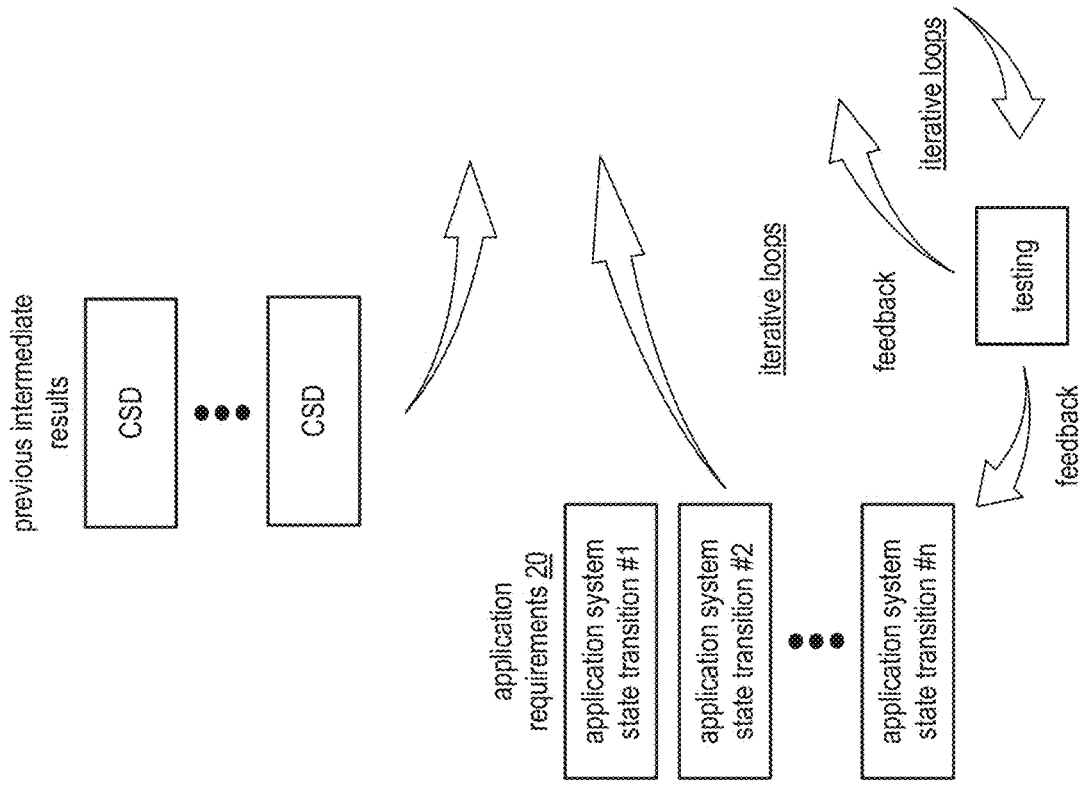
FIG. 59

SYSTEM AND METHOD FOR ITERATIVE GENERATING AND TESTING OF APPLICATION CODE

CROSS REFERENCE TO RELATED PATENTS

The present U.S. Utility patent application claims priority pursuant to 35 U.S.C. § 120 as a continuation of U.S. Utility application Ser. No. 13/222,995, entitled "SYSTEM AND METHOD FOR ITERATIVE GENERATING AND TESTING OF APPLICATION CODE", filed Aug. 31, 2011, which is a continuation of U.S. Utility application Ser. No. 13/221,595, entitled "SYSTEM AND METHOD GENERATING APPLICATION CODE," filed Aug. 30, 2011, now U.S. Pat. No. 8,972,928, issued on Mar. 3, 2015, both of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to computing systems implementing software applications.

Description of Related Art

Many devices include a conventional computer architecture of a central processing unit, memory, a memory management unit, and a peripheral management unit. Such devices include computers, laptop computers, handheld computers, some cellular telephones, some video game devices, etc. A common theme for these devices is that they execute one or more algorithms to achieve a desired result and/or to perform a desired function. Other devices, while not having the conventional computer architecture, include a processing unit and memory to execute one or more algorithms. For example, some video game devices, some cellular telephones, some personal audio/video player, etc., include a processing unit and memory but not the conventional computer architecture.

Regardless of the specific architecture of devices that execute algorithms, they all include a hardware component and a software component. The software component generally includes three types of software: operating system (OS), application program interface (API), and applications. In general, an operation system has four primary functions: process management, memory management, file system management, and device management. Applications include user applications (e.g., word processing, calendar, spreadsheet, video game, etc.) and/or middle-ware applications (e.g., drivers, OS specific APIs, etc.).

The development of software for devices is an ever-increasing challenge since the devices are required to do more and to do it faster. Current software development techniques include a combination of manual steps and automated steps. In general, software development includes four primary steps: requirements, architecture, design, and code generation, each of which includes a combination of manual functions and automated functions. In addition, each primary step includes a form of testing.

An objective of the requirements step is to develop a list of requirements that identify the needs and/or conditions for the software development project to meet. The list of requirements may include functional requirements (e.g., what actions, tasks, and/or activities the system must do) and non-functional requirements (e.g., statements about the system such as performance levels, availability, reliability, etc.). A functional requirement contains a unique name, a description of the required behavior, and a rationale for the required behavior.

While there has been limit success in automating portions of the requirements steps (e.g., SPIN, PBS, Validator), it is still primarily a manual step. As such, modeling the requirements to test for incompleteness and/or inconsistencies is far from complete due the extremely large state space of the system and the lack of automated testing. Another issue with automating the generation of requirements is the inconsistency of language, descriptors, diagrams, etc. that are used to represent the requirements.

The architecture step of software development defines the structure of the system, which identifies software components and the relationship therebetween. Typically, the software architecture is organized in views that may include functional and/or logical views, code and/or module views, development and/or structural views, concurrency, process and/or thread views, physical and/or deployment views, user action and/or feedback views, data views, etc.

With respect to the architecture step, there have been several languages developed to describe software architectures (e.g., architecture description languages (ADL)). There are various implementations of the ADLs including AADL, Wright, Acme, xADL, Darwin, and DAQP-ADL. While such automation exists, they are still prone to manual errors and incompleteness of testing. In addition, they lack a standardized language, which makes utilization of the software architecture by the other primary steps of software development a manual function.

The design step of software development defines a low-level component design for the system. The design step may also address algorithm implementation issues of the system and architecture issues using one or more design concepts (e.g., abstraction, refinement, modularity, software architecture, control hierarchy, structural partitioning, data structure, software procedure, and/or information hiding). The resulting design may be platform specific or independent and it includes story-board(s), modeling language model(s), and/or flow chart(s).

With respect to the design step, there have been several modeling languages developed to produce the modeling language model. The modeling languages may be graphical or textual for various types of design step objectives. For example, BPMN (business processing modeling notation) is a process modeling language; EXPRESS is a general purpose data modeling language; EEML (extended enterprise modeling language) is a business process modeling language that applies across a number of layers; FMC (fundamental modeling concepts) is a modeling language for software intensive systems; DEF is a family of modeling languages; JSP (Jackson structure programming) is a method for structured programming of data stream structure and programming structure correlation; design description language for modeling large object orientated programs (e.g., Java, C++, etc); UML (unified modeling language) describes a software design structurally and behaviorally and includes graphical notation; and alloy describes a software design structurally and behaviorally and includes a concise language based on a first order relational logic.

The code generation step of software development includes writing source code in a programming language to perform the desired behaviors defined in the previous software development steps. The programming language may be of one or more programming language categories that includes: Array languages (e.g., Fortran 90), Aspect-oriented languages (e.g., Aspect C++), Assembly languages, authoring languages, command line interface languages, compiled languages (e.g., C++, JAVA, etc.), concurrent languages, curly-bracket languages, data flow languages, data-oriented languages, data structured languages, declarative languages, esoteric languages, extension languages, fourth generation languages, functional languages, interactive mode languages, interpreted languages, iterative languages, list based languages, little languages, logic based languages, machine languages, macro languages, meta-programming languages, multi-paradigm languages, numerical analysis, non-English based languages, object oriented class based languages, object oriented prototype based languages, off-side rule languages, procedural languages, reflective languages, rule based languages, scripting languages, stack based languages, synchronous languages, syntax handling languages, visual languages, Wirth languages, and XML based languages.

The code generation step of software development also includes requirements analysis and testing the source code. Requirements analysis of the source code may be done using Use Case analysis to verify that source code achieves the desired behavior and avoids dead locks. Testing of the source code generally includes value modeling, implementation, and debugging. Modeling of source code may be done using one of many modeling techniques (e.g., object-oriented analysis and design, model driven architecture, etc.).

While the above described software development process enables the creation of significant amounts of software annually, it is far from an optimal process and is far from fully automated or near-fully automated. Since each primary step (e.g., requirements, architecture, design, and code generation) includes multiple manual operations and, for the automated operations, has little to no standardized implementation requirements and/or formatting requirements, each primary step is almost a completely autonomous process. As such, automation of the software development process using the current techniques is highly improbable due to the autonomy of each primary step, the many manual operations, and/or other factors.

BRIEF DESCRIPTION OF THE SEVERAL VIEWS OF THE DRAWING(S)

FIG. 11 is a logic diagram of another embodiment of a method that may be executed by a system in accordance with the present invention;

FIG. 12 is a logic diagram of another embodiment of a method that may be executed by a system in accordance with the present invention;

FIG. 13 is a logic diagram of another embodiment of a method that may be executed by a system in accordance with the present invention;

FIG. 20 is a schematic block diagram of an embodiment of a requirements unit in accordance with the present invention;

FIG. 21 is a logic diagram of an embodiment of a method that may be executed by a requirements unit in accordance with the present invention;

FIG. 27 is a schematic block diagram of an embodiment of a testing unit in accordance with the present invention;

FIG. 28 is a logic diagram of an embodiment of a method that may be executed by a testing unit in accordance with the present invention;

FIGS. 40-61 are diagrams of an example of generation application code for a traffic light control system in accordance with the present invention.

DETAILED DESCRIPTION OF THE INVENTION

Figure 1:
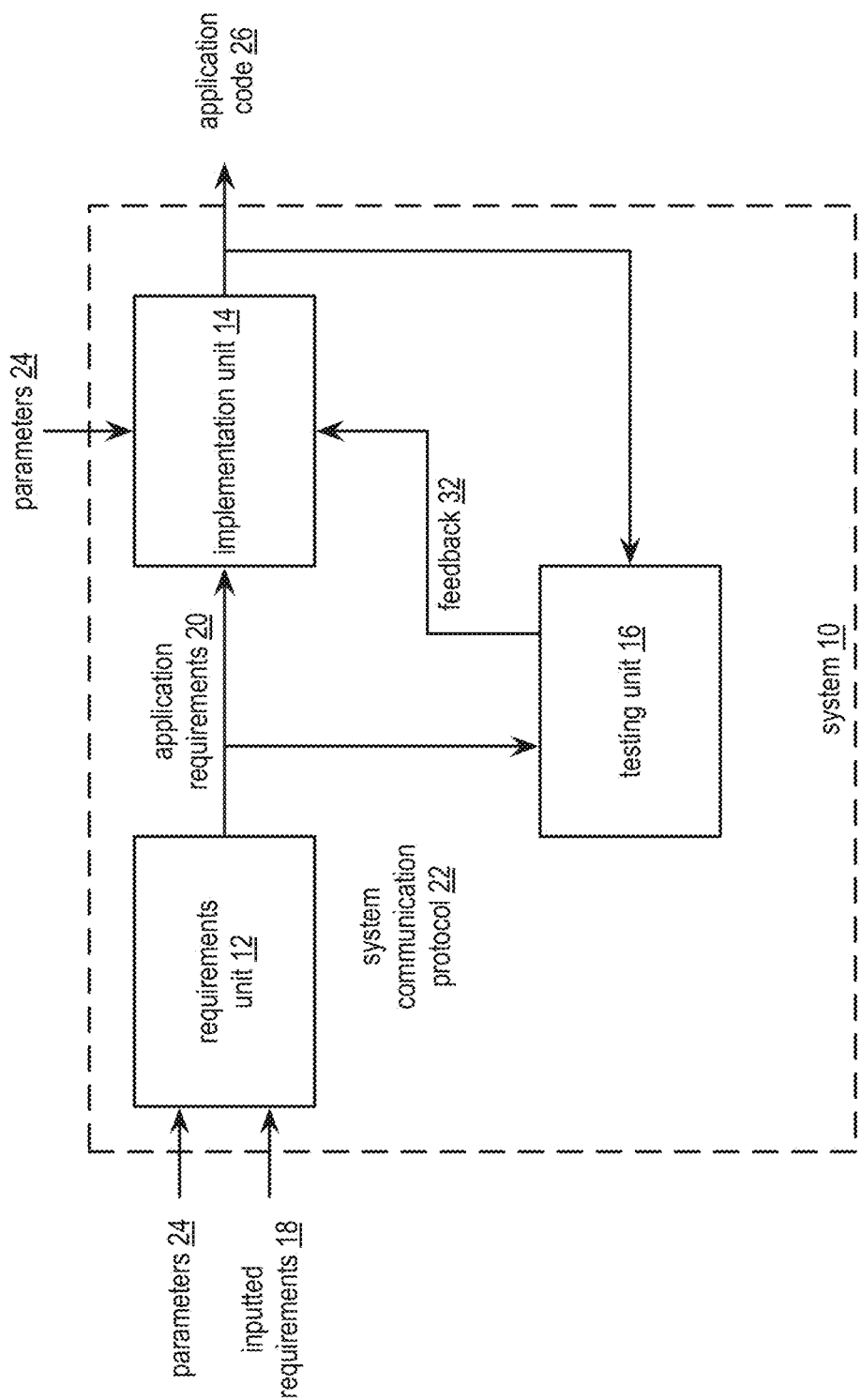
FIG. 1 is a schematic block diagram of an embodiment of a system in accordance with the present invention.

FIG. 1 is a schematic block diagram of an embodiment of a system 10 that includes a requirements unit 12, an implementation unit 14, and a testing unit 16. Each of the requirements unit 12, the implementation unit 14, and the testing unit 16 may be constructed from separate centralized computing entities, from separate distributed computing entities, from a shared computing entity, from a shared distributed computing entity, and/or a combination thereof. As used herein, a computing entity includes one or more processing modules, memory, local and/or wide area network connection capabilities, and other components as may be needed to perform the operations of the requirements unit 12, the implementation unit 14, and/or the testing unit 16.

A processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-61.

In an example of operation, the requirements unit 12 receives inputted requirements 18 and parameters 24. The parameters 24 prescribe physical, logical, and/or developmental constraints on implementing the application code 26. For example, the physical parameters may include physical limitations of the system (e.g., clock rates, processing rates, data transference rates, etc.) and logical parameters may include software limitations (e.g., desired programming language, desired operating system, desired API, etc.). The system may generate the parameters 24, they may be inputted to the system 10, and/or a separate unit may generate the parameters 24 based on the client inputted requirements.

The inputted requirements 18 provide information regarding the desired operations, desired functions, desired results, user input/output options, system constraints, and/or operational constraints (e.g., response times) of the resulting application code (i.e., software). For example, the inputted requirements may be formatted in one or more of if-then-else statements, state table(s), message sequence chart(s) (e.g., MSC), or another agreed up format.

If the inputted requirements 18 are not in the desired format, the requirements module 12 and/or an external processing unit may translate client inputted requirements (e.g., operational tables, system diagrams, timing diagrams, narrative descriptions, etc.) into the desired format. Alternatively, the translation of the client inputted requirements into the desired format might be a manual process. As yet another alternative, the translation of the client inputted requirements into the desired format might be a combination of a manual process and an automated process. For example, a narrative description of a requirement may be manually translated into a diagram, which is inputted into the system. The system then automatically converts the diagram into the desired format.

The requirements unit 12 generates application requirements 20 from the inputted requirements 18 and the parameters 24. The application requirements 20 include one or more application system state transition, which will be described below. The requirements unit 12 outputs the application requirements 20 in accordance with a system communication protocol 22.

The system communication protocol 22 includes a data content protocol and/or a communication protocol. The data content protocol defines data communication formatting for communications between the units 12, 14, and 16, and may further define the communication within the units 12, 14, and/or 16. For example, the system communication protocol 22 may dictate that the output format of one unit (e.g., the requirements unit) correlates to the input format of another unit (e.g., the implementation unit, the testing unit). This may be a direct correlation (i.e., the output of one unit is in the desired format for the input of the other input) or an indirect correlation (i.e., the unit receiving the output of another unit includes a translation module to translate the output into the desired format).

As another example, the data content protocol may prescribe specific formatting of the data (e.g., logic statements, MSCs, application system state transitions, state diagrams, programming language, etc.). As yet another example, the communication protocol may define the communication interfacing (e.g., Ethernet, fire-wire, WLAN protocol, WAN protocol, internet protocol, etc.) between the units 12-16.

In another example, the system communication protocol 22 may prescribe a common communication protocol (i.e., the communication and/or data content between the units is in the same format) or distributed communication protocol (e.g., the communication and/or data content between the requirements unit and the implementation unit uses a first protocol, the communication and/or data content between the requirements unit and the testing unit uses a second protocol, and the communication and/or data content between the implementation unit and the testing unit uses a third protocol). As such, the units use the prescribed system communication protocol(s) for communication therebetween.

In yet another example, the units 12-16 may negotiate the system communication protocol 22 to use. For example, the requirements unit 12 and the implementation unit 14 may negotiate a particular data content protocol (e.g., state tables and if-then-else statements) and a particular communications protocol (e.g., 100 Gbps Ethernet). In a still further example, the system communication protocol 22 may be at least partially based on the operating system(s) of the computing entities. For instance, if a first computing entity facilitates the requirements unit using a first operating system and a second computing entity facilitates the implementation unit using a second operating system, the data content protocol may need to be adjusts such that it is supported by both the first and second operating system. Such an adjustment may be done via a look up table, by negotiation, or some other means.

The requirements unit 12 outputs the application requirements 20 in accordance with a system communication protocol 22 to the implementation unit 14 and/or to the testing unit 16. After receiving the application requirements 20 and the parameters 24, the implementation unit 14 generates application code 26 based on the application requirements 20, the parameters 24, and feedback from the testing unit 16. The implementation unit 12 outputs the application code 20 in accordance with the system communication protocol 22.

The testing unit 16 receives the application requirements 20 and the application code 26 in accordance with the system communication protocol 22. The testing unit 16 may also receive the parameters 24. Based on one or more of these inputs, the testing unit 16 tests the application code 24 and provides feedback thereof to the requirements unit 12 and/or to the implementation unit 14.

As a more specific example of operation, the implementation unit 14 generates, in an iterative manner, application code 24 based on the application requirements 20, parameters 24, and feedback from the testing unit 16 using one or more implementation tools. The application requirements 20 include a plurality of application system state transitions (ASST), which will be described in greater detail below.

As the implementation unit 12 iteratively generates the application code from the application requirements 20, parameters 24, and testing unit feedback 32, it also selects one or more implementation tools. Note that the implementation unit 12 may select one or more new implementation tools for each iterative loop of generating the application code or use the same implementation tools from numerous iterations. Further note that the iterative process of developing the application code may go through several phases, which may be arbitrarily ordered. For example, the phases may include an architecture level design phase, a high level design (HLD) phase, a low level design (LLD) phase, and an application code level phase.

To test the developing application code 26, the testing unit 16 generates test cases (e.g., input stimuli and expected results corresponding to the current level of development of the application code at a level of abstraction corresponding to the level of development of the application code). The testing unit 16 uses the test cases to determine whether the developing application code 26 is functions as expected for this level of development. When it is, the testing unit generates feedback indicating that the developing application is functioning in accordance with the application requirements. When the application code 26 is not functioning as expected, the testing unit 16 generates feedback indicating that the developing application is not functioning in accordance with the application requirements.

When the implementation unit 14 receives feedback indicating that the developing application is not functioning in accordance with the application requirements, it reverts the iterative process to a previous step that received favorable testing unit feedback, selects one or more new implementation tools, and continues generating the developing application code. If the next attempt at generating the developing application code is successful, the implementation unit continues generating the application code until it has reached a desired level of completeness (e.g., it meets the application requirements and passes the testing performed by the testing unit).

If, however, the next attempt at generating the developing code is not successful, the implementation unit again reverts the iterative process to a previous step that received favorable testing unit feedback and remains in this reverting process until the generating the developing application code is successful or until exhaustion of implementation of options (which indicates that there is an application requirements error in light of the parameters). Note that the iterative process may require thousands, millions, or more steps to reach a favorable outcome.

Figure 2:
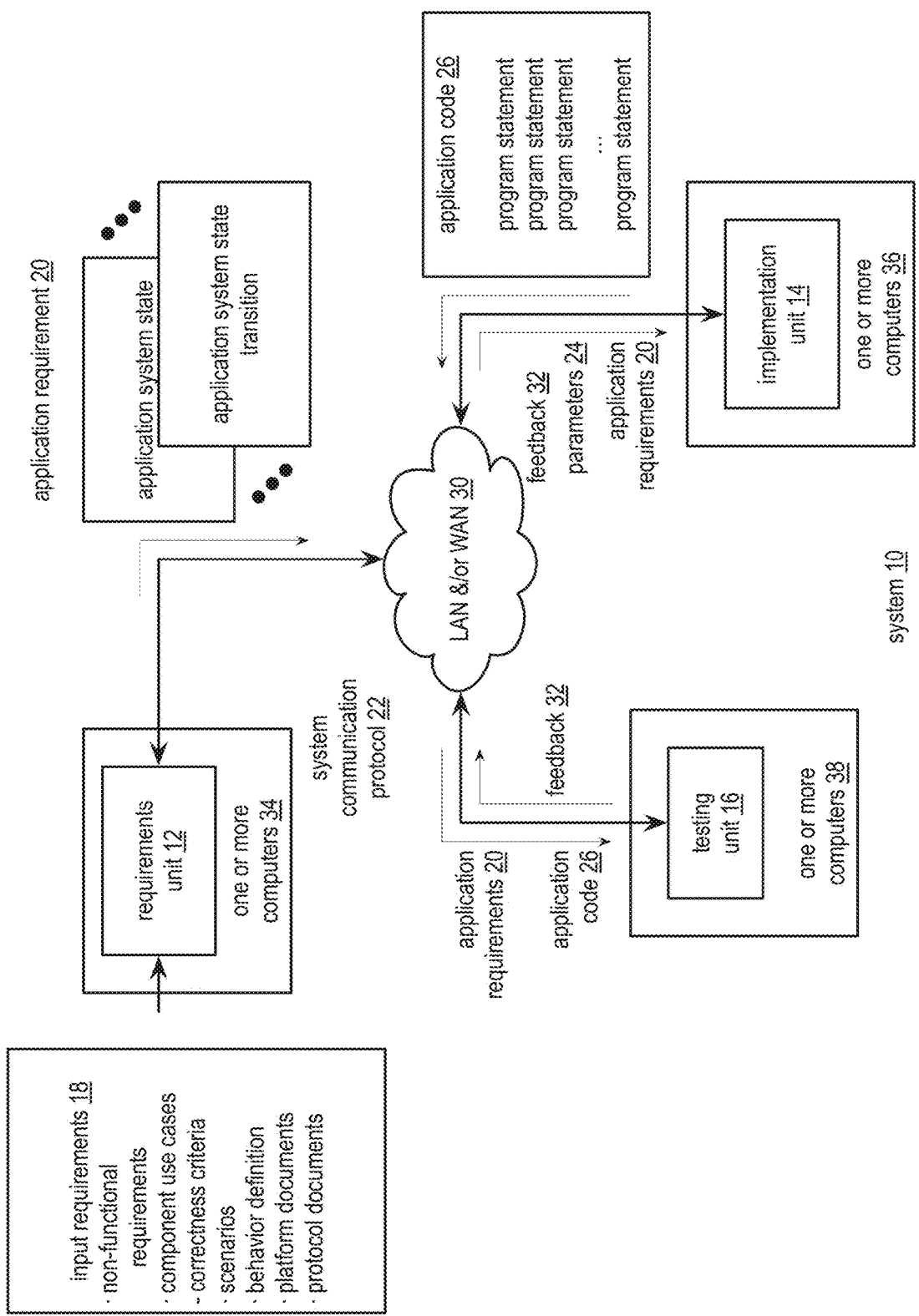
FIG. 2 is a schematic block diagram of another embodiment of a system in accordance with the present invention.

FIG. 2 is a schematic block diagram of another embodiment of a system 10 that includes the requirements unit 12, the implementation unit 14, and the testing unit 16. In this embodiment, one or more computers 34 facilitate the requirements unit 12; one or more computers 36 facilitate the implementation unit 14; and one or more computers 38 facilitate the testing unit 16. Each of the computers within the one or more computers 34, 36 & 38 includes one or more network interfaces for interfacing with a local area network (LAN) and/or a wide area network (WAN) (e.g., the internet).

As shown, the requirements unit 12 receives the inputted requirements 18, which includes non-function requirements, component use cases, correctness criteria, scenarios, behavior definitions, platform documentation, and/or protocol documentation. Non-function requirements generally include information regarding how to judge the operation of the resulting application code and not the specific behavior of the application code. Component use cases define interaction between a component of the desired application code and a user that is outside of the system to achieve a specific goal. The correctness criteria provides indications regarding avoidance of safety violations while generating the application requirements 20.

A scenario is typically a narrative description of an interaction(s) between one or more users (external to the system and/or within the system) and the system (i.e., the desired application code) during normal use of the system. A behavior definition is a high level definition of how the system is to met an objective, produce a desired result, process a given input, etc. The platform documentation describes one or more of the desired hardware architecture of the system, the software framework, operating system, programming language, graphical user interface, and runtime libraries.

The requirements unit 12 processes the inputted requirements 18 to produce application requirements 20. As shown, an application requirement 20 includes a plurality of application system state transitions, each of which identifies one or more pre-conditions, one or more actions, and one or more post-conditions. The requirements unit 12 outputs the application requirements 20 via the LAN and/or WAN in accordance with the system communication protocol 22.

The implementation unit 14 receives the application requirements 20 and the parameters 24 via the LAN and/or WAN 30 in accordance with the system communication protocol 22. The implementation unit 14 processing the application requirements 20 in light of the parameters and test feedback 32 to generate application code 26. During later stages of development, the application code 26 includes a plurality of programming statements.

The testing unit 16 receives the application requirements 20 and the application 26 via the LAN and/or WAN 30 in accordance with the system communication protocol 22. The testing unit 16 tests the application code 26 in accordance with the application requirements 16 (and the parameters 24) to produce the test feedback 32. The testing unit 16 outputs the test feedback 32 in accordance with the system communication protocol 22.

Figure 3:
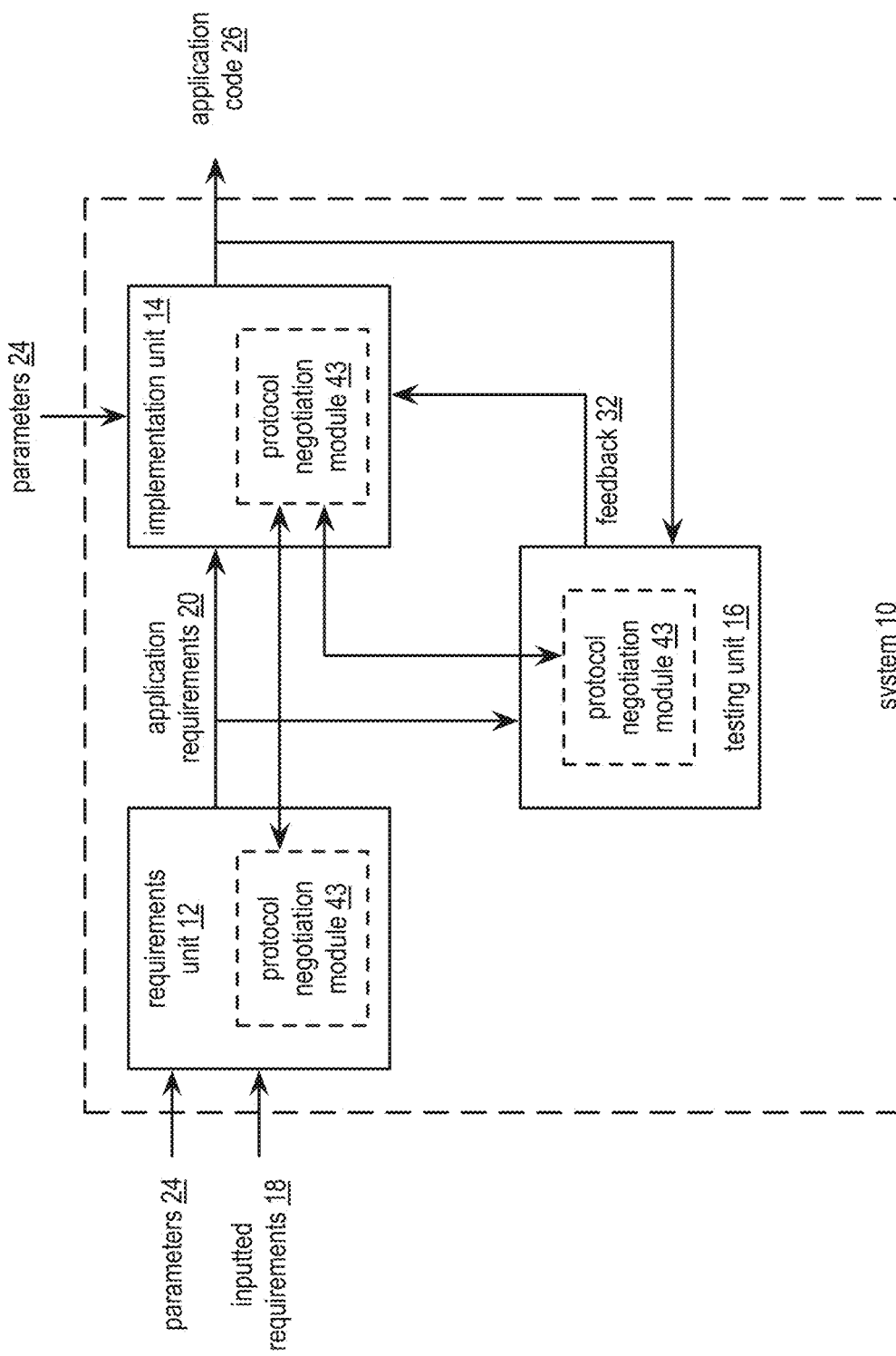
FIG. 3 is a schematic block diagram of another embodiment of a system in accordance with the present invention.
Figure 4:
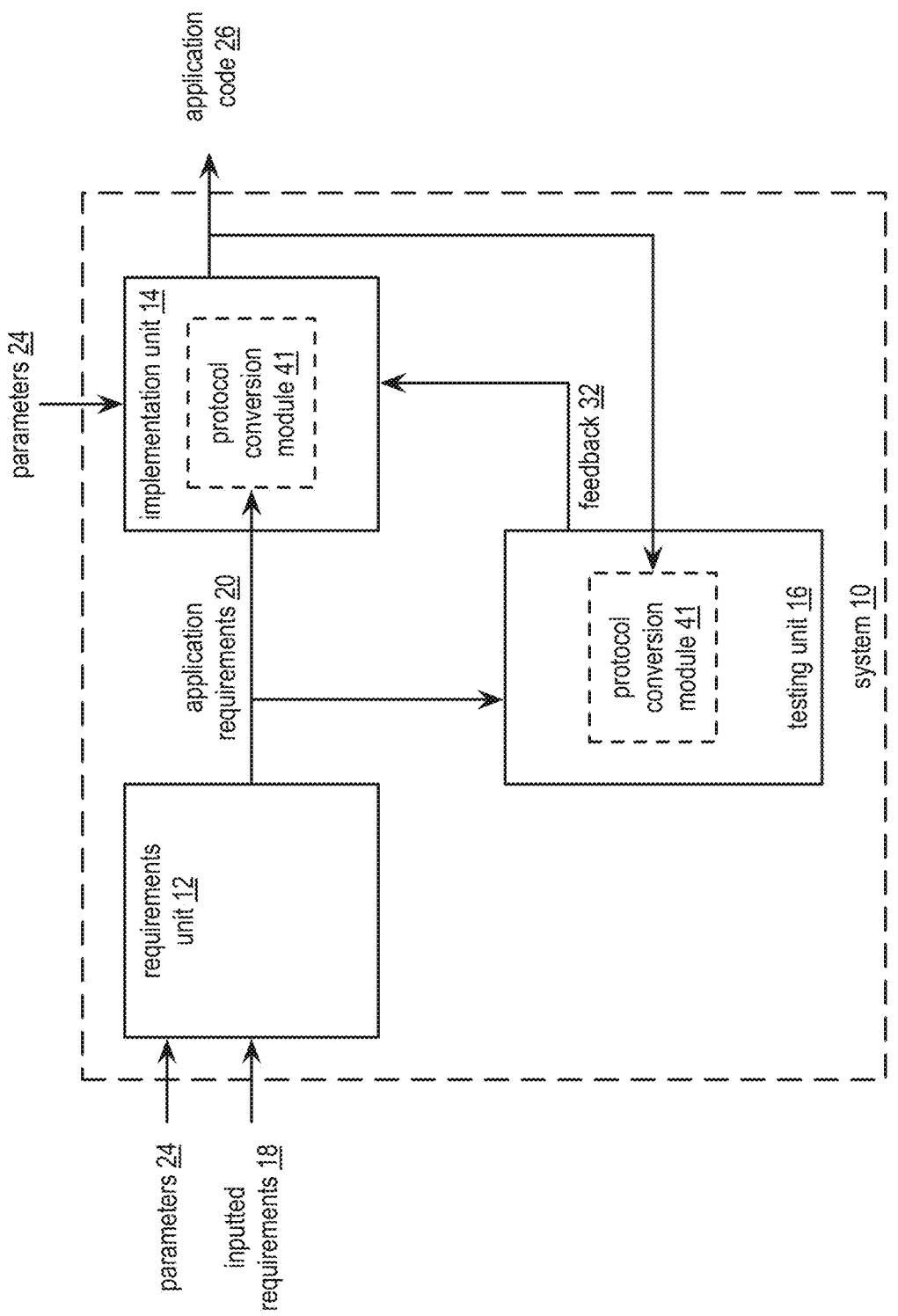
FIG. 4 is a schematic block diagram of another embodiment of a system in accordance with the present invention.

FIG. 3 is a schematic block diagram of another embodiment of a system 10 that includes the requirements unit 12, the implementation unit 14, and the testing unit 16. Each of the requirements unit 12, the implementation unit 14, and the testing unit 16 includes a protocol negotiating module 43. In this instance, each of the units 12-16 negotiates the data content protocol and/or the communication protocol it will use to communicate with the other units. FIG. 4 is a schematic block diagram of another embodiment of a system 10 that includes the requirements unit 12, the implementation unit 14, and the testing unit 16. Each of the implementation unit 14 and the testing unit 16 includes a protocol conversion module 41. The protocol conversion module 41 is operable to convert an input from one data content protocol to another data content protocol. For example, the protocol conversion module 41 of the implementation unit 14 converts the feedback 32 from one data content protocol to another.

Figure 5:
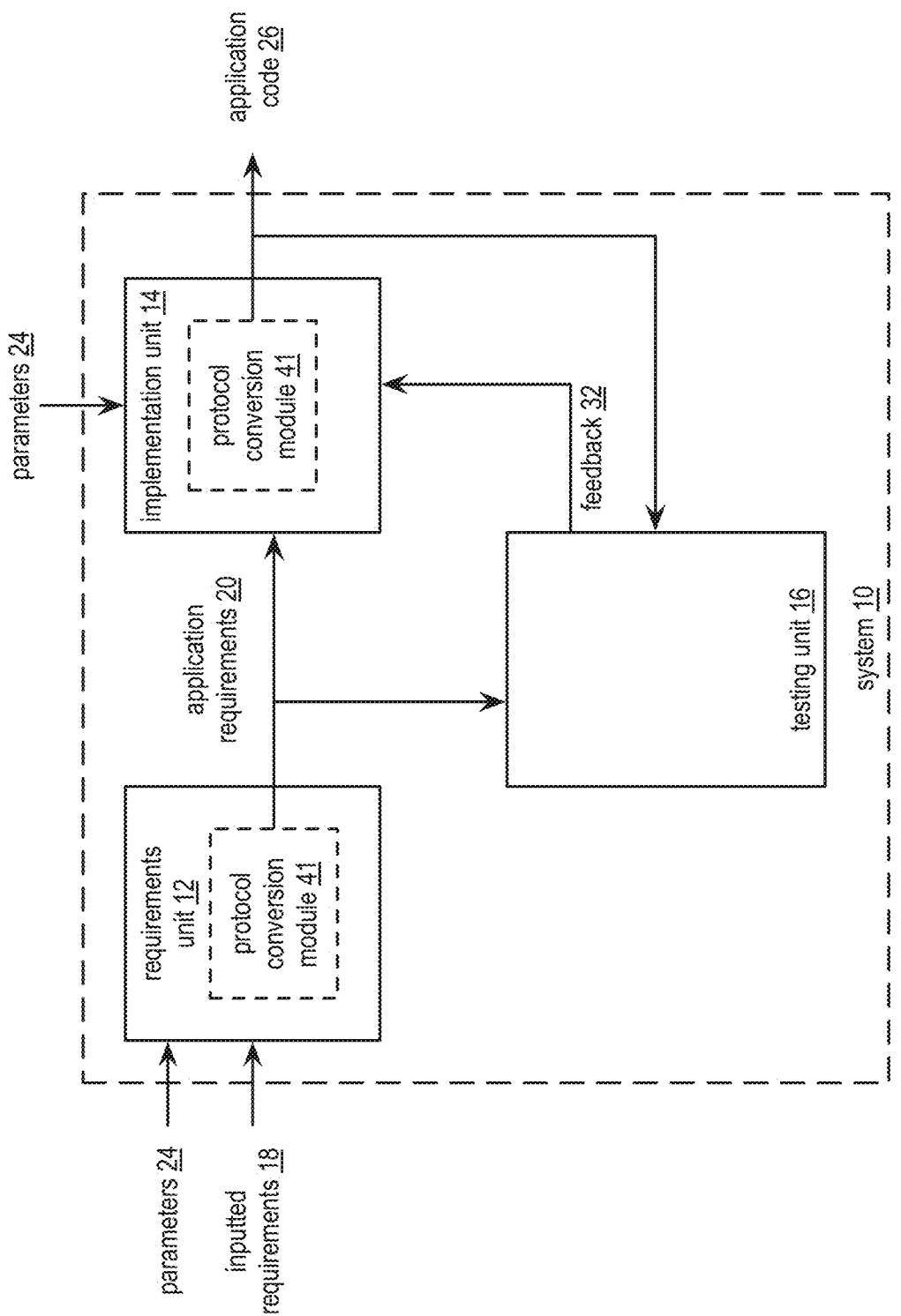
FIG. 5 is a schematic block diagram of another embodiment of a system in accordance with the present invention.

FIG. 5 is a schematic block diagram of another embodiment of a system 10 that includes the requirements unit 12, the implementation unit 14, and the testing unit 16. Each of the requirements unit 12 and the implementation unit 14 includes a protocol conversion module 41. The protocol conversion module 41 is operable to convert an output from one data content protocol to another data content protocol. For example, the protocol conversion module 41 of the requirements unit 12 may convert the application requirements 20 from one data content protocol to another before outputting it to the implementation unit 14. Note that the system 10 may include any combination of the embodiments of FIGS. 3-5.

Figure 6:
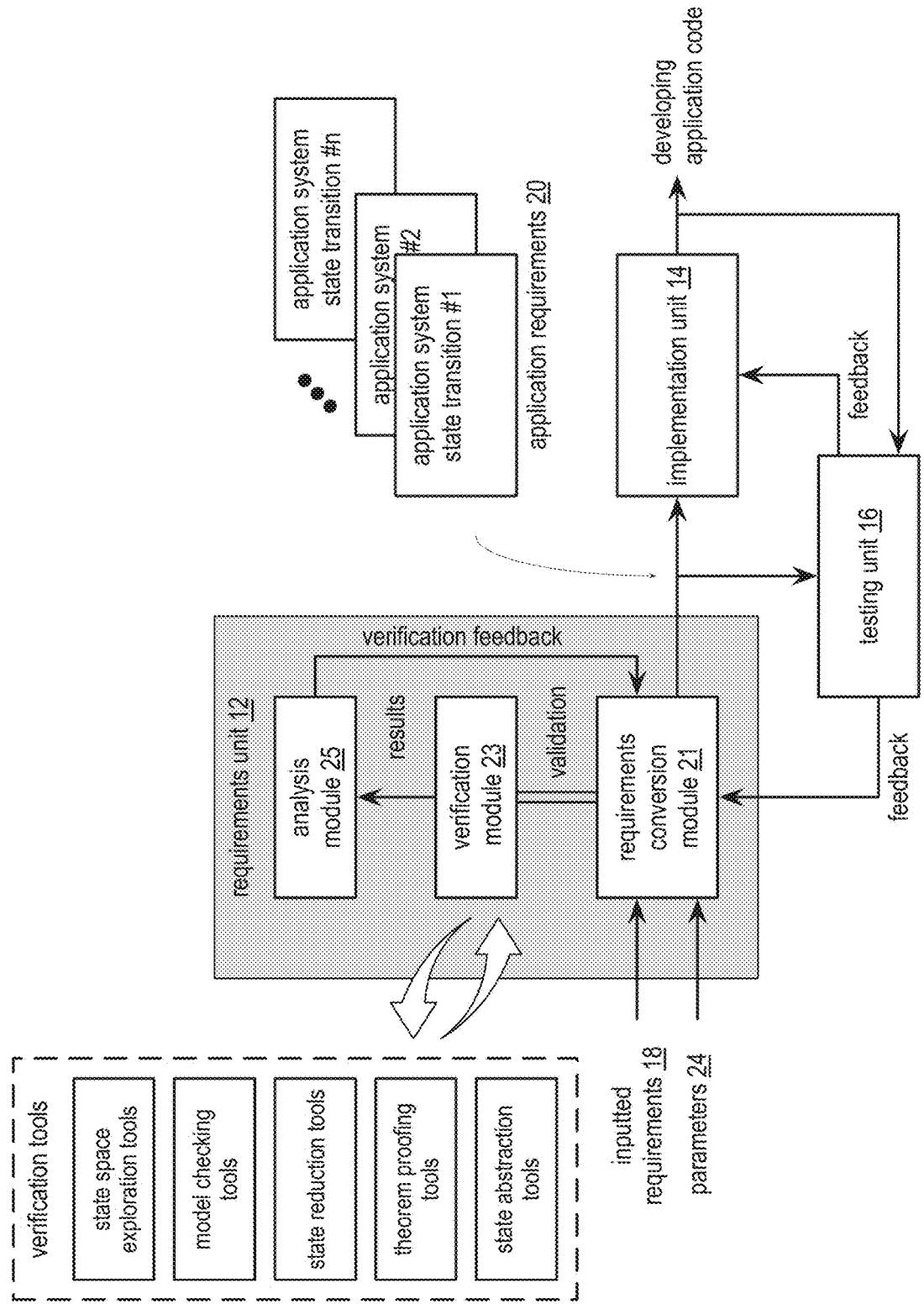
FIG. 6 is a schematic block diagram of another embodiment of a system in accordance with the present invention.

FIG. 6 is a schematic block diagram of another embodiment of a system 10 that includes the requirements unit 12, the implementation unit 14, and the testing unit 16. The requirements unit 12 includes the requirements conversion module 21 (converting the customer inputted requirements into the inputted requirements and then converting the inputted requirements into the application requirements), the verification module 23, and an analysis module 25.

In an example of operation, the requirements conversion module 21 generates the application requirements 20 from the inputted requirements 18 and parameters 24 based on verification feedback. As previously discussed, the inputted requirements 18 may include conditionals, state tables, and/or MSCs, which may be generated from client inputted requirements. The parameters 24 include one or more of, but are not limited to, application system behavioral constraints, application system correctness conditions, an application system platform (e.g., an operating system, computing engines, a programming language of the application code), behavior definitions (e.g., operational tables, conditionals, etc.), and/or data definitions (e.g., message and command descriptions, etc.).

The requirements conversion module 21 generates a plurality of application system state transitions 20 as the application requirements 20 from the inputted requirements 18 and the verification feedback. As a further example of operation, the requirements conversion module 21 produces verified application requirements 20 based on the inputted requirements 18 and verification module feedback. This is generally an iterative process where, for example, application requirements of iteration "n" are used to generate application requirements of iteration "n+1". The iterative process ends when the application requirements are verified to a desired level of completeness. For instance, the requirements conversion module may produce the plurality of application system state transitions by combining and/or converting the inputted requirements into the application system state transitions format over a series of iterations.

In addition, the requirements unit 12 produces the application system state transitions in accordance with valid states of the application system's state space, which encompasses all possible states of the application system (e.g., millions, billions, or more possible states). As such, the resulting application requirements specify a valid subset of the application system state space where the application system may operate.

During the generation of the applications requirements 20, the requirements conversion module 21 sends current representations of the application requirements 20 to the verification module 23 for feedback. The requirements conversion module 21 adjusts the generation of the application requirements 20 based on the verification feedback. In response to such feedback, the requirements conversion module 21 may change individual application state transitions, it may add new application state transitions, or it may remove application state transitions from the current application requirements. The requirements conversion module may operate on all inputted requirements, or it may operate on incrementally larger portions of the inputted requirements.

The verification module 23 receives the application system state transitions from the requirements conversion module as they are being generated to verify that they are consistent with the valid application system states and other correctness criteria (e.g., the application requirements should not create a safety violation, etc.). The verification module 23 uses one or more verification tools to verify the application requirements, where the verification tools include, but are not limited to, theorem proofing tools, model checking tools, state space exploration tools, state abstraction tools, state reduction tools, and/or combinations of such tools). The verification tools may operate on concrete application system states (where all variables of the application system state have a determined value), or they may operate on symbolic application system states (where the variables of the application system state may not have a determined value).

The selection of a verification tool, or tools, may be based on one or more of, but are not limited to, a number of available application system state transitions, the number of previous conversion/verification iterations, verification tools previously used, previous and/or current verification results, a predetermination, a lookup, a command, and/or available verification tools. Note that the verification module 23 may utilize one or more tools in sequence and/or in parallel prior to generating the verification feedback. For example, the verification module may determine to start with the theorem proving tool to verify correctness conditions for the application system state transitions and then utilize the model checking tool to determine the reachability of application system states that have been established to be incorrect.

As a further example, the verification module may select the tool to apply by consulting an expert system that has captured verification knowledge in the form of rules that guide the selection of the tool. As another example, the verification module may have a predetermined algorithm for selecting the tool. As yet another example, the verification module may select an applicable tool based on evolutionary programming principles. As a still further example, the verification module may select a tool as determined by an artificial-intelligence-based planning system. Other means for selecting the verification tools are also possible.

The verification module 23 may select the verification tool(s) by taking into account the inputted requirements, application requirements generated so far, previous intermediate results of developing the application requirements, progress on creating application requirements, the verification module feedback of previous applications of a tool, the verification tools already used, the number of times verification tools have been used, and/or available verification tools.

The verification feedback, which may be produced by the analysis module 25 based on the results of the verification module, indicates to the requirements conversion module 21 whether the verification results compare favorably to one or more verification thresholds such as completeness (no deadlock states, i.e., in any application system state that is not a terminal state, another application system state transition may be performed), consistency (no non-deterministic states, i.e., in any application system state, at most one application system state transition may be performed), and/or safety (i.e., a certain condition holds at every application system state or does not hold at every application system state, e.g., resources are always released before they are acquired, timers always expire before they are set) as determined by the parameters 24). Note that the verification module 23 may determine to utilize a different verification tool if the current verification tool is not producing verification results within a desired timeframe.

When the verification results do not compare favorably to a verification threshold, the analysis module 25 generates an error indication and provides it to the requirements conversion module. Once the error is reported, the verification module 23 may restart the verification process where it left off prior to when it discovered the error.

Figure 7:
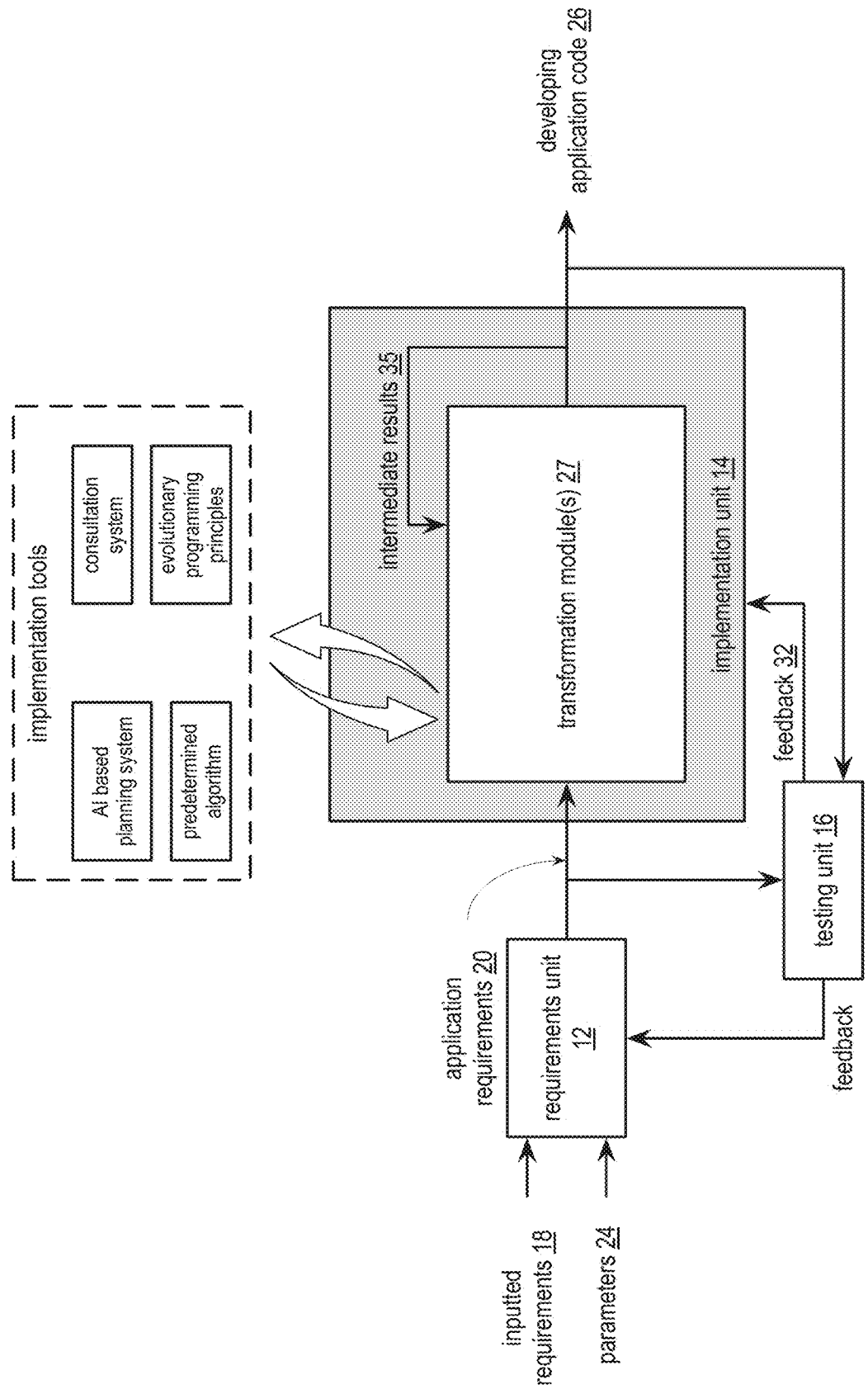
FIG. 7 is a schematic block diagram of another embodiment of a system in accordance with the present invention.

FIG. 7 is a schematic block diagram of another embodiment of a system 10 that includes the requirements unit 12, the implementation unit 14, and the testing unit 16. The implementation unit 14 includes one or more transformation modules 27 to generate application code from the application requirements 20.

As the implementation unit 12 generates the application code 26 from the application requirements 20, parameters 24, and testing unit feedback 32, it selects one or more implementation tools. These implementation tools are used by the implementation unit to incrementally and/or iteratively create the implementation from the application requirements. This process may require thousands, millions, or more tool applications in order to produce the final implementation. The implementation unit may select one or more new implementation tools for each tool application or use the same implementation tools for numerous tool applications.

At each iterative or incremental application of the implementation unit, the implementation unit takes the result of the previous application (or the application requirements, if this is the first application) and generates a new intermediate result of the developing application code (or the application code, if this is the last application). The intermediate results may be in the form of, but are not limited to, message diagrams, state machine diagrams, state tables, state/event matrices, pseudo code, structure diagrams, models or diagrams of a modeling language such as, but not limited to UML, SDL, VHDL, Verilog, BPML, Sytsma, etc., or suitable extensions or profiles thereof, code in a programming language or a suitable extension of such programming language, activity diagrams, business process diagrams. For any of these, the intermediate results may be in either textual or graphical form.

In an example, the implementation unit selects the tool to apply by consulting an expert system that has captured programming knowledge in the form of rules that guide the selection of the tool. In another example, the implementation unit has a predetermined algorithm for selecting the tool. In yet another example, the implementation unit selects an applicable tool based on evolutionary programming principles. In a further example, the implementation unit selects a tool as determined by an artificial-intelligence-based planning system. Further, or in addition to, the implementation unit selects the implementation tool(s) by taking into account the application requirements, previous intermediate results of the developing application code, progress on creating application code, the testing unit feedback on previous intermediate results, the implementation tools already used, the number of iterations for which implementation tools have been used, and/or available implementation tools.

The implementation tools include specific-purpose development tools and/or general-purpose development tools in the form of artificial intelligence (AI) based planning system implementation tools, predetermined algorithm tools, consultation system tools, and/or evolutionary programming principles tools. The specific-purpose development tools include tools to implement application code for a particular target processor and other constraint parameters. The general-purpose development tools include tools to implement application code based on common computing principles that are not specific to a given target processor or other constraint parameters. Specific-purpose and general-purpose development tools may include, but are not limited to, one or more of the following: compilers, program rewriting systems, term rewriting systems, tree rewriting systems, graph transformation systems, model transformation systems, macro expansion systems, aspect-oriented development systems, source-to-source translators, data-type refinement systems, program slicing systems, program preprocessors, program comprehension systems, program morphing systems, algebraic manipulation systems, optimizations systems, or other systems that are able to make incremental changes to an existing model or program. The individual implementation tools range in size from simple transformation rules that make very small, localized, incremental changes to the syntactic form of the intermediate result (e.g., changing an increment operation into an "add 1" operation) to aspect-oriented systems that can make very large changes across the whole of the intermediate result.

The process of developing the application code may go through several incremental steps. For example, for the illustrative software development process described in FIG. 33, the incremental steps may include an architecture level design increment, a high-level design (HLD) increment, a low-level design (LLD) increment, and a code development increment (which is further described with reference to FIG. 61). The iterative process may be organized in arbitrary and convenient incremental steps and is not limited to the steps mentioned as examples. Note that the application code takes into account architectural limitations and/or target implementation parameters (e.g., computing device and/or communications limitations).

The testing unit 16 generates feedback indicating whether or not the developing application is functioning in accordance with the application requirements. If the developing application is not functioning in accordance with the application requirements, the development process must be reverted to a previous step and corrected, up to and including revising the original requirements.

In a further example of operation, the implementation unit 14 generates application code based on the application requirements 20, parameters, and feedback from the testing unit 16 using one or more implementation tools. For instance, the application code may comprise a series of sequential or concurrent statements and declarations 1-n that implement the application system behavior. As the implementation unit generates the application code from the application requirements, parameters and testing unit feedback, it selects one or more implementation tools. As discussed above, the implementation unit may select one or more new implementation tools for each loop of generating the application code or use the same implementation tools for numerous loops.

Figure 8:
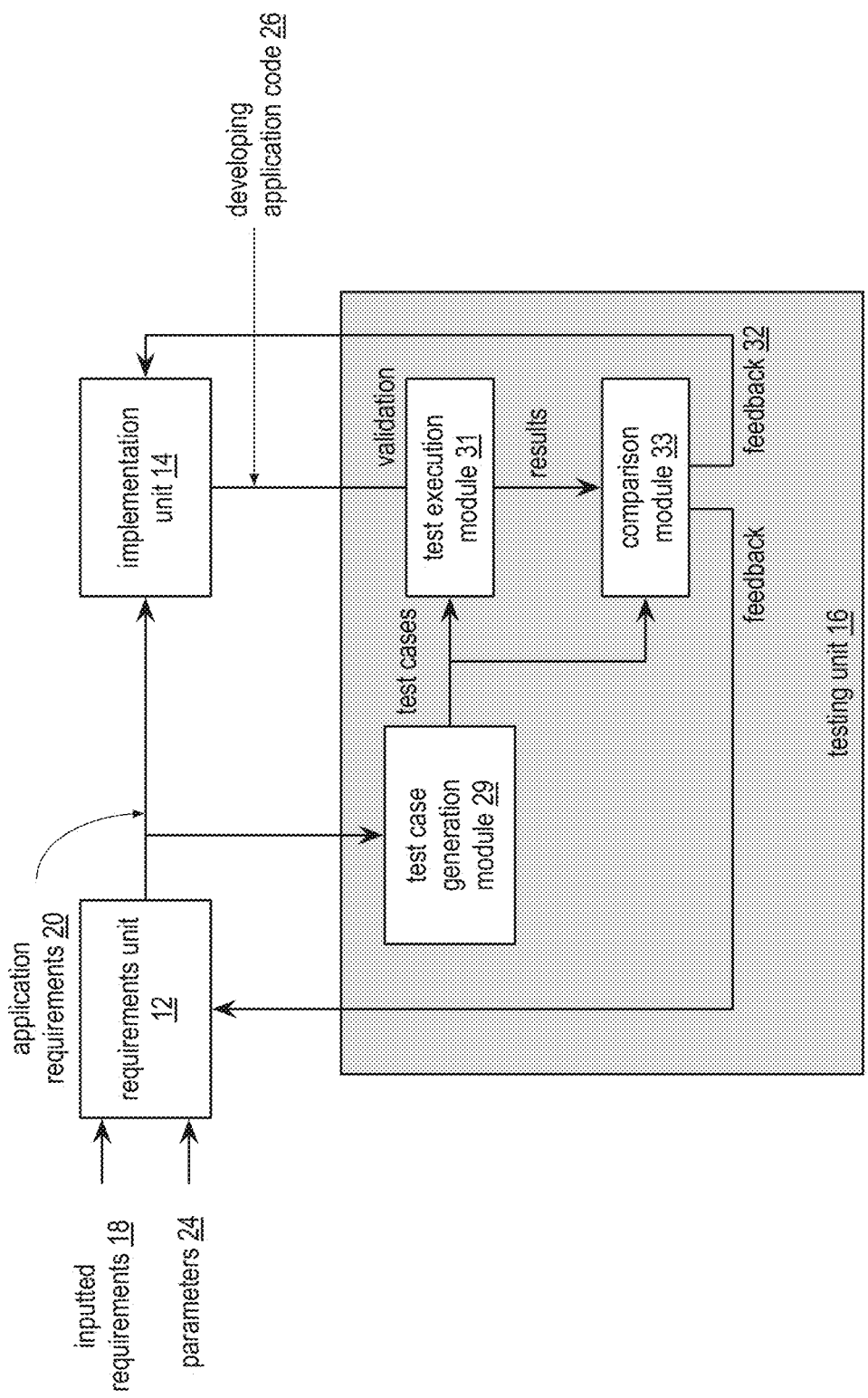
FIG. 8 is a schematic block diagram of another embodiment of a system in accordance with the present invention.

FIG. 8 is a schematic block diagram of another embodiment of a system 10 that includes the requirements unit 12, the implementation unit 14, and the testing unit 16. The testing unit 16 includes a test case generation module 29, a test execution module 31, and a comparison module 31. In general, the testing unit 16 tests the application code 26 as the implementation unit is generating it. The testing unit 16 may also test intermediate results of the developing application code during the generation of the application code.

In an example of operation, the system 10 converts, or enables an operator of the system to convert, the application requirements 20 into application system test cases, which are typically in a format indicating stimuli input into the application system and the corresponding responses emitted from the application system, if any. The test cases may be in a standardized format, such as TTCN, MSC, or in any other format suitable to express application system test cases. The test creation module may take into account parameters indicated desired application system behavioral scenarios or prohibited application system behavioral scenarios.

The test execution module 31 accepts the application system test cases and converts them to the appropriate level of abstraction for the artifact to be tested. For example, when the implementation unit has generated a representation of the application system as high-level design model, the test execution module converts the test cases into tests suitable to exercise a high-level design model. When the application unit has generated application code, the test execution module converts the test cases into tests suitable to exercise the application code. The test execution module 31 then stimulates the application system generated by the implementation unit with the test cases and collects the application system response.

The comparison module 33 accepts the test cases from the test creation module and the application system response from the test execution module and compares the observed behavior of the application system with the prescribed behavior described in the test cases. The comparison module 33 then generates feedback 32, which includes a description of the observed application system behavior and its deviation from the prescribed behavior, if any. The comparison module provides the feedback 32 to the implementation unit 14, which uses the feedback to further transform the application system (e.g., generate the application code). In another example, the comparison module 33 may provide feedback to the requirements unit 12 if it is determined that an error arose because of an application requirements error.

Figure 9:
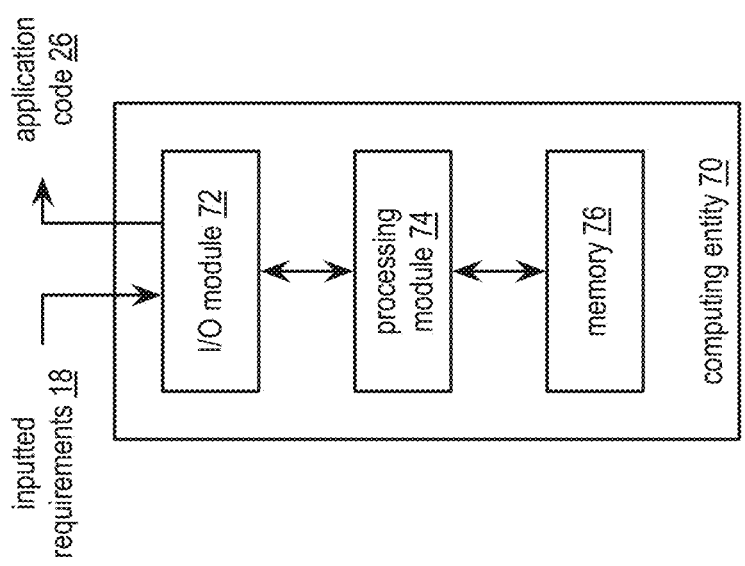
FIG. 9 is a schematic block diagram of an embodiment of a computing entity in accordance with the present invention.

FIG. 9 is a schematic block diagram of an embodiment of a computing entity 70 that includes one or more input/output (IO) modules 72, a processing module 74, and memory 76. The processing module 74 may be a single processing device or multiple processing devices as previously defined. The IO module(s) 72 provide connectivity to another computing entity, to a LAN, and/or to a WAN. Note that the computing entity 70 may be a stand-alone computer, may be a portion of a computer (e.g., a computer includes a plurality of computing entities), and/or may be a plurality of computers. Further note that a computer may be a discrete device and/or be a cloud computing device. Still further note that the computing entity 70 performs one or more of the methods illustrated in FIGS. 1-61.

Figure 10:
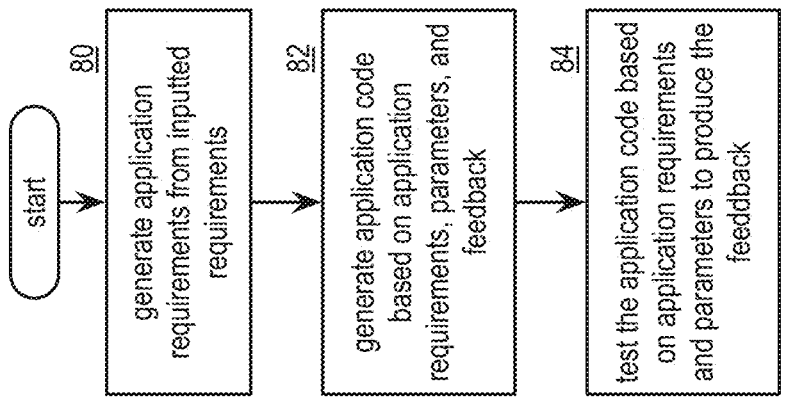
FIG. 10 is a logic diagram of an embodiment of a method that may be executed by a system in accordance with the present invention.

FIG. 10 is a logic diagram of an embodiment of a method that may be executed by the computing entity 70. The method begins at step 80 where the computing entity generates, in accordance with a system communication protocol, application requirements from inputted requirements and parameters. The application requirements include a plurality of application system state transitions. An application system state transition includes a standardized format for identifying one or more pre-conditions, one or more actions, and one or more post-conditions.

The system communication protocol includes a data content protocol and/or a communication protocol. The data content protocol includes an output definition for one or more of the requirements unit, the implementation unit, and the testing unit; an input definition for the one or more of the requirements unit, the implementation unit, and the testing unit; and/or a correlation of an output of the one or more of the requirements unit, the implementation unit, and the testing unit to an input of another one of the one or more of the requirements unit, the implementation unit, and the testing unit. The communication protocol includes a common communication protocol for communications between the requirements unit, the implementation unit, and the testing unit and/or a distributed communication protocol for communications between the requirements unit, the implementation unit, and the testing unit.

The method continues at step 82 where the computing entity generates, in accordance with the system communication protocol, application code based on the application requirements, the parameters, and feedback. The method continues at step 84 where the computing entity tests the application code based on the application requirements and the parameters to produce the feedback. The feedback is outputted in accordance with the system communication protocol.

FIG. 11 is a logic diagram of another embodiment of a method that may be executed by a computing entity and further discusses the generating of the application requirements in step 80 of FIG. 10. This method begins at step 90 where the computing entity generates the application requirements based on the inputted requirements and verification feedback. The method continues at step 92 where the computing entity verifies the generating of the application requirements is consistent with valid system states and correctness criteria to produce one or more verification results. The method continues at step 94 where the computing entity compares the one or more verification results with one or more verification thresholds to produce the verification feedback.

FIG. 12 is a logic diagram of another embodiment of a method that may be executed by a computing entity and further discusses the generating of the application code in step 82 of FIG. 10. This method begins at step 96 where the computing entity, for one or more of the application requirements and in accordance with one or more of the parameters, selects one or more implementation tools in accordance with a current generating of the application code to produce a selected implementation tool set. The method continues at step 98 where the computing entity iteratively or incrementally applies the selected implementation tool set. In this step, for each iteratively or incrementally application of the selected implementation tool set, the computing entity may utilize a result of a previous application of the selected implementation tool set to generate a new intermediate result of the current implementation of the application code.

The method continues at step 100 where the computing entity generates a current implementation of the application code based on corresponding feedback of the feedback. The method continues at step 102 where the computing entity determines whether the current implementation is complete (e.g., at a desired level of correctness based on the feedback). If so, the method continues at step 104 where the computing entity determines whether the current implementation is the final implementation of developing the application code. If yes, the method is complete.

If the current implementation is not complete, the method repeats at step 96 where another tool and/or the same tool(s) may be used. If the current implementation is complete and the application code is not finished, the method continues at step 106 where the computing entity goes to the next implementation and repeats the process for the next implementation.

FIG. 13 is a logic diagram of another embodiment of a method that may be executed by a computing entity and further discusses the testing of the application code in step 84 of FIG. 10. The method begins at step 108 where the computing entity generates one or more test cases for a current implementation of the application code based on one or more corresponding application requirements of the application requirements and one or more corresponding parameters of the parameters. The method continues at step 110 where the computing entity, for an artifact of the current implementation of the application code being tested, converts the one or more test cases into an abstract test case set corresponding to a current level of implementation of the current implementation of the application code;

The method continues at step 112 where the computing entity stimulates the current implementation of the application code based on the abstract test case set to produce a developing application code response. The method continues at step 114 where the computing entity compares the developing application code response with a desired response of the one or more test cases. The method continues at step 116 where the computing entity generates the feedback based on the comparing of the developing application code response with the desired response.

The computing entity may compare the developing application code response with the desired response by determining a behavior deviation of the developing application code response for the desired response. The computing entity then generates the feedback based on the behavior deviation. The computing entity provides the feedback to the implementation unit when the behavior deviation is caused by an implementation error and provides it to the requirement unit when the behavior deviation is caused by an application requirement error.

Figure 14:
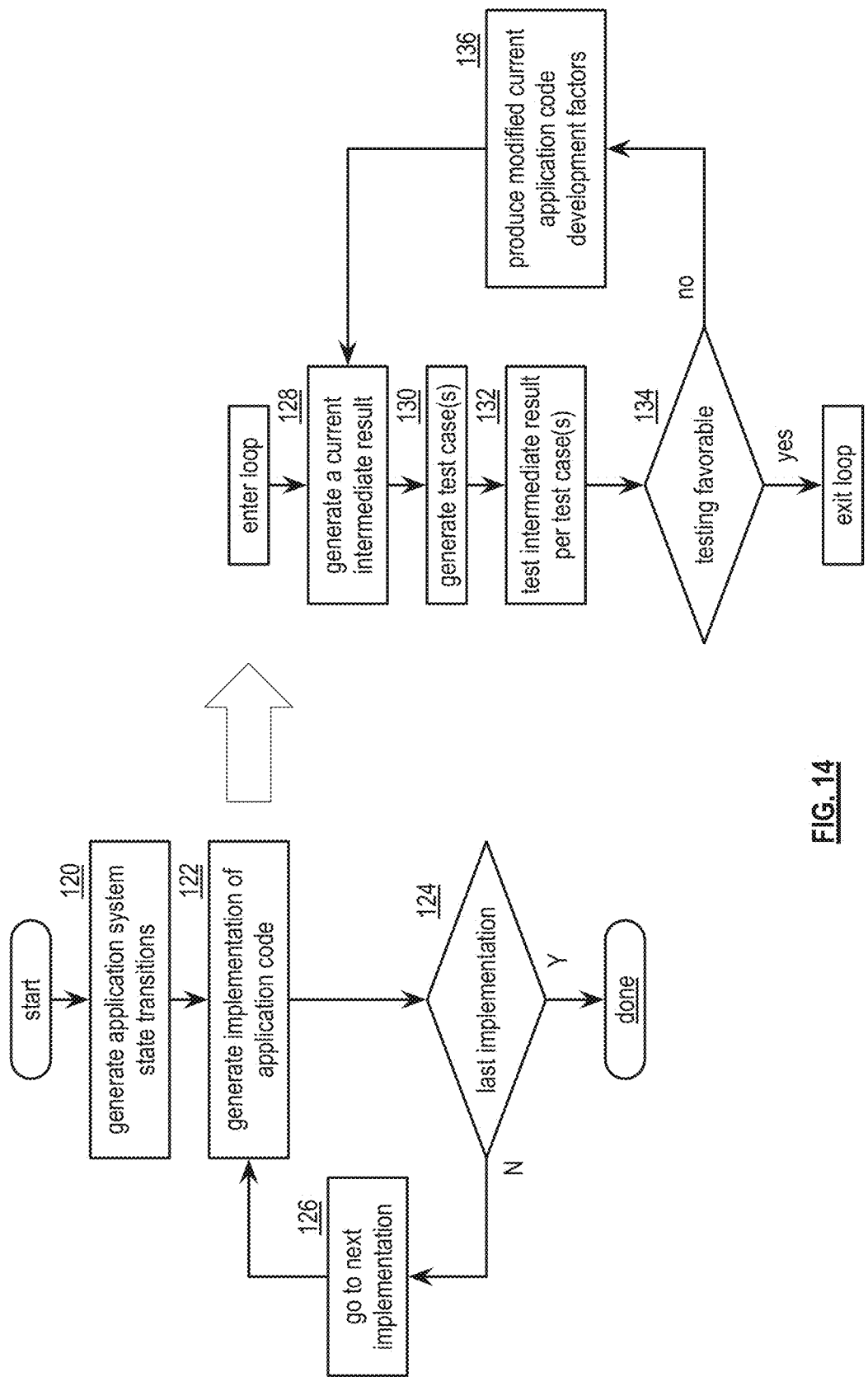
FIG. 14 is a logic diagram of another embodiment of a method that may be executed by a system in accordance with the present invention.

FIG. 14 is a logic diagram of another embodiment of a method that may be executed by a computing entity. The method begins at step 120 where the computing entity generates a plurality of application system state transitions from inputted requirements and parameters. The method continues at step 122 where the computing entity generates a current implementation of generating application code. To do this, the computing entity enters a loop that begins at step 128 where the computing entity generates a current intermediate result based on a previous implementation of generating the application code and in accordance with current application code development factors, which includes at least one of: one or more of the plurality of application system state transitions, one or more of the parameters, and application of one or more implementation tools that have been selected for the current implementation.

The loop continues at step 130 where the computing entity generates at least one test case based on the one or more of the plurality of application system state transitions. The loop continues at step 132 where the computing entity tests the current intermediate result in accordance with the at least one test case. Each of the current and previous intermediate results includes a state table, pseudo code, an activity diagram, a state machine diagram, a state/event matrix, a structure diagram, a business process diagram, a model, a modeling language diagram, and/or code in a particular programming language.

The loop continues at step 134 where the computing entity determines whether the test was favorable (e.g., the current implementation result produces a behavior that was substantially similar to an expected, or desired, behavior). If the testing was favorable, the computing entity exits the loop.

When the testing is unfavorable, the loop continues at step 136 where the computing entity modifies the application code development factors. For example, the computing entity may modify (e.g., change, delete, re-use) one or more of the plurality of application system state transitions, one or more of the parameters, and/or one or more implementation tools to produce modified current application code development factors. As a more specific example, the modified current application code development includes selecting one or more new implementation tools for application in generating the current intermediate result and/or changing the one or more application system state transitions to produce a changed application system state transition set. The loop then repeats at step 128 using the modified application code development factors.

Upon exiting the loop, the method continues at step 124 where the computing entity determines whether the current implementation is a final implementation of the application code. When the current implementation is not the final implementation of the application code, the method continues at step 126 where the computing entity repeats the loop for a next current implementation of generating the application code. When the current implementation is the final implementation of the application code, the computing entity outputs the application code and the method is complete.

Figure 15:
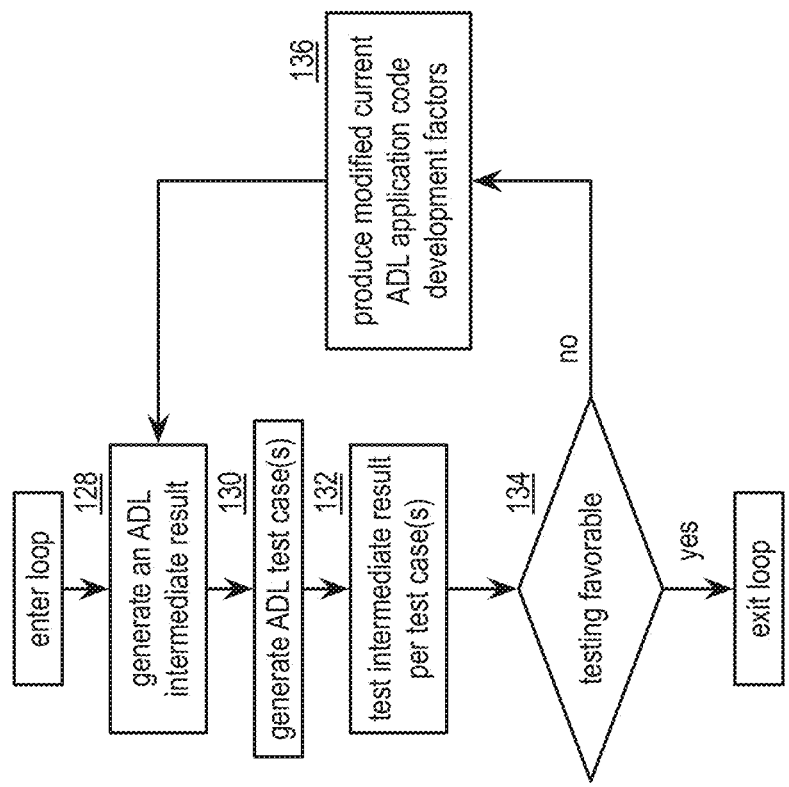
FIG. 15 is a logic diagram of another embodiment of a method that may be executed by a system in accordance with the present invention.

FIG. 15 is a logic diagram of another embodiment of the loop of FIG. 14 that may be executed by a computing entity for an architecture level design (ALD) phase. The loop begins at step 128 where the computing entity generates a current ALD intermediate result based on a previous implementation of generating the application code and in accordance with ALD current application code development factors, which includes at least one of: one or more of the plurality of application system state transitions, one or more of the parameters, and application of one or more implementation tools that have been selected for the current implementation.

The loop continues at step 130 where the computing entity generates at least one ALD test case based on the one or more of the plurality of application system state transitions. The loop continues at step 132 where the computing entity tests the current ALD intermediate result in accordance with the at least one ALD test case. The loop continues at step 134 where the computing entity determines whether the test was favorable (e.g., the current implementation result produces a behavior that was substantially similar to an expected, or desired, behavior). If the testing was favorable, the computing entity exits the loop.

When the testing is unfavorable, the loop continues at step 136 where the computing entity modifies the ALD application code development factors. For example, the computing entity may modify (e.g., change, delete, re-use) one or more of the plurality of application system state transitions, one or more of the parameters, and/or one or more implementation tools to produce modified current application code development factors.

Figure 16:
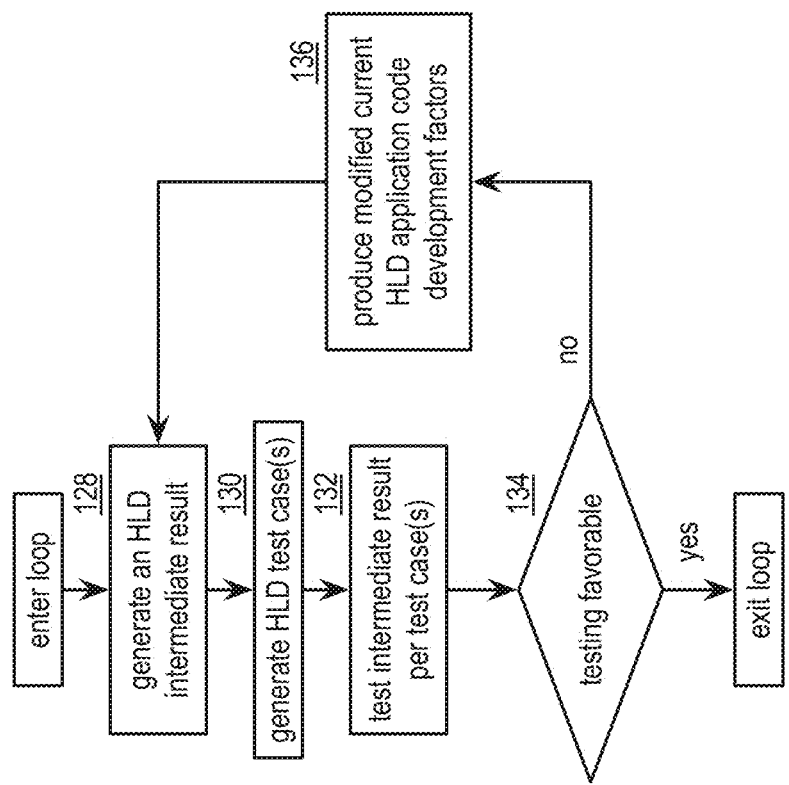
FIG. 16 is a logic diagram of another embodiment of a method that may be executed by a system in accordance with the present invention.

FIG. 16 is a logic diagram of another embodiment of the loop of FIG. 14 that may be executed by a computing entity for a high level design (HLD) phase. The loop begins at step 128 where the computing entity generates a current HLD intermediate result based on a previous implementation of generating the application code and in accordance with HLD current application code development factors, which includes at least one of: one or more of the plurality of application system state transitions, one or more of the parameters, and application of one or more implementation tools that have been selected for the current implementation.

The loop continues at step 130 where the computing entity generates at least one HLD test case based on the one or more of the plurality of application system state transitions. The loop continues at step 132 where the computing entity tests the current HLD intermediate result in accordance with the at least one HLD test case. The loop continues at step 134 where the computing entity determines whether the test was favorable (e.g., the current implementation result produces a behavior that was substantially similar to an expected, or desired, behavior). If the testing was favorable, the computing entity exits the loop.

When the testing is unfavorable, the loop continues at step 136 where the computing entity modifies the HLD current application code development factors. For example, the computing entity may modify (e.g., change, delete, re-use) one or more of the plurality of application system state transitions, one or more of the parameters, and/or one or more implementation tools to produce modified current application code development factors.

Figure 17:
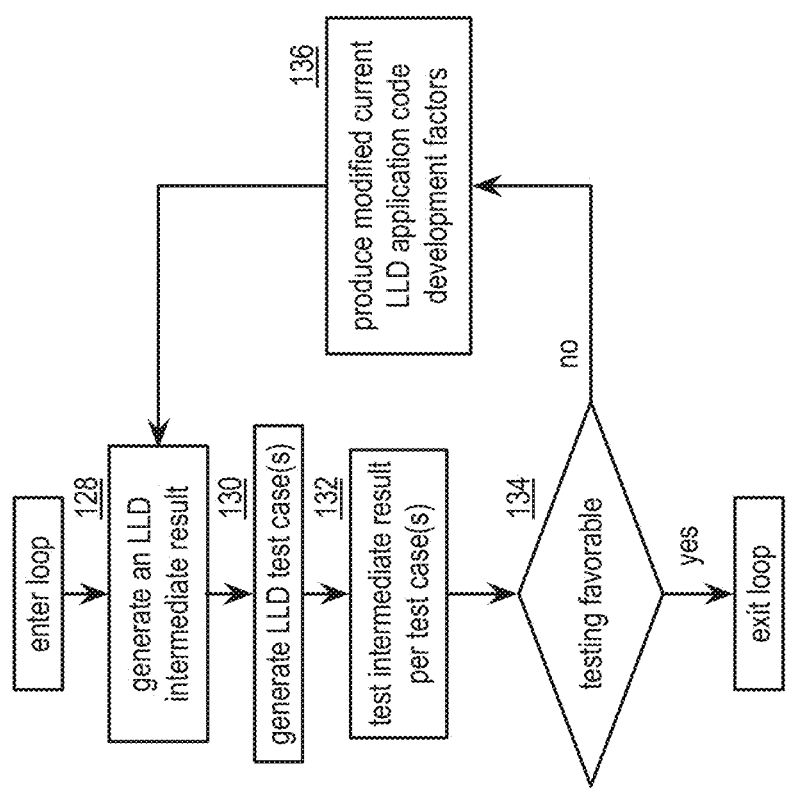
FIG. 17 is a logic diagram of another embodiment of a method that may be executed by a system in accordance with the present invention.

FIG. 17 is a logic diagram of another embodiment of the loop of FIG. 14 that may be executed by a computing entity for a low level design (LLD) phase. The loop begins at step 128 where the computing entity generates a current LLD intermediate result based on a previous implementation of generating the application code and in accordance with LLD current application code development factors, which includes at least one of: one or more of the plurality of application system state transitions, one or more of the parameters, and application of one or more implementation tools that have been selected for the current implementation.

The loop continues at step 130 where the computing entity generates at least one LLD test case based on the one or more of the plurality of application system state transitions. The loop continues at step 132 where the computing entity tests the current LLD intermediate result in accordance with the at least one LLD test case. The loop continues at step 134 where the computing entity determines whether the test was favorable (e.g., the current implementation result produces a behavior that was substantially similar to an expected, or desired, behavior). If the testing was favorable, the computing entity exits the loop.

When the testing is unfavorable, the loop continues at step 136 where the computing entity modifies the LLD application code development factors. For example, the computing entity may modify (e.g., change, delete, re-use) one or more of the plurality of application system state transitions, one or more of the parameters, and/or one or more implementation tools to produce modified current application code development factors.

Figure 18:
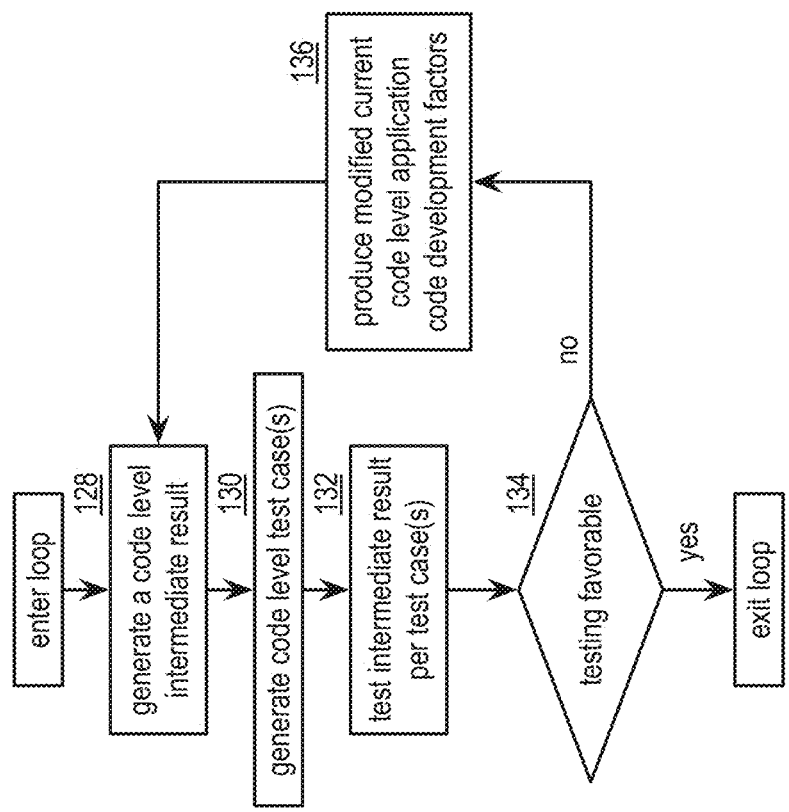
FIG. 18 is a logic diagram of another embodiment of a method that may be executed by a system in accordance with the present invention.

FIG. 18 is a logic diagram of another embodiment of the loop of FIG. 14 that may be executed by a computing entity for a code level design (CODE) phase. The loop begins at step 128 where the computing entity generates a current CODE intermediate result based on a previous implementation of generating the application code and in accordance with CODE current application code development factors, which includes at least one of: one or more of the plurality of application system state transitions, one or more of the parameters, and application of one or more implementation tools that have been selected for the current implementation.

The loop continues at step 130 where the computing entity generates at least one CODE test case based on the one or more of the plurality of application system state transitions. The loop continues at step 132 where the computing entity tests the current CODE intermediate result in accordance with the at least one CODE test case. The loop continues at step 134 where the computing entity determines whether the test was favorable (e.g., the current implementation result produces a behavior that was substantially similar to an expected, or desired, behavior). If the testing was favorable, the computing entity exits the loop.

When the testing is unfavorable, the loop continues at step 136 where the computing entity modifies the CODE application code development factors. For example, the computing entity may modify (e.g., change, delete, re-use) one or more of the plurality of application system state transitions, one or more of the parameters, and/or one or more implementation tools to produce modified current application code development factors.

Figure 19:
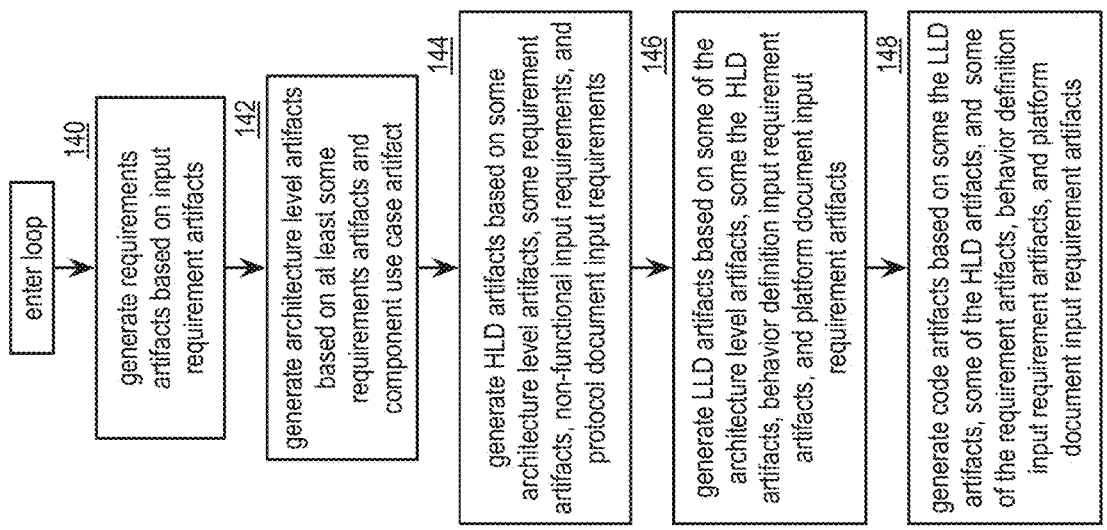
FIG. 19 is a logic diagram of another embodiment of a method that may be executed by a system in accordance with the present invention.

FIG. 19 is a logic diagram of another embodiment of a method that may be executed by a system. The method begins at step 140 where the system generates a plurality of requirements artifacts based on a component use case input requirement artifact, a scenario input requirement artifact, and a correctness criteria input requirement artifact. The method continues at step 142 where the system generates a plurality of architecture level artifacts based on at least some of the plurality of requirements artifacts and the component use case input requirement artifact. For example, the system generates one or more structure models and/or one or more test models as architecture level artifacts.

The method continues at step 144 where the system generates a plurality of high-level design (HLD) artifacts based on at least some of the plurality of architecture level artifacts, at least a second some of the plurality of requirement artifacts, non-functional input requirements, and protocol document input requirements. For example, the system generates one or more architecture models, one or more structure models, one or more state models, one or more sanity test models, and/or one or more protocol specification models as the HLD artifacts.

The method continues at step 146 where the system generates a plurality of low-level design (LLD) artifacts based on at least a second some of the plurality of architecture level artifacts, at least some of the plurality of HLD artifacts, behavior definition input requirement artifacts, and platform document input requirement artifacts. For example, the system generates one or more structure models, one or more state models, one or more behavior models, one or more platform models, and/or one or more protocol test models as the LLD artifacts.

The method continues at step 148 where the system generates a plurality of code artifacts based on at least some of the plurality of LLD artifacts, at least a second some of the plurality of HLD artifacts, and at least a third some of the plurality of requirement artifacts, the behavior definition input requirement artifacts, and the platform document input requirement artifacts wherein at least one of the plurality of code artifacts includes application code. For example, the system generates one or more user code models, one or more user application code, one or more model code, one or more platform code, one or more protocol code, and/or one or more platform test models as the code artifacts.

FIG. 20 is a schematic block diagram of an embodiment of a requirements unit 12 that includes one or more input/output (IO) modules 190, a processing module 192, and memory 194. The processing module 192 may be a single processing device or multiple processing devices as previously defined. The IO module(s) 190 provide connectivity to another computing entity, to a LAN, and/or to a WAN. One or more of the IO modules receives the inputted requirements 18 and/or transmits the application requirements 20. Note that the requirements unit 12 may be incorporated in a computing entity, which may be a stand-alone computer, may be a portion of a computer (e.g., a computer includes a plurality of computing entities), and/or may be a plurality of computers. Further note that a computer may be discrete device and/or be a cloud computing device. Still further note that the requirements unit 12 performs one or more of the methods illustrated in FIGS. 19, and 25-30.

FIG. 21 is a logic diagram of an embodiment of a method that may be executed by a requirements unit 12. The method begins at step 200 where the requirements unit receives inputted requirements and parameters. The inputted requirements may be created from received client requirements and may include a conditional logic statement(s), a state table(s), and/or a message sequence chart(s). The parameters include an application system behavioral constraint(s), an application system correctness condition(s), an application system platform(s), a behavior definition(s), and/or a data definition(s).

The method continues at step 202 where the requirements unit generates application requirements based on the inputted requirements, the parameters, and verification feedback. For an application requirement(s), the method continues at step 208 where the requirements unit determines whether the generating of the application requirement(s) is consistent with valid system states and correctness criteria to produce a verification result(s). For the application requirement(s), the method continues at step 210, where the requirements unit compares the verification result(s) with one or more verification thresholds to produce the verification feedback.

When the verification result(s) compares favorably with the verification threshold(s) (e.g., at a desired level completeness, consistency, and/or safety), the verification feedback indicates that the application requirement(s) is at the desired level of completeness, consistency, and/or safety. When the verification result(s) compares unfavorably with the verification threshold(s), the verification feedback indicates an error and may further specify the nature of the error (e.g., not at the desired level of completeness, consistency, or safety).

The method continues at step 204 where the processing module determines whether the last requirement(s) have been processed. If yes, the method is complete. If not, the method continues at step 206 where the processing module goes to the next requirement(s) and repeats the method at step 202 for the next requirement(s).

Figure 22:
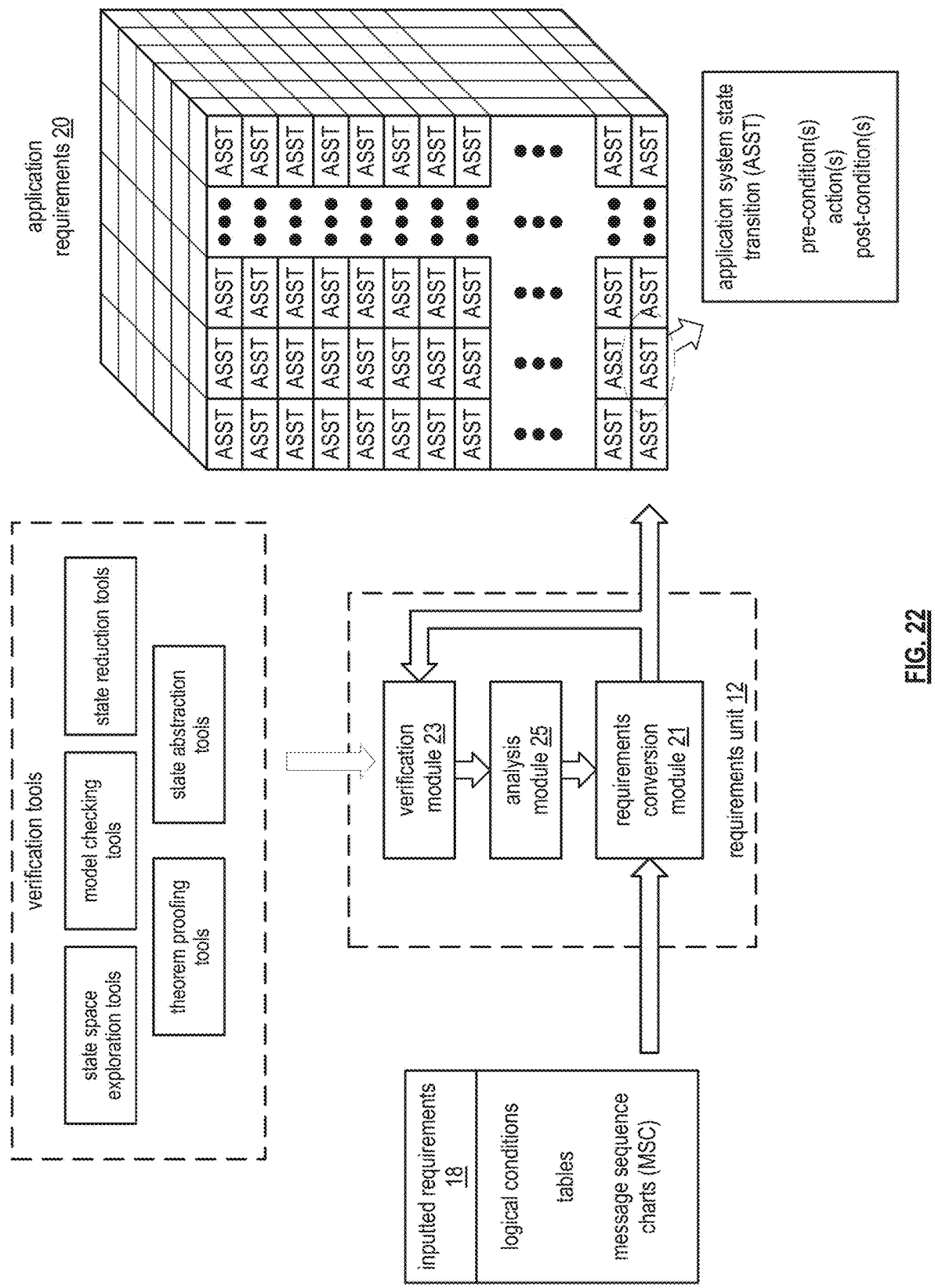
FIG. 22 is a schematic block diagram of another embodiment of a requirements unit in accordance with the present invention.

FIG. 22 is a schematic block diagram of another embodiment of a requirements unit 12 that includes a requirements conversion module and a verification module. The requirements conversion module receives the inputted requirements 18 in accordance with the system communication protocol. For example, the inputted requirements 18 may be formatted as logical conditions, state tables, flow charts, and/or message sequence charts (MSCs).

In general, the requirements conversion module converts the inputted requirements 18, based on verification feedback, into the application requirements 20 that are useable by the implementation module 14 and the test module 16. As the requirements conversion module converts the inputted requirements 18 into the application requirements 20, the verification module 23 verifies the conversion using one or more verification tools (e.g., state space exploration tool(s), model checking tool(s), state reduction tool(s), a theorem proofing tool(s), and/or state abstraction tool(s)) to produce verification results.

The analysis module 23 compares the verification results with verification threshold(s) to produce the verification feedback. For each application requirement, an objective of the verification module 23 and the analysis module 25 is to ensure with a relatively high probability (e.g., at least greater than 90%) that, for every non-terminal state, there is a way to continue (i.e., no live or dead lock conditions). Another objective of the verification module 23 and the analysis module 25 is to ensure with a relatively high probability that, for each valid state, there are one or more known elements capable of performing the functional requirements of the state (i.e., domain specific application verification).

As shown, the application requirements 20 include a plurality of application system state transitions (ASST). Each ASST includes one or more pre-conditions, one or more actions, and one or more post-conditions. An ASST may define an independent operation (i.e., the pre-condition(s) is not dependent on the post-condition of another basic protocol) or a dependent operation (i.e., the pre-condition(s) is/are dependent on the post-condition of one or more other basic protocols).

A feature of the requirements unit 12 is the interactive operation of the requirements conversion module 21, the verification module 23, and the analysis module 25. For example, the verification module 23 and the analysis module 25 verify the application requirements as the requirements module 21 is generating them. As a more specific example, the verification module 23 and the analysis module 25 verify the operation of an ASST as the requirements conversion module 21 creates it and further verify its independency and/or dependency with respect to other ASSTs. If the verification module 23 and analysis module 25 determine an error, the analysis module 25 provides feedback to the requirements module 21, which it uses to modify the generation of an ASST and/or to report the feedback to a system operator.

Figure 23:
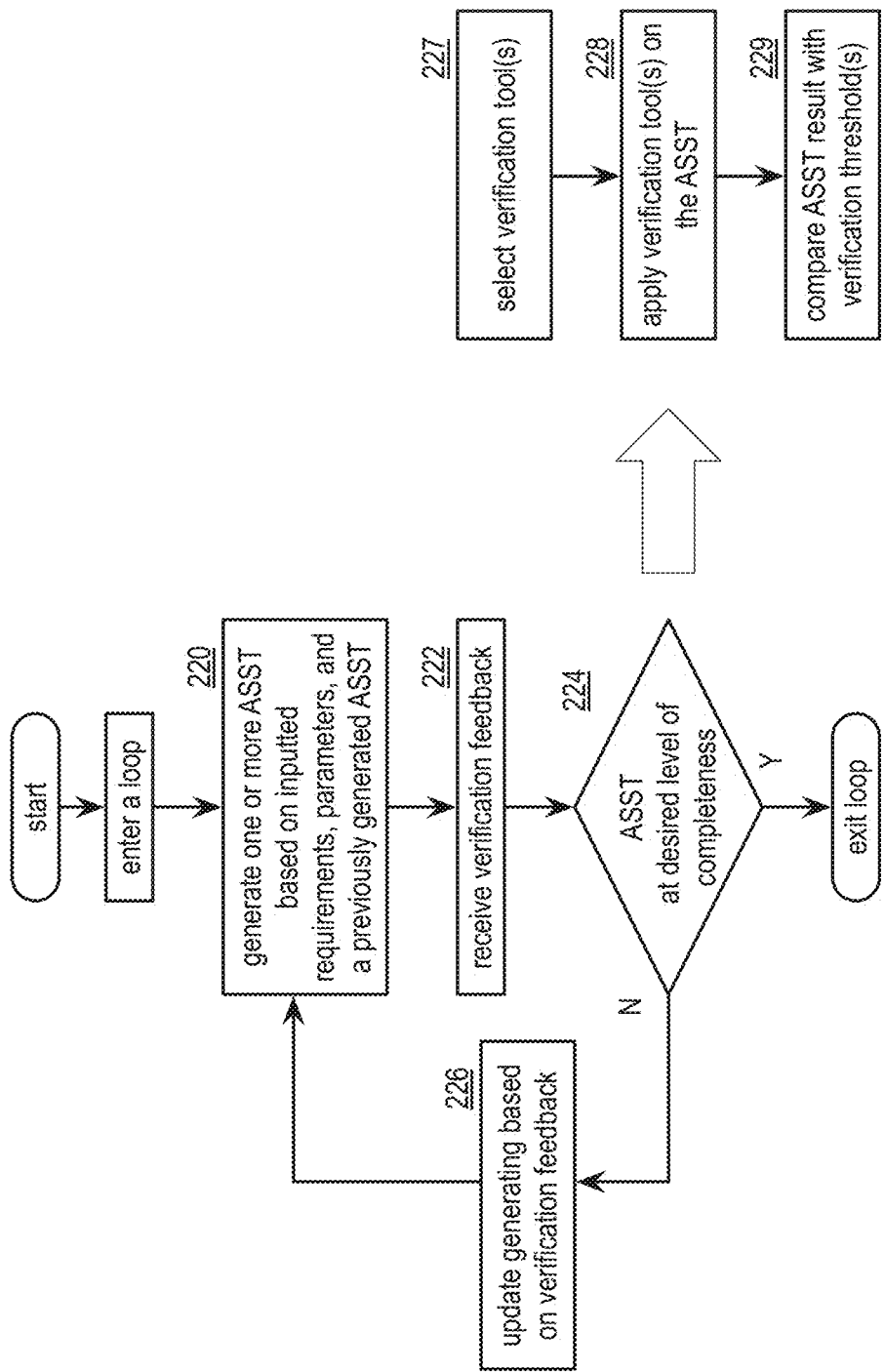
FIG. 23 is a logic diagram of an embodiment of a method that may be executed by a requirements unit in accordance with the present invention.

FIG. 23 is a logic diagram of an embodiment of a method that may be executed by a requirements unit 12 for generating one or more application system state transitions (ASST). The method begins by entering a loop. The loop begins at step 220 where the requirements unit generates the one or more ASSTs based on the inputted requirements, the parameters and/or a previously generated one or more ASSTs. The method continues at step 222 where the requirements unit receives verification feedback regarding the generation of the one or more ASSTs.

The method continues at step 224 where the requirements unit determines whether the one or more ASSTs are at a desired level of completeness, consistency, and/or safety based on the verification feedback. The verification feedback is created as shown in steps 227-229. At step 227, the requirements unit selects one or more verification tools to produce a selected verification tool set. A verification tool may be a theorem proofing tool, a model checking tool, a state space exploration tool, a state abstraction tool, a state reduction tool, and/or a combination thereof.

The selection of a verification tool may be done in a variety of ways. For example, the requirements unit may select the one or more verification tools based on the inputted requirements, previously generated ASST of the plurality of ASST, a number of available application system state transitions, a number of previous conversion/verification iterations, verification tools previously used, previous verification feedback, current verification feedback, a pre-determination, a lookup, a command, and/or available verification tools.

As another example, the requirements unit may select the one or more verification tools by consulting an expert system that has captured verification knowledge. As yet another example, the requirements unit may select the one or more verification tools by executing a predetermined verification tool selection algorithm. As a further example, the requirements unit may select the one or more verification tools by based on evolutionary programming principles. As a still further example, the requirements unit may select the one or more verification tools by an artificial-intelligence-based planning system.

At step 228, the requirements unit applies the selected verification tool set on the one or more of the ASST to produce an ASST verification result. The application of the selected verification tool set may be done in a variety of ways. For example, the requirements unit may apply the selected verification tool set in a concrete manner (e.g., consider system variables to have concrete values). As another example, the requirements unit may apply the selected verification tool set in a symbolic manner (e.g., consider system variables to have symbolic values). As yet another example, the requirements unit may apply the selected verification tool set in a sequential manner (e.g., apply one verification tool at a time). As a further example, the requirements unit may apply the selected verification tool set in a parallel manner (e.g., apply a plurality of verification tools at substantially the same time). As yet a further example, the requirements unit may apply the selected verification tool set in a backward manner (e.g., begin from a desired condition and/or undesired condition and attempt to determine whether an initial condition can be established). As a still further example, the requirements unit may apply the selected verification tool set in a forward manner (e.g., begin from an initial state of the system and attempt to determine whether a desired condition(s) can be established or whether an undesired condition(s) can be established).

At step 229, the requirements unit compares the ASST verification result with a corresponding verification threshold(s) to produce the verification feedback for this ASST(s). When the ASST(s) are at the desired level of completeness, the requirements unit exits the loop.

When the ASSTs are not at the desired level of completeness, the loop continues at step 226 where the requirements unit updates generating the ASST(s) based on the verification feedback and repeats the loop. The requirements unit may update the generating of the ASST(s) in a variety of ways. For example, the requirements unit may change the generating of the ASST(s) (e.g., select a different verification tool, change an application requirement, etc.). As another example, the requirements unit may add an application system state transition to the ASSTs. As yet another example, the requirements unit may remove an ASST from the ASSTs.

Figures 24, 25:
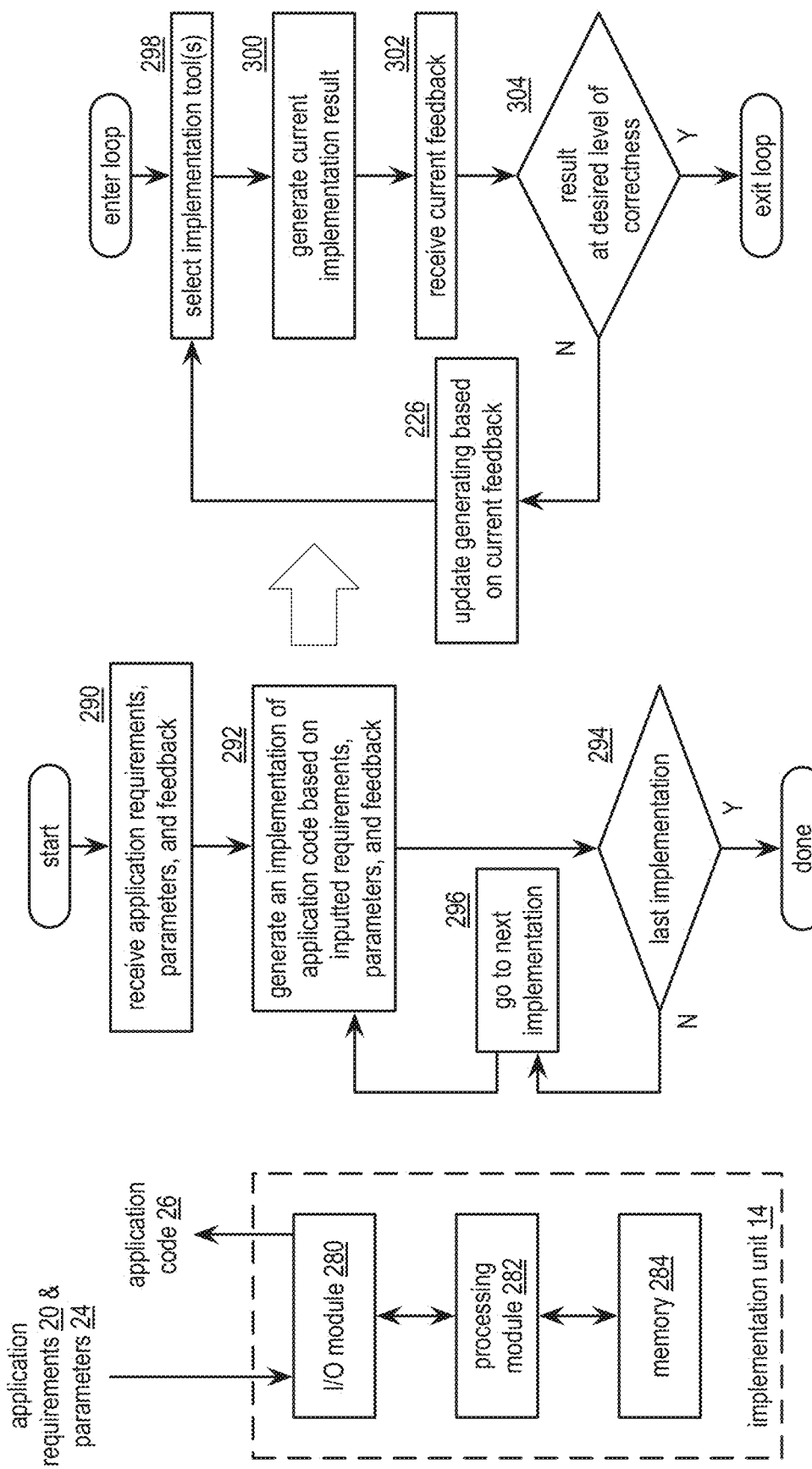
FIG. 24 is a schematic block diagram of an embodiment of an implementation unit in accordance with the present invention.
FIG. 25 is a logic diagram of an embodiment of a method that may be executed by an implementation unit in accordance with the present invention.

FIG. 24 is a schematic block diagram of an embodiment of an implementation unit 14 that includes one or more input/output (IO) modules 280, a processing module 282, and memory 284. The processing module 282 may be a single processing device or multiple processing devices as previously defined. The IO module(s) 280 provide connectivity to another computing entity, to a LAN, and/or to a WAN. One or more of the IO modules receives the application requirements 20 and parameters 24 and outputs the application code 26. Note that the implementation unit 14 may be incorporated in a computing entity, which may be a stand-alone computer, may be a portion of a computer (e.g., a computer includes a plurality of computing entities), and/or may be a plurality of computers. Further note that a computer may be discrete device and/or be a cloud computing device.

FIG. 25 is a logic diagram of an embodiment of a method that may be executed by an implementation unit 14. The method begins at step 290, where the implementation unit receives application requirements, parameters, and feedback. The application requirements include a plurality of application system state transitions and the parameters include an application system behavioral constraint, an application system correctness condition, an application system platform, a behavior definition, and/or a data definition. The feedback is from the testing unit and indicates a level of completeness, correctness, and/or safety compliance of the developing application code.

The method continues at step 292 where the implementation unit generates application code based on the application requirements, the parameters, and the feedback. In an example, the implementation unit generates the application code in process phases such as an architecture level design process phase, a high-level design (HLD) process phase, a low-level design (LLD) process phase, and a code development process phase.

For a current implementation of an incremental phase (e.g., architecture, HLD, LLD, code, etc.) of generating the application code, the method continues with the implementation unit entering a loop. The loop begins at step 298 where the implementation unit selects an implementation tool from a plurality of implementation tools in accordance with implementation constraints and a previous implementation result. The implementation tool may be a specific use implementation tool and/or a general use implementation tool. A specific use implementation tool may be applied to the current implementation of generating the application code for a particular targeted processor and/or other constraint parameters and a general use implementation tool may be applied to implement the current implementation of generating the application code in accordance with non-targeted processor common computing principles.

A specific or general implementation tool may be an artificial intelligence (AI) based planning system implementation tool, a predetermined algorithm tool, a consultation system tool, and/or an evolutionary programming principles tool. Examples of specific and/or general implementation tools include, but are not limited to, a compiler, a program rewriting system tool, a term rewriting system tool, a tree rewriting system tool, a graph transformation system tool, a model transformation system tool, a macro expansion system tool, an aspect-oriented development system tool, a source-to-source translator, a data-type refinement system tool, a program slicing system tool, a program pre-processor, a program comprehension system tool, a program morphing system tool, an algebraic manipulation system tool, and an optimizations system tool.

The implementation unit may select the implementation tool in a variety of ways. For example, the implementation unit selects the implementation for at least one repeating of the loop (e.g., use the same implementation tool(s) for a repeating of the loop). As another example, the implementation unit selects the implementation tool based on the application requirements, the previous implementation result, the current feedback, previously used implementation tools, previous feedback regarding the current implementation of the incremental phase of generating the application code, a number of iterations for which the implementation tool has been used, and/or an availability of implementation tools. As yet another example, the implementation unit selects the implementation tool by consulting an expert system that has captured programming knowledge. As a further example, the implementation unit selects the implementation tool by executing a predetermined implementation tool selection algorithm. As a still further example, the implementation unit selects the implementation tool by based on evolutionary programming principles. As an even further example, the implementation unit selects the implementation tool by an artificial-intelligence-based planning system.

The loop continues at step 300 where the implementation unit generates a current implementation result based on an application of the implementation tool, one or more of the application requirements, one or more of the parameters, and/or the previous implementation. Each of the previous and current implementation results may be a message diagram, a state machine diagram, a state table, a state/event matrix, pseudo code, a structure diagram, a model, a diagram of a modeling language, code in a programming language, an activity diagram, and/or a business process diagram.

The loop continues at step 302 where the implementation unit receives current feedback regarding the current implementation result. The loop continues at step 304 where the implementation unit determines whether the current implementation result is at a desired level of correctness (e.g., is error free, accurately represents the corresponding application requirements, etc.) based on the current feedback. If yes, the implementation unit exits the loop for the current implementation.

When the current implementation result is not at the desired level of correctness, the implementation unit repeats the loop based on the current feedback. For example, the implementation reverts to a previous set (e.g., implementation tools, application requirements, and/or parameters) of generating the current implementation of the incremental phase of generating the application code. As another example, the implementation unit changes the current implementation of the incremental phase of generating the application code (utilizes one or more different implementation tools, adds/deletes/alters one or more of the application requirements, and/or adds/deletes/alters one or more of the parameters). As a further example, the implementation unit revises one or more of the application requirements.

Figure 26:
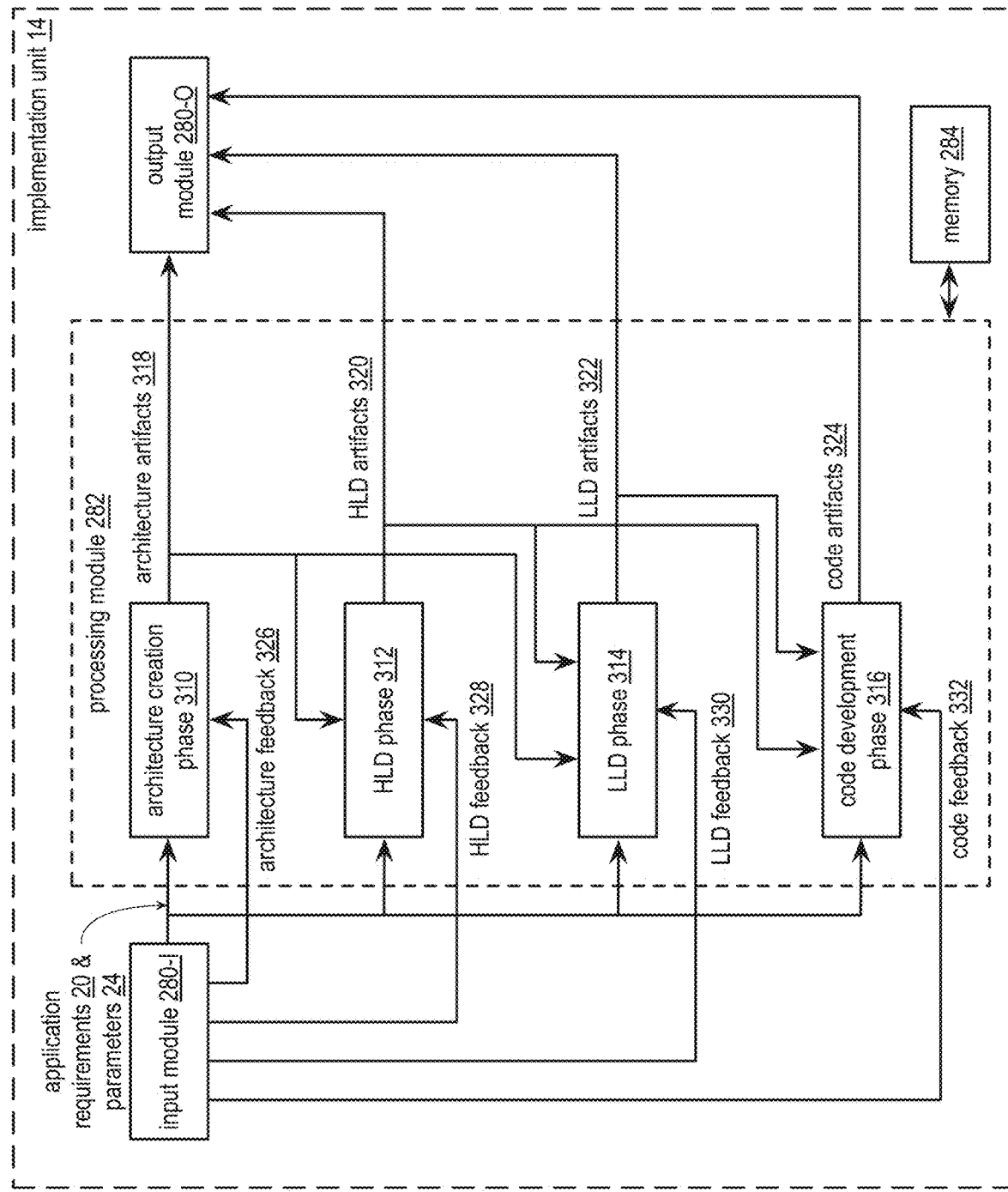
FIG. 26 is a schematic block diagram of another embodiment of an implementation unit in accordance with the present invention.

FIG. 26 is a schematic block diagram of another embodiment of an implementation unit 14 that includes an input module 280-I, an output module 280-O, memory 284, and a processing module 282. The input module 280-I is operable to receive application requirements 20, parameters 24, and feedback from the testing unit and provide them to the processing module 282. The output module 280-O is operable to output the various implementations of the application code.

The processing module 282 is operable to implement the application code in process phases: an architecture level design phase 310, a high-level design (HLD) phase 312, a low-level design (LLD) phase 314, and/or a code development phase 316. During the architecture level design phase, the processing module 282 produces architecture artifacts 318 (e.g., one or more model tests and one or more structure model) based on one or more of the application requirements 20, the parameters 24, and architecture phase feedback 326. The testing unit 16 generates the architecture phase feedback 326 by testing the results corresponding to the development of the architecture artifacts using architecture level test cases.

During the high-level design (HLD) phase, the processing module produces HLD artifacts 320 based on one or more of the architecture artifacts 318, the application requirements 20, the parameters 24, and HLD phase feedback 328. The HLD artifacts 320 include one or more structure models and/or one or more state models. The testing unit 16 generates the HLD feedback 328 by testing the results corresponding to the development of the HLD artifacts using HLD level test cases.

During the low-level design (LLD) phase, the processing module produces LLD artifacts 322 based on one or more of the architecture artifacts 318, the HLD artifacts 320, the application requirements 20, the parameters 20, and LLD phase feedback 330. The LLD artifacts 322 include one or more structure models, one or more state models, one or more behavior models, and/or one or more protocol tests. The testing unit 16 generates the LLD feedback 330 by testing the results corresponding to the development of the LLD artifacts using LLD level test cases.

During the code development phase, the processing module 282 produces code artifacts 324 based on one or more of: the HLD artifacts 320, the LLD artifacts 322, the application requirements 20, the parameters 24, and code development phase feedback 332. The code artifacts 324 include one or more user codes, one or more application codes, and/or one or more integration tests. The testing unit 16 generates the code feedback 332 by testing the results corresponding to the development of the code artifacts using code level test cases.

FIG. 27 is a schematic block diagram of an embodiment of a testing unit 16 that includes one or more input/output (IO) modules 450, a processing module 452, and memory 454. The processing module 452 may be a single processing device or multiple processing devices as previously defined. The IO module(s) 450 provide connectivity to another computing entity, to a LAN, and/or to a WAN. One or more of the IO modules receives the application requirements 20, the parameters 24, and the application code 26 and outputs the test feedback 32. Note that the testing unit 16 may be incorporated in a computing entity, which may be a stand-alone computer, may be a portion of a computer (e.g., a computer includes a plurality of computing entities), and/or may be a plurality of computers. Further note that a computer may be discrete device and/or be a cloud computing device.

FIG. 28 is a logic diagram of an embodiment of a method that may be executed by a testing unit 16. The method begins at step 360 where the testing unit receives application requirements. The method continues at step 362 where the testing unit receives a plurality of implementation results of application code as the application code is being developed. The receiving of application requirements and implementation results may be done in an iterative and repetitive manner, which corresponds to the iterative and repetitive manner of developing the application code.

The method continues at step 364 where the testing unit tests the implementation results of the application code as the application code is being developed based on the application requirements. For a current implementation result, the method continues at step 370 where the testing unit generates at least one test case based on one or more of the application requirements. In general, a test case includes one or more input stimuli and one or more expected output results corresponding to the input stimuli.

The generation of the test case may include converting the test case into a level of abstraction corresponding to the current implementation result to produce at least one converted test case. The level of abstraction corresponding to the current implementation includes an abstraction corresponding to an architecture level design process phase, a high-level design (HLD) process phase, a low-level design (LLD) process phase, and/or a code development process phase. The generation of the test case may further include converting the converted test case into a suitable format to exercise the application code to produce the at least one test case.

The method continues at step 372 where the testing unit stimulates the current implementation result based on the test case to produce a current application system response. The method continues at step 374 where the testing unit compares observed behavior of the current application system response with prescribed behavior of the test case. The method continues at step 376 where the testing unit generates feedback (e.g., code implementation feedback that indicates whether the current implementation result is at a desired level of corrections and application requirement feedback) based on the comparing of the observed behavior of the current application system response with the prescribed behavior of the at least one test case. This may include generating a description of deviations of the observed behavior of the current application system response from the prescribed behavior of the at least one test case and generating the feedback based on the description.

Figures 29, 30, 31, 32:
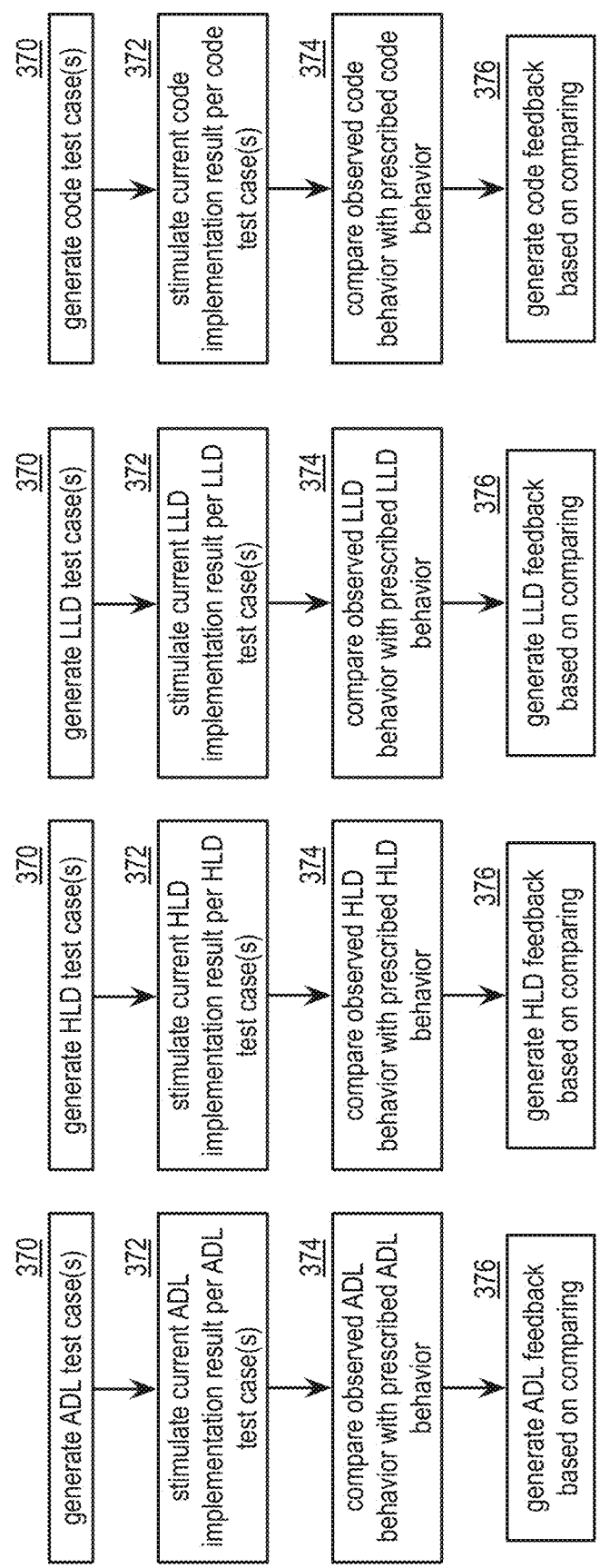
FIG. 29 is a logic diagram of another embodiment of a method that may be executed by a testing unit in accordance with the present invention.
FIG. 30 is a logic diagram of another embodiment of a method that may be executed by a testing unit in accordance with the present invention.
FIG. 31 is a logic diagram of another embodiment of a method that may be executed by a testing unit in accordance with the present invention.
FIG. 32 is a logic diagram of another embodiment of a method that may be executed by a testing unit in accordance with the present invention.

FIG. 29 is a logic diagram of another embodiment of a method that may be executed by a testing unit for testing developing application code at the architecture level design (ALD) process phase. The method begins at step 370 where the testing unit generates at least one ALD test case (which includes one or more model test artifacts) based on one or more of the application requirements. The method continues at step 372 where the testing unit stimulates the current ALD implementation result based on the ALD test case to produce a current ALD application system response. The method continues at step 374 where the testing unit compares observed behavior of the current ALD application system response with prescribed behavior of the ALD test case. The method continues at step 376 where the testing unit generates ALD feedback based on the comparing of the observed behavior of the current ALD application system response with the prescribed behavior of the at least one ALD test case.

FIG. 30 is a logic diagram of another embodiment of a method that may be executed by a testing unit for testing developing application code at the high level design (HLD) process phase. The method begins at step 370 where the testing unit generates at least one HLD test case (which includes one or more sanity test artifacts) based on one or more of the application requirements. The method continues at step 372 where the testing unit stimulates the current HLD implementation result based on the HLD test case to produce a current HLD application system response. The method continues at step 374 where the testing unit compares observed behavior of the current HLD application system response with prescribed behavior of the HLD test case. The method continues at step 376 where the testing unit generates HLD feedback based on the comparing of the observed behavior of the current HLD application system response with the prescribed behavior of the at least one HLD test case.

FIG. 31 is a logic diagram of another embodiment of a method that may be executed by a testing unit for testing developing application code at the low level design (LLD) process phase. The method begins at step 370 where the testing unit generates at least one LLD test case (which includes one or more protocol test artifacts) based on one or more of the application requirements. The method continues at step 372 where the testing unit stimulates the current LLD implementation result based on the LLD test case to produce a current LLD application system response. The method continues at step 374 where the testing unit compares observed behavior of the current LLD application system response with prescribed behavior of the LLD test case. The method continues at step 376 where the testing unit generates LLD feedback based on the comparing of the observed behavior of the current LLD application system response with the prescribed behavior of the at least one LLD test case.

FIG. 32 is a logic diagram of another embodiment of a method that may be executed by a testing unit for testing developing application code at the code level design (CODE) process phase. The method begins at step 370 where the testing unit generates at least one CODE test case (which includes one or more platform test artifacts) based on one or more of the application requirements. The method continues at step 372 where the testing unit stimulates the current CODE implementation result based on the CODE test case to produce a current CODE application system response. The method continues at step 374 where the testing unit compares observed behavior of the current CODE application system response with prescribed behavior of the CODE test case. The method continues at step 376 where the testing unit generates CODE feedback based on the comparing of the observed behavior of the current CODE application system response with the prescribed behavior of the at least one CODE test case.

Figure 33:
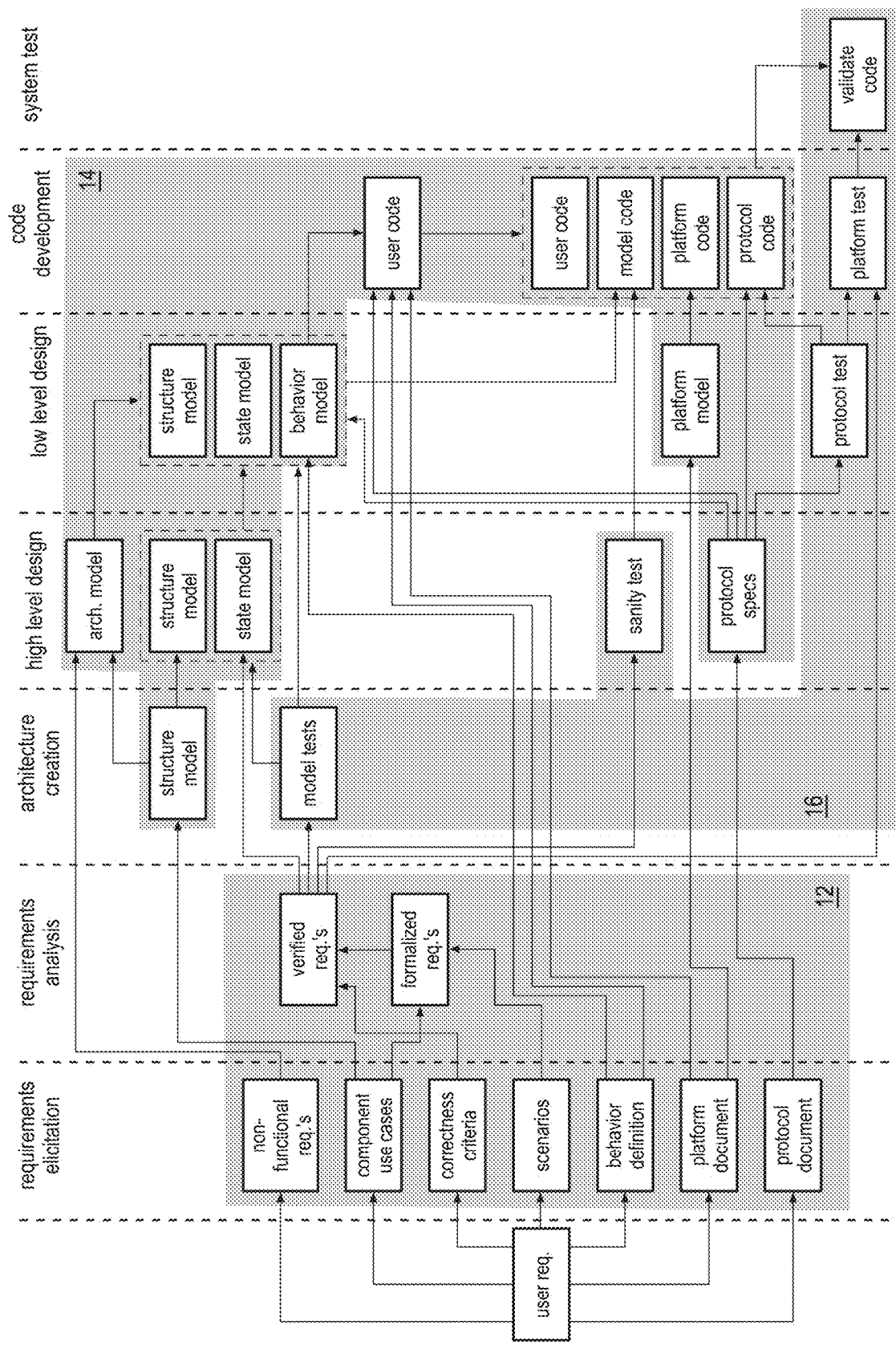
FIG. 33 is a diagram of another embodiment of a system in accordance with the present invention.

FIG. 33 is a diagram of an embodiment of the system 10 (i.e., the requirements unit 12, the implementation unit 14, and the testing unit 16) overlaid on illustrative process phases leveraged in a typical system development process. The process phases include requirements elicitation, requirements analysis, architecture level design, high-level design, low-level design, code development, and system test. Relating the units of the system 10 to the function levels, the requirements conversion module 40 of the requirements unit 12 facilitates the requirements elicitation; the verification module 42 of the requirements unit 12 facilitates the requirements analysis; the implementation unit 14 facilitates the architecture level design, the high-level design, the low-level design, and code development; and the testing unit 16 facilitates the system test, as well as any other testing steps applied during the development process.

Each of the illustrative phases yields one or more artifacts during application code development. For instance, requirements elicitation may yield artifacts such as nonfunctional requirements, component use cases, scenarios, correctness criteria, behavior definitions, platform documents, and/or data definitions. Requirements analysis may yield artifacts such as formalized requirements and/or verified requirements (e.g., application system state transitions (ASST)). The architecture level design phase may yield artifacts such as model tests and/or structure models (e.g., composite structure diagrams (CSD)). The high-level design phase may yield artifacts such as structure models and state models (e.g., composite structure diagrams, state machine diagrams (SM)), architecture model(s), protocol specification(s), and/or design tests (e.g., sanity test). The low-level design phase may yield artifacts such as structure models, state models, & behavior models (e.g., detailed composite structure diagrams state machine diagrams, data structure definitions (DD), etc.), platform model(s), and/or protocol tests. The code development phase may yield artifacts such as user code, application code (e.g., user code, model code, platform code, and/or protocol code), and/or integration tests.

The system 10 may initially receive requirements as client, or user, inputs, which are typically in a form familiar to the client (e.g., utilizing client specific languages or client specific notations) and may not be in an industry standard format. For example, client inputted requirements may be in a form including, but not limited to, narratives, drawings, process flow diagrams, flowcharts, communication protocol documents, internal standards, stylized natural language, etc.

Alternatively, the system may obtain (e.g., receive, generate, retrieve, etc.) inputted requirements in a desired format, (e.g., as message sequence charts (MSCs), as flow charts, as state tables, as conditionals, etc.) and/or convert client inputted requirements into the desired format of the inputted requirements. The inputted requirements include, but are not limited to, non-functional requirements (e.g., statements about the application system such as performance levels, availability, reliability, etc.); component use cases (e.g., definitions of the interaction between a component of the desired application code and a user that is outside of the application system to achieve a specific goal); correctness criteria (e.g., the application requirements should not create a safety violation, etc.); scenarios (e.g., a narrative description of (an) interaction(s) between one or more users (external to the application system and/or within the application system) and the application system (i.e., the desired application code) during normal or abnormal use of the application system); behavior definitions (e.g., high-level descriptions of how the application system is to meet an objective, produce a desired result, process a given input, etc.); platform documentation (e.g., descriptions of one or more of the underlying hardware and target environment on which the application system shall be operational, the software framework, operating system, programming language, graphical user interface, and runtime libraries, etc.) and/or data definitions (i.e., protocol document) (e.g., specifications of the messages and/or commands that will be sent to the application system or which will be emitted by the application system).

During implementation, the system uses the application requirements to generate the application system architecture as well as the application system behavior descriptions. It further generates platform aspects to accommodate the physical nature of the platform upon which the application system shall be operational. The system further generates application code. For all of these artifacts, the system produces tests from the application requirements, which establish, when executed, whether the given artifact properly realizes the inputted user requirements.

The client requirements may also include additional functional requirements, performance requirements, architectural requirements, etc., and may be received from the client in one or more forms (e.g., prose table, operational tables, timing diagrams, architecture constraints, logical constructs, state tables, message sequence charts, etc.), examples of which are illustrated in FIGS. 41-50.

Figure 34:
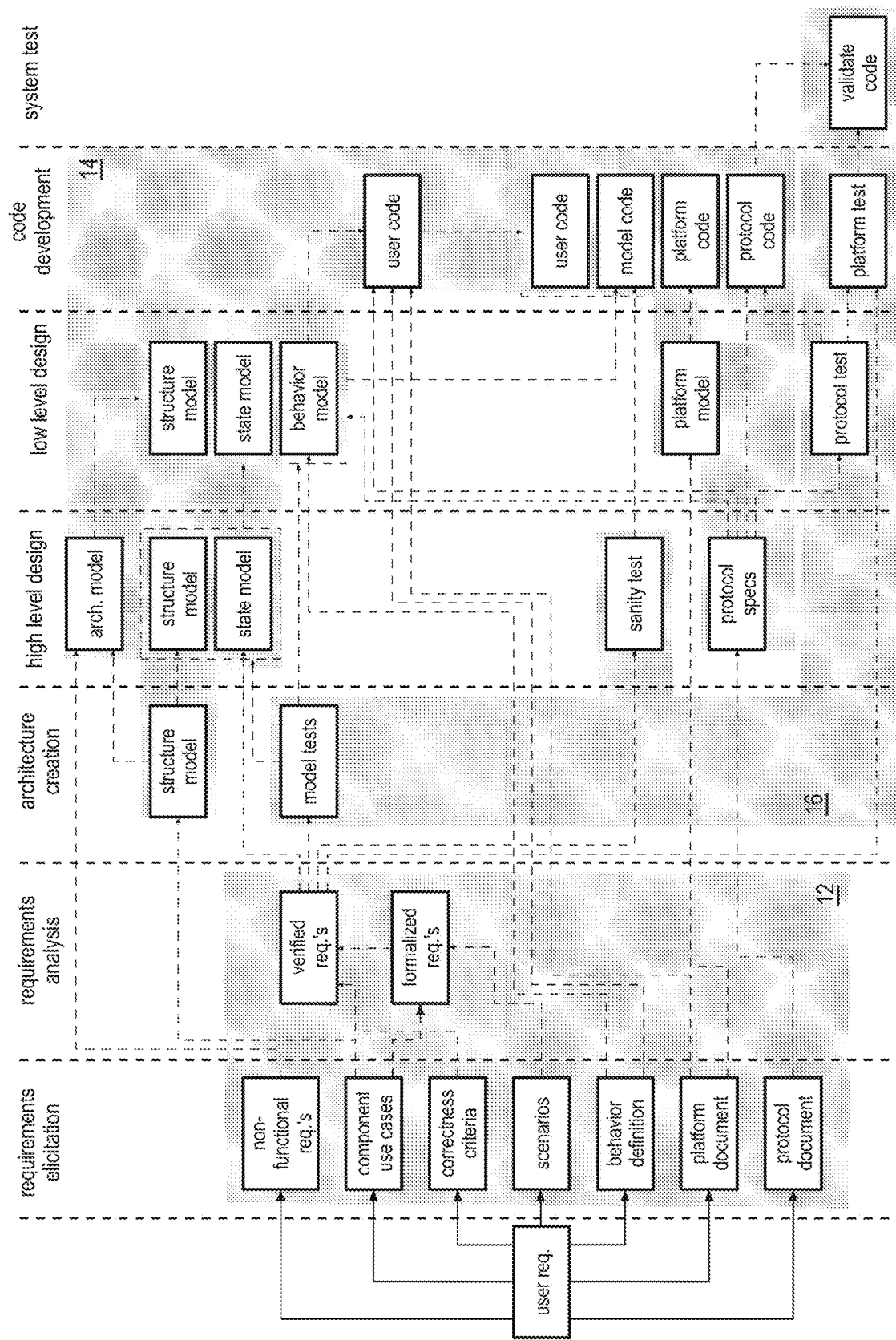
FIGS. 34-39 are diagrams of functional levels of the system of FIG. 33 in accordance with the present invention.

FIG. 34 highlights the requirements elicitation phase of FIG. 33. In this phase, the requirements unit 12 is active to establish inputted requirements from user requirements. In particular, the system 10 receives user requirements as client, or user, inputs, which are typically in a form familiar to the client (e.g., utilizing client specific languages or client specific notations) and may not be in an industry standard format, which would then be converted into an industry standard form. Alternatively, the system may obtain (e.g., receive, generate, retrieve, etc.) inputted requirements in a desired format, (e.g., as message sequence charts (MSCs), as flow charts, as state tables, as conditionals, etc.). The inputted requirements include, but are not limited, to non-functional requirements, component use cases, correctness criteria, scenarios, behavior definitions, platform documentation, and/or data definitions.

Figure 35:
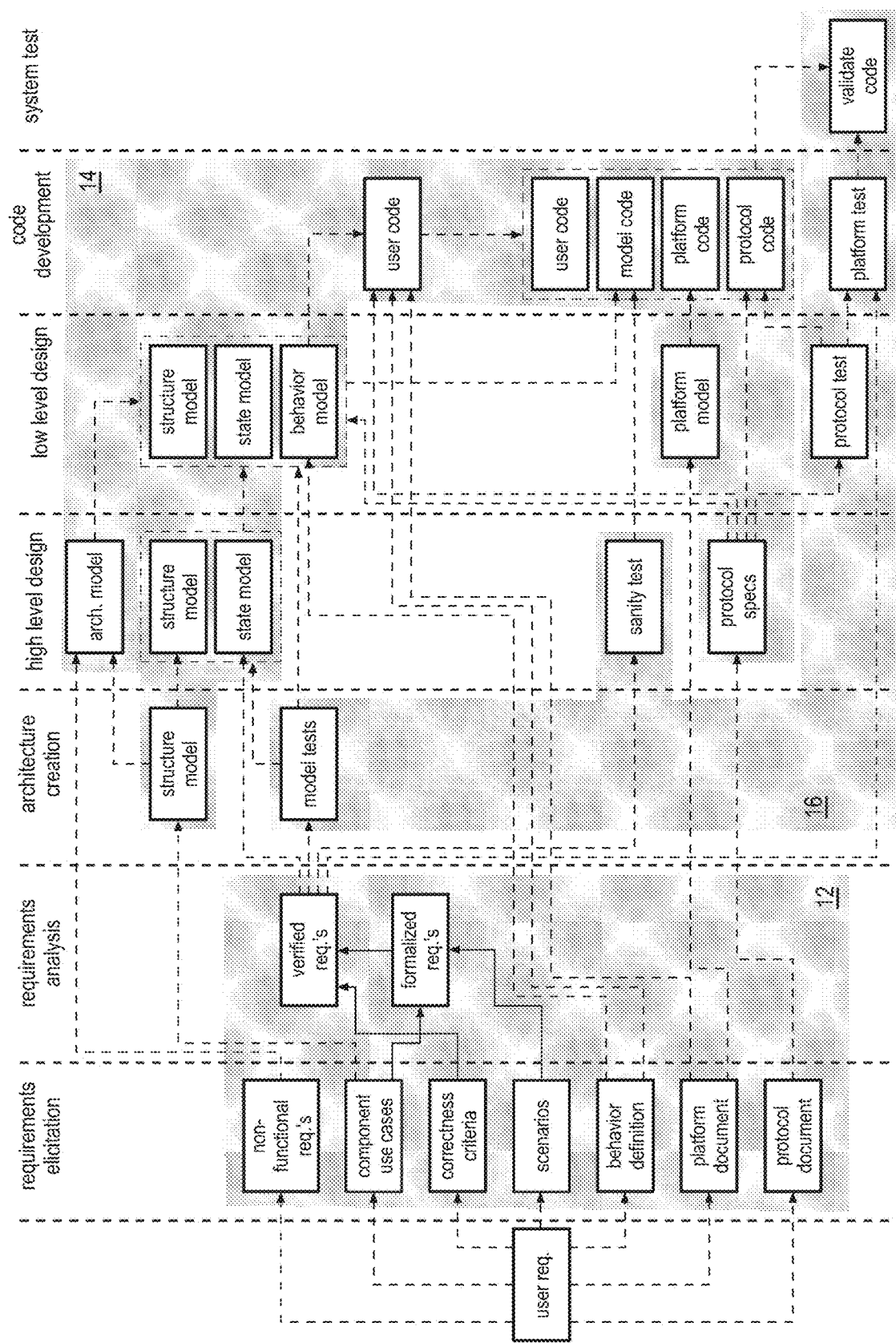

FIG. 35 highlights the requirements analysis phase of FIG. 33. In this phase, the requirements unit 12 is active to establish application requirements (e.g., application system state transitions) as verified requirement artifacts. To do so, the requirements unit 12 processes the component use cases and scenarios to generate formalized requirements (e.g., outputs of the requirements conversion module 21). The requirements unit 12 then verifies the formalized requirements (e.g., via the verification module 23 and the analysis module 25) to produce the verified requirements (i.e., the application requirements).

Figure 36:
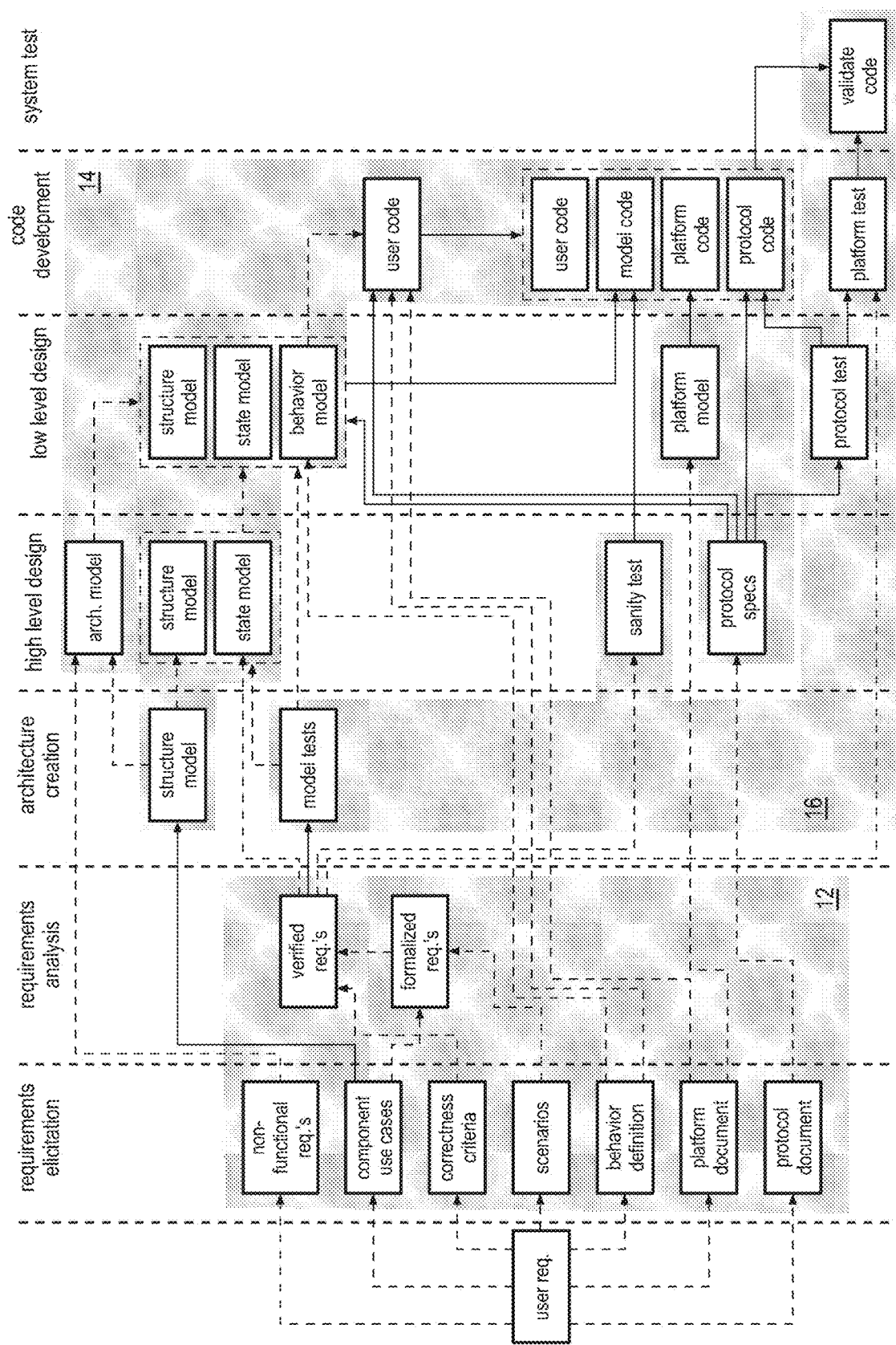

FIG. 36 highlights the architecture level design phase of FIG. 33. In this phase, the requirements unit 12, the implementation unit 14, and the testing unit 16 are active. The implementation unit 14 generates architecture level structure models from the component use cases of the inputted requirements. The testing unit 16 generates corresponding model tests based on the verified requirements (e.g., the application requirements).

Figure 37:
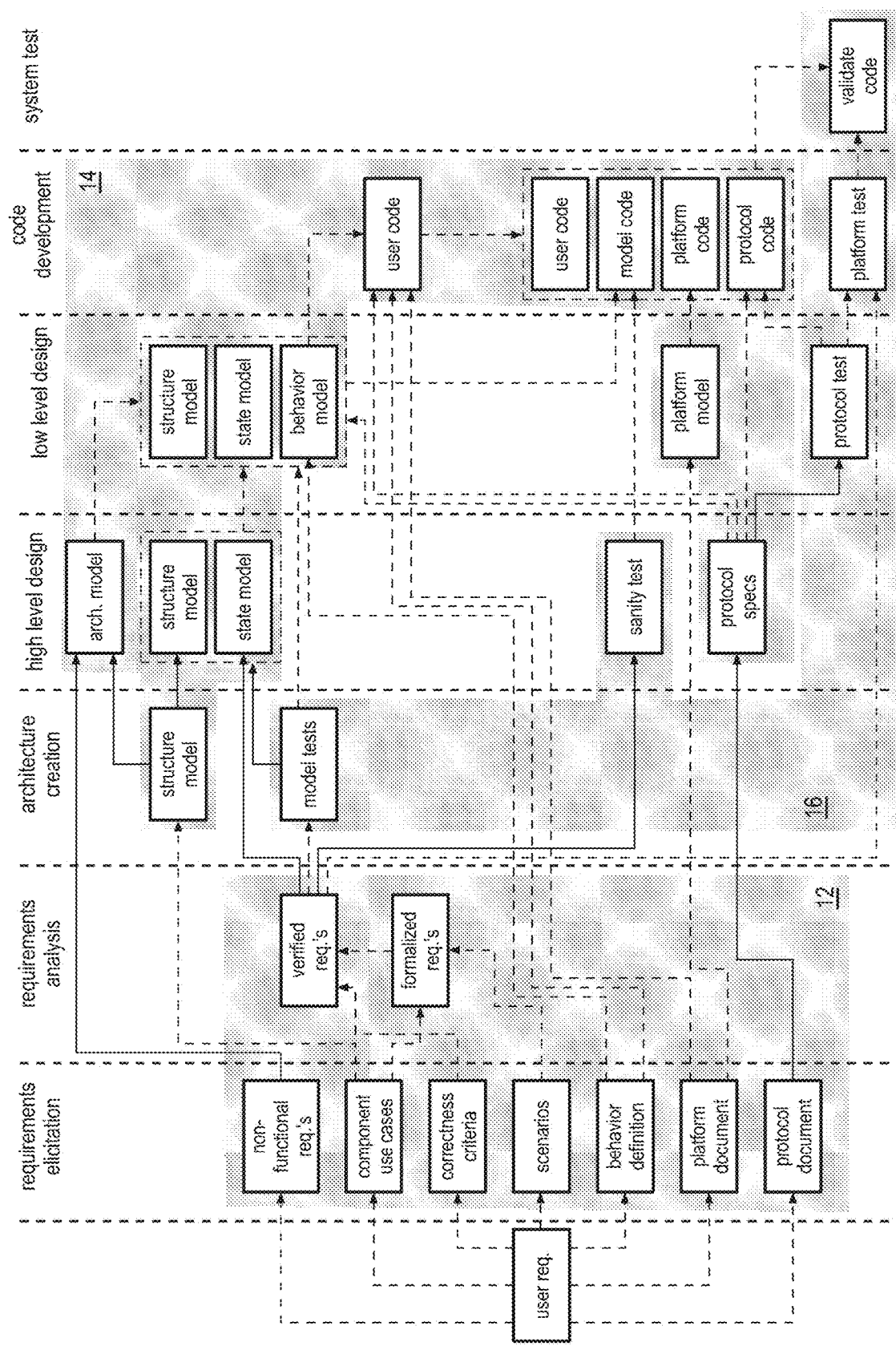

FIG. 37 highlights the high level design (HLD) phase of FIG. 33. In this phase, the requirements unit 12, the implementation unit 14, and the testing unit 16 are active. The implementation unit 14 generates an architecture model from the nonfunctional requirements of the inputted requirements and the architecture level structure models. The implementation unit 14 also generates HLD structure models from the architecture level structure models. The implementation unit 14 further generates HLD state models from the architecture level model tests and the verified requirements (e.g., the application requirements). The implementation unit 14 still further generates platform models from the platform documents. The testing unit 16 generates corresponding sanity tests based on the verified requirements.

Figure 38:
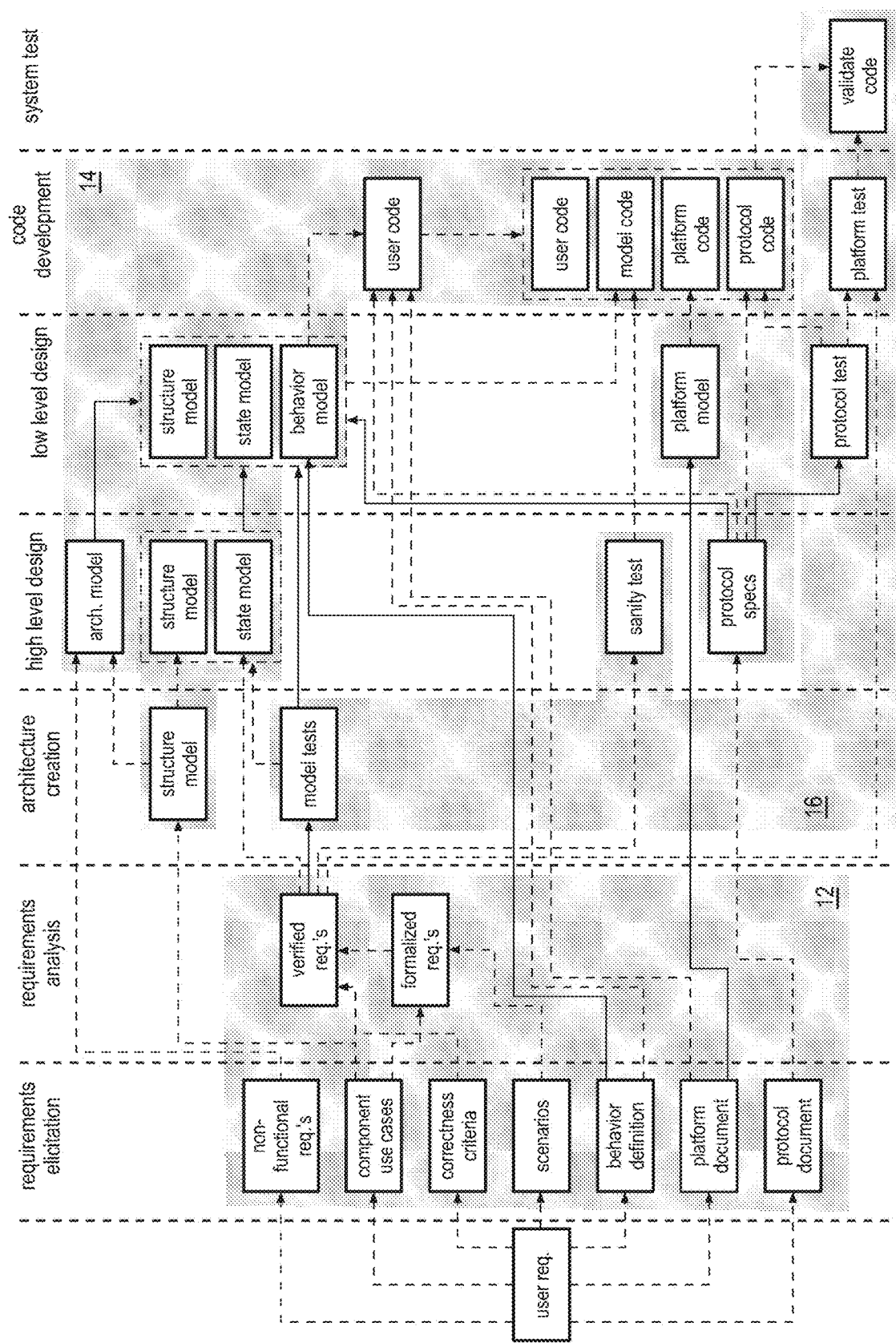

FIG. 38 highlights the low level design (LLD) phase of FIG. 33. In this phase, the requirements unit 12, the implementation unit 14, and the testing unit 16 are active. The implementation unit 14 generates LLD structure models from the architecture model. The implementation unit 14 also generates LLD structure models from the HLD structure models. The implementation unit 14 further generates behavior models from the behavior definition of the inputted requirements. The implementation unit 14 still further generates platform models from the platform documentation of the inputted requirements. The testing unit 16 generates corresponding protocol tests based on the protocol specification.

Figure 39:
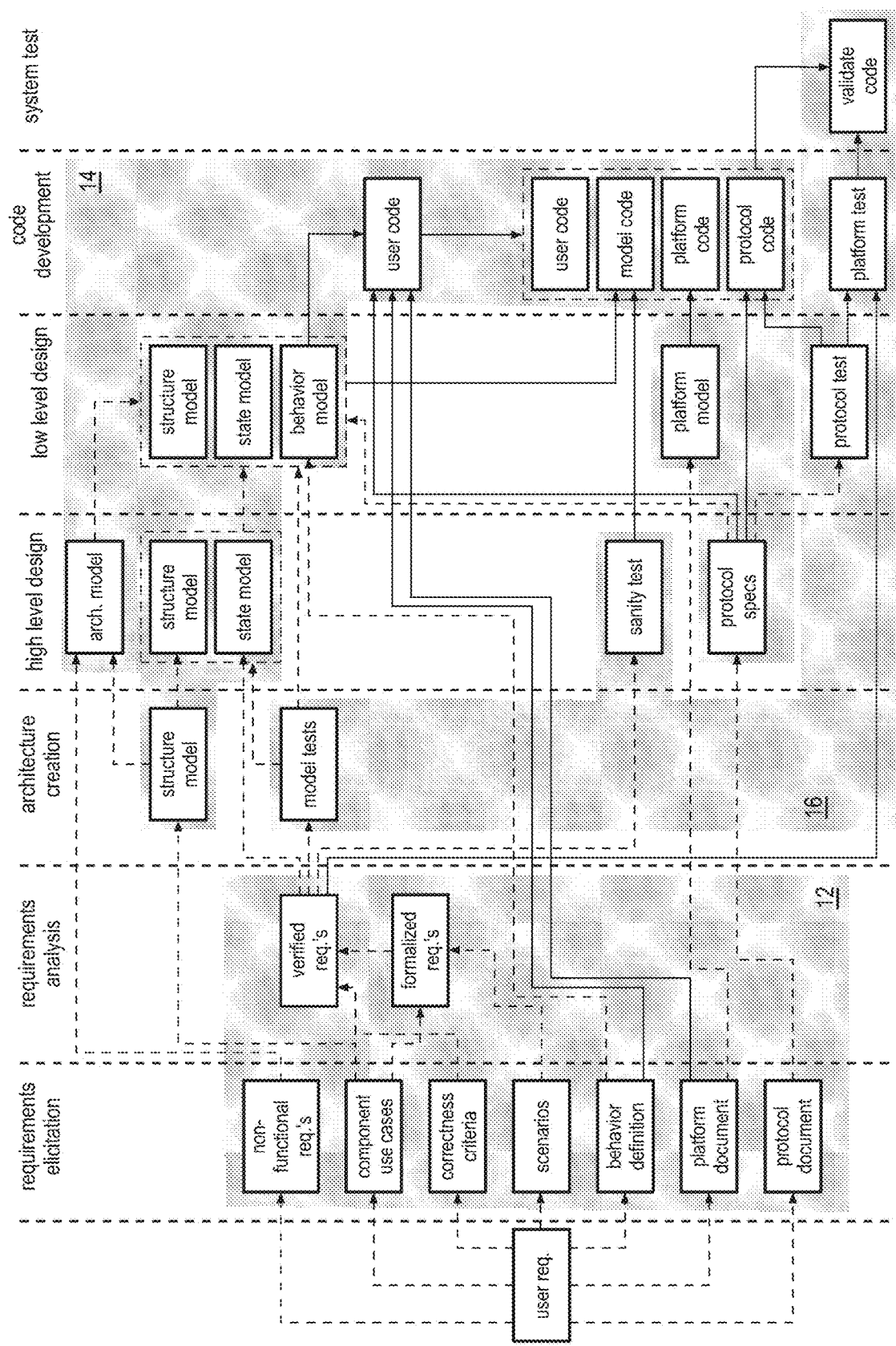

FIG. 39 highlights the code level design (CODE) phase of FIG. 33. In this phase, the requirements unit 12, the implementation unit 14, and the testing unit 16 are active. The implementation unit 14 generates a first type of user code based on the behavior models, the protocol specifications, the behavior definitions, and the platform documentation. The implementation unit 14 also generates a second type of user code from the first type of user code. The implementation unit 14 further generates model code based on feedback of the sanity test and one or more of the LLD structure models, the LLD state models, and one or more of the behavior models. The implementation unit 14 still further generates platform code based on the platform models. The implementation unit 14 yet further generates protocol code based on the protocol specifications and feedback of the protocol test. The testing unit 16 generates corresponding platform tests based on the protocol tests and the verified requirements.

FIGS. 40-61 are diagrams of an example of generation application code from input requirements for a traffic light control system for a downtown area of a city. The example begins at FIG. 40, which illustrates a diagram of a street map of a traffic light control system. The street map illustrates a system of streets including east/west streets (e.g., $1^{st}$ street, $2^{nd}$ Street, $3^{rd}$ Street, . . . , nth Street), north/south streets (e.g., Main Street, State Street, etc.), and intersections of the east/west streets and north/south streets.

The streets support vehicular traffic of private vehicles (e.g., personal cars and trucks) and commercial vehicles (e.g., delivery trucks, 18-wheel trucks, etc.). The timing of transport activity may vary as a function of one or more factors including but not limited to time of day, work schedules, day of week, holidays, and/or special scenarios (e.g., emergency vehicle traffic, concerts, sporting events, etc.). The transport activity of the plurality of vehicles may be observable as traffic patterns (e.g., minimum, maximum, mean, median amounts of vehicles per unit of time at a particular time of day, on a section of a street, heading in a direction, vehicular velocity, density of vehicles per unit of distance, etc.).

Some factors may have a more pronounced impact on traffic patterns. For example, traffic due to a common workday schedule may introduce higher volumes of traffic at one time of day (e.g., morning rush 6 AM-9 AM) in a direction (e.g., north to south) and along a path from an area where a high volume of people live to an area where the high volume of people are employed. In another example, traffic due to a common workday schedule may introduce higher volumes of traffic at one time of day (e.g., evening rush 3 PM-6 PM) in a direction (e.g., south to north) and along a path from an area where a high volume of people are employed to an area where the high volume of people live.

In this example of a traffic light control system, typical client requirements (e.g., from a department of transportation) may be to develop the traffic light control system to safely optimize traffic flow based on the factors that affect the traffic patterns. For example, the client requirements may include minimizing traffic build up (e.g., density of vehicles per unit of distance) at one or more intersections due to the morning rush and/or the evening rush traffic pattern factors. For example, the goal may be to minimize traffic build up at and/or around the intersection of Main Street and $2^{nd}$ Street, Main Street and $3^{rd}$ Street, State Street and $2^{nd}$ Street, and State Street and $3^{rd}$ Street due to the morning rush and evening rush traffic pattern factors.

The client requirements may also include additional functional requirements, performance requirements, architectural requirements, etc. and may be received from the client in one or more forms (e.g., prose table, operational tables, timing diagrams, architecture constraints, logical constructs, state tables, message sequence charts, etc.), examples of which are illustrated in FIGS. 41-50.

In this example, the client requirements require the traffic light control system to control a plurality of traffic lights to achieve a desired traffic flow pattern. For instance, the traffic light control system may favor longer green light cycles for traffic moving in the direction of the morning rush and/or the evening rush. As a more specific example, the traffic light control system favors longer green light cycles for traffic moving in the north to south direction during the morning rush time period and favors longer green light cycles for traffic moving in the south to north direction during the evening rush time period.

The traffic light control system may also coordinate control of the plurality of traffic lights at two or more intersections to further optimize the desired traffic flow pattern. For example, the traffic light control system may stagger the green lights to keep vehicles moving. For instance, the traffic light control system enable green lights at several intersections such that a vehicle moving at a posted speed limit passes through multiple intersections without getting stopped by a red light.

Figures 40, 41:
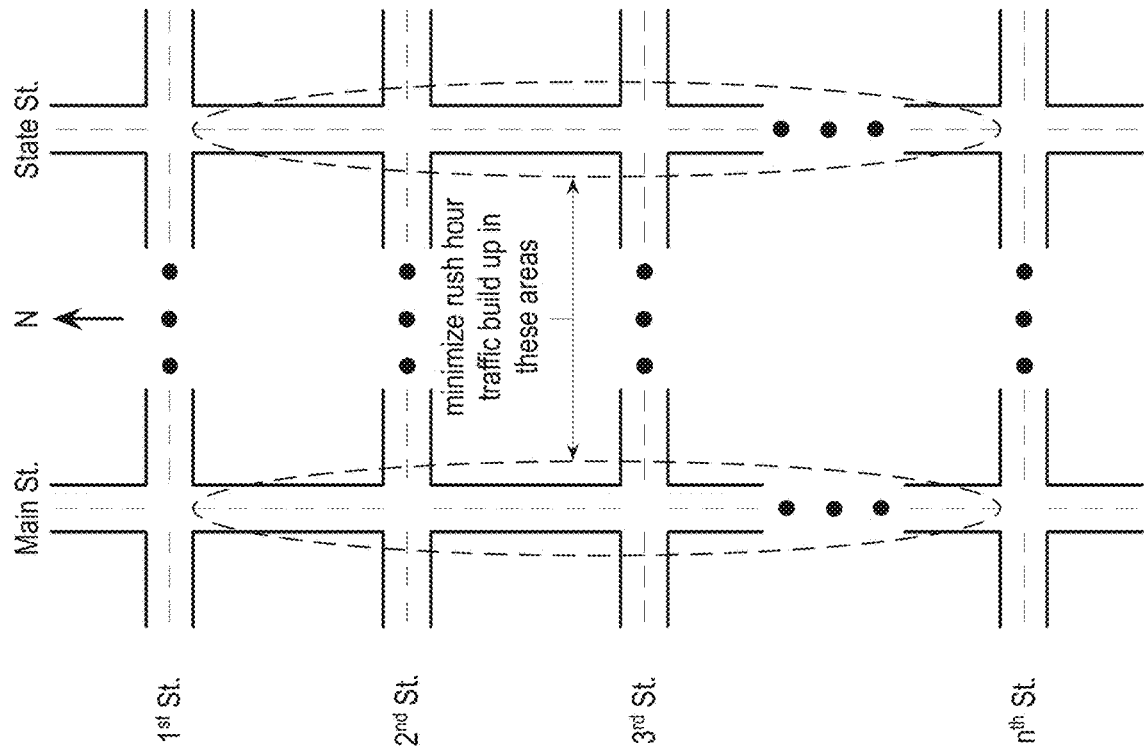

FIG. 41 is a diagram of an example of an operational table that includes one or more operational elements based on a time constraint. An operational element specifies an inputted requirement for the traffic light control system and may be tied to a time constraint. For instance, an operational element may be one or more of, but not limited to, actions, predeterminations, priorities, preferences, and/or any other guidance to comply with a client requirement. In this example, the traffic light control system is required to exhibit the behavior indicated by the operational elements in accordance with time constraints, which may be expressed as day of the week, time of day, and/or time duration.

As shown in the table, the day of the week may be expressed as a weekday (e.g., Monday through Friday) or as a weekend (e.g., Saturday and Sunday). As is also shown in the table, the time of day may be expressed as early morning (e.g., 4 AM-6 AM), morning rush (e.g., 6 AM-9 AM), mid-day (e.g., 9 AM-3 PM), evening rush (3 PM-6 PM), evening (6 PM-11 PM), and/or night (11 PM-4 AM).

As a specific example of an operational element, during the early morning, mid-day, and evenings of weekdays, the traffic light control system is required to exhibit the behavior where the north south traffic is given a dominant priority over the east west traffic (e.g., longer green light cycles for north south and shorter green light cycles for east west) and where the north to south and south to north directions have equal priority. As another example, during weekday morning rush hour, the traffic light control system is required to exhibit the behavior where the north to south traffic is given a priority over all other directions. Note that this is consistent with the client requirement to minimize traffic build up at and/or around the intersection of Main Street and $2^{nd}$ Street, Main Street and $3^{rd}$ Street, State Street and $2^{nd}$ Street, and State Street and $3^{rd}$ Street due to the morning rush.

As another example, the traffic light control system is required to exhibit the behavior where the south to north traffic is given a priority over all other directions for the weekday evening rush time period. Note that this is consistent with the client requirement to minimize traffic build up at and/or around the intersection of Main Street and $2^{nd}$ Street, Main Street and $3^{rd}$ Street, State Street and $2^{nd}$ Street, and State Street and $3^{rd}$ Street due to evening rush hour traffic. Other examples of operational elements should be apparent from the table and may include further examples (not shown) for special scenarios such as emergency vehicle or sporting event exceptions.

Figure 42:
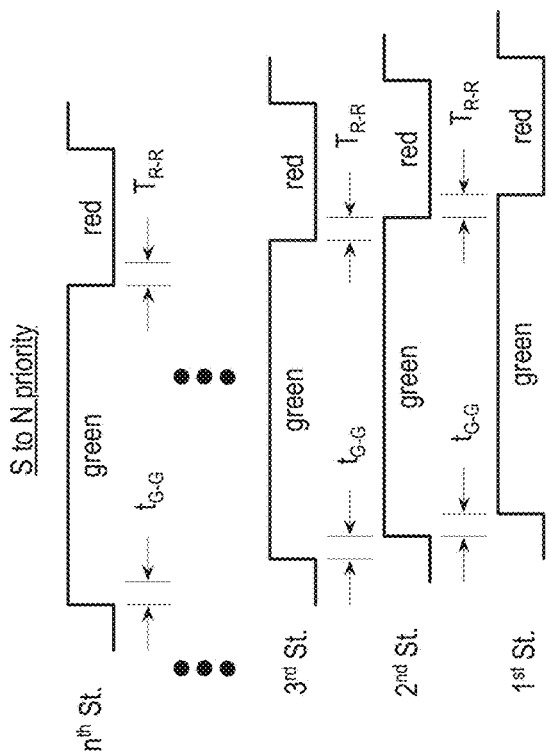

FIG. 42 is a timing diagram of the morning rush hour traffic light sequencing in the example traffic light control system. The timing diagram includes diagrams for Main Street and/or State Street at each of the east-west streets (e.g., $1^{st}$ street, $2^{nd}$ Street, $3^{rd}$ Street, etc to an nth Street). The individual diagrams indicate that (for the north to south traffic on Main Street and/or State Street) the green cycle is favored over the red cycle. The diagrams further indicate that the enabling of a green red cycle from intersection to intersection is staggered to promote the flow of traffic. For instance, $t_{G-G}$ is the time period between the initiation of a green light cycle at a first intersection (e.g., $1^{st}$ Street) and the initiation of a green light cycle at the next intersection (e.g., $2^{nd}$ Street), where $t_{G-G}$ corresponds to the time period it takes a vehicle being operated at the posted speed limit to travel from one intersection to the next. Note that $t_{G-G}$ may be determined uniquely for each intersection to the next (e.g., from the second intersection to a third intersection, etc.).

The timing diagrams also indicate that the red cycle from intersection to intersection is staggered to promote traffic flow. For instance, $T_{R-R}$ is the time period between the initiation of a red light cycle at one intersection (e.g., $1^{st}$ Street) and the initiation of a red light cycle at the next intersection (e.g., $2^{nd}$ Street), where $T_{R-R}$ is the time period it takes a vehicle being operated at the posted speed limit to travel from the first intersection to the second intersection. Note that $T_{R-R}$ may be determined uniquely for each intersection. Further note that hysteresis is assumed when a traffic light is transitioning from red to green.

Figure 43:
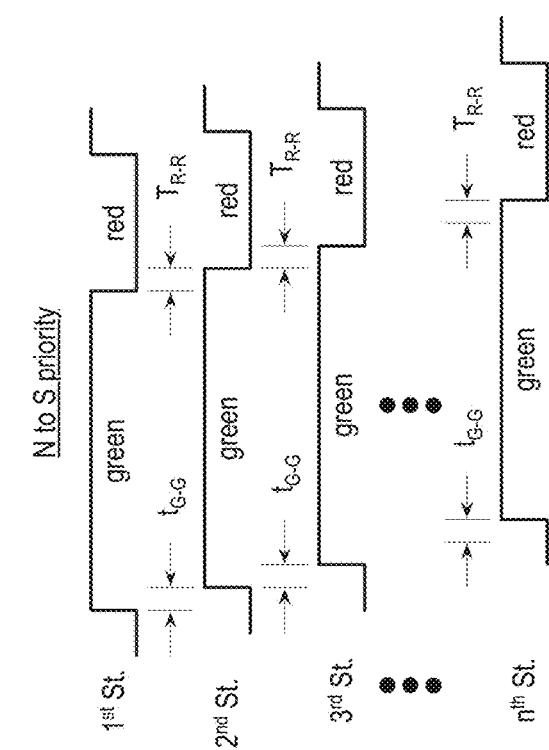

FIG. 43 is a timing diagram of the evening rush hour traffic light sequencing in the example traffic light control system. The timing diagram includes diagrams for Main Street and/or State Street at each of the east-west streets (e.g., $1^{st}$ street, $2^{nd}$ Street, $3^{rd}$ Street, etc to an nth Street). The individual diagrams indicate that (for the south to north traffic on Main Street and/or State Street) the green cycle is favored over the red cycle. The diagrams further indicate that the enabling of a green red cycle from intersection to intersection is staggered to promote the traffic flow from south to north. For instance, $t_{G-G}$ is the time period between the initiation of a green light cycle at a first intersection (e.g., $n^{th}$ Street) and the initiation of a green light cycle at the next intersection (e.g., n–1 Street), where $t_{G-G}$ corresponds to the time period it takes a vehicle being operated at the posted speed limit to travel from one intersection to the next. Note that $t_{G-G}$ may be determined uniquely for each intersection to the next (e.g., from the second intersection to a third intersection, etc.).

The timing diagrams also indicate that the red cycle from intersection to intersection is staggered to promote traffic flow from south to north. For instance, $T_{R-R}$ is the time period between the initiation of a red light cycle at one intersection (e.g., nth Street) and the initiation of a red light cycle at the next intersection (e.g., n–1 Street), where $T_{R-R}$ is the time period it takes a vehicle being operated at the posted speed limit to travel from the first intersection to the second intersection. Note that $T_{R-R}$ may be determined uniquely for each intersection. Further note that hysteresis is assumed when a traffic light is transitioning from red to green.

Figure 44:
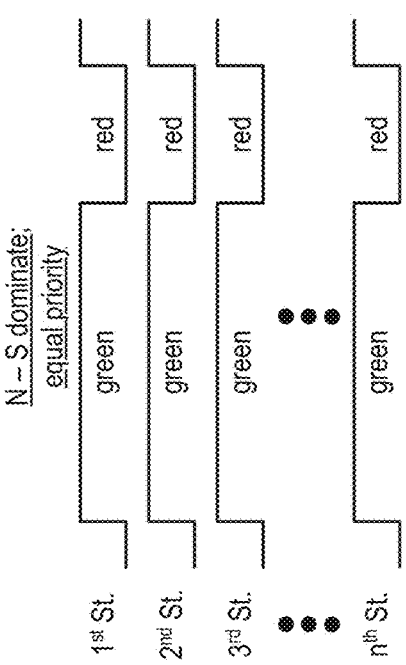

FIG. 44 is a timing diagram of the early morning, mid-day, and evening traffic light sequencing in the example traffic light control system. The timing diagram includes diagrams for Main Street and/or State Street at each of the east-west streets (e.g., $1^{st}$ street, $2^{nd}$ Street, $3^{rd}$ Street, etc to an nth Street). The individual diagrams indicate that (for the south to north traffic on Main Street and/or State Street) the green cycle is favored over the red cycle. The diagrams further indicate that the enabling of a green red cycle from intersection to intersection is not staggered to promote equal north-to-south and south-to-north traffic flow.

Figure 45:
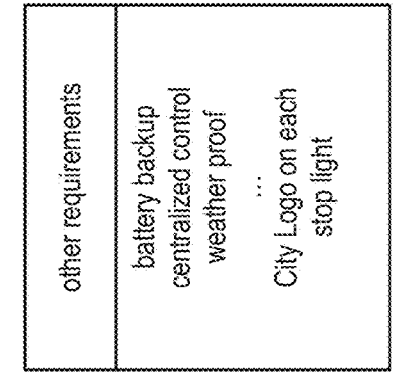

FIG. 45 is a table of other requirements of the example traffic light control system. In general, other requirements for the system may include physical characteristics (e.g., shape, size, weight, color, orientation, material composition, etc.), service life (e.g., time period prior to retirement), reliability (e.g., error rates, failure rates, mean time to failure rates, uptime), serviceability (e.g., mean time to repair), functional operation, performance level, etc.

In this example, the other requirements include battery backup, centralized control (e.g., vs. autonomous), and/or weather proof, and other functional operations and/or performance levels of the traffic light control system. Other requirements may not affect the performance and/or operation of the system. As shown in this example, the other requirements include the City Logo on each stoplight. As such, to generate software from the requirements, the functional requirements (e.g., performance, operational, etc.) are separated from the non-performance requirements (e.g., logos).

Figure 46:
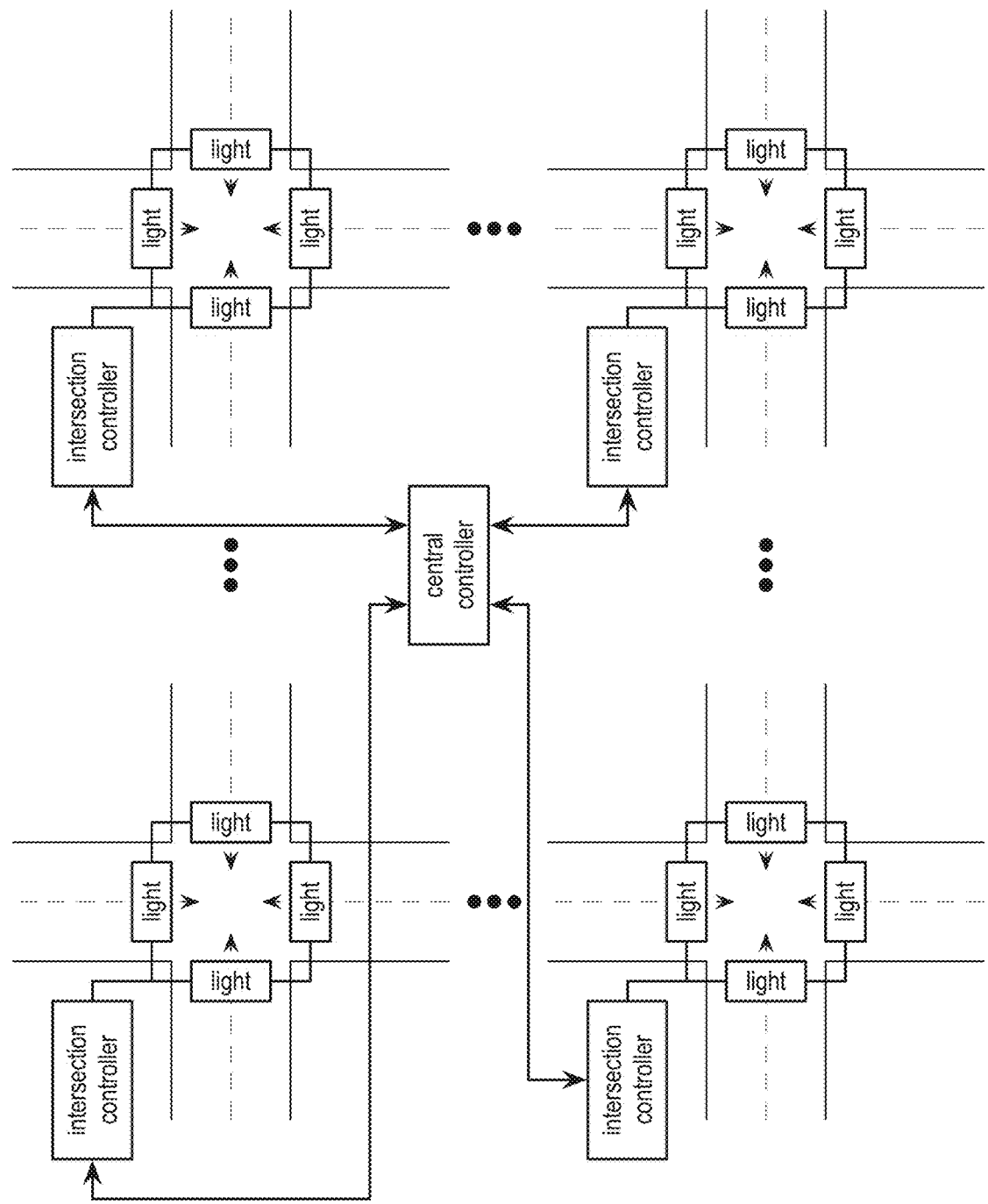

FIG. 46 is a schematic block diagram of the example traffic light control system at four intersections. The traffic light control system includes a central controller and, at each intersection, an intersection controller and four traffic lights. The central controller coordinates the overall traffic pattern by controlling the actions of the plurality of intersection controllers. For example, the central controller may instruct one or more intersection controllers to enable a green light for north to south traffic and a red light for east-west for time interval $t_{G-G}$ in accordance with one or more of the traffic patterns discussed with reference to FIGS. 58-60.

In accordance with control signals from the central controller, an intersection controller controls the traffic light pattern of its four traffic lights. For example, the intersection controller may instruct the pair of east west traffic light modules to display a steady red signal and instructs the pair of north south traffic light modules to display a steady green signal. In another example, the intersection controller may instruct the pair of east west traffic light modules to display a flashing red signal and instructs the pair of north south traffic light modules to display a flashing yellow signal.

In furtherance of the example traffic light control system, the present figure provides architectural requirements (e.g., a central controller and four traffic lights & an intersection controller per intersection). From the architectural requirements, the system determines that it needs to produce software for several components; i.e., the traffic light, the intersection controller, and the central controller.

Figures 47, 48:
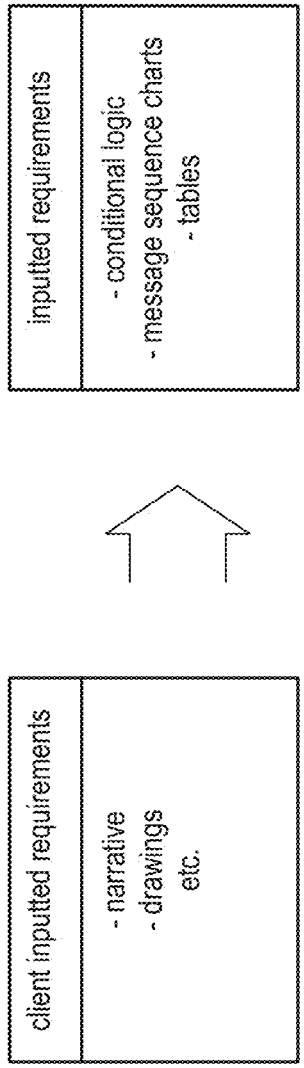

FIG. 47 is a diagram of an example of converting client inputted requirements for the application system into inputted requirements 18 for the application system. The client inputted requirements are typically in a form familiar to the client (e.g., utilizing client specific languages or client specific notations), which may not be in an industry standard format. For example, client inputted requirements may in a form including, but not limited to, narratives, drawings, process flow diagrams, flowcharts, communication protocol documents, internal standards, stylized natural language, etc.

The system 10 converts, or enables an operator of the system to convert, the client inputted requirements into the inputted requirements, which have a desired format. For example, inputted requirements 18 may in a form including but not limited to logical constructs (e.g., conditionals), message sequence charts (MSC), use case maps (UCM), state machines or state tables, timing diagrams, etc.

In addition, the system 10 converts, or enables an operator of the system to convert, the inputted requirements into the application requirements. The application requirements are in a form of application system state transitions (ASSTs). In general, an ASST includes a precondition that describes the state of the application system before performing the state transition, a description of the application system state, a description of the application system behavior during a state transition, and a post condition that describes the state of the application system after performing the state transition. A transition in the application system may be event triggered or it may be triggered by a continuous change. An ASST also includes the set of actors of the application system involved in the particular state transition.

FIG. 48 illustrates an if-then-else statement diagram (an example of conditional logic) for an intersection controller of the example traffic light control system. The system generates, or enables generation of, the if-then-else statement diagram based on the client inputted requirements discussed in one or more of FIGS. 56-61. As shown, the if-then-else logical illustrates the actions of the intersection controller to control the traffic lights based on the day of the week and the time of day. As an example, the intersection controller controls the traffic lights to operate with the north-south directional lights dominating over the east-west directional lights and where the north to south and south to north directions have equal priority when the time is between 4 AM and 6 AM, or 9 AM to 3 pm, or 6 PM and 11 PM on any of Monday through Friday (e.g., weekdays). Other examples should be self-evident from the diagram.

Figures 49, 50:
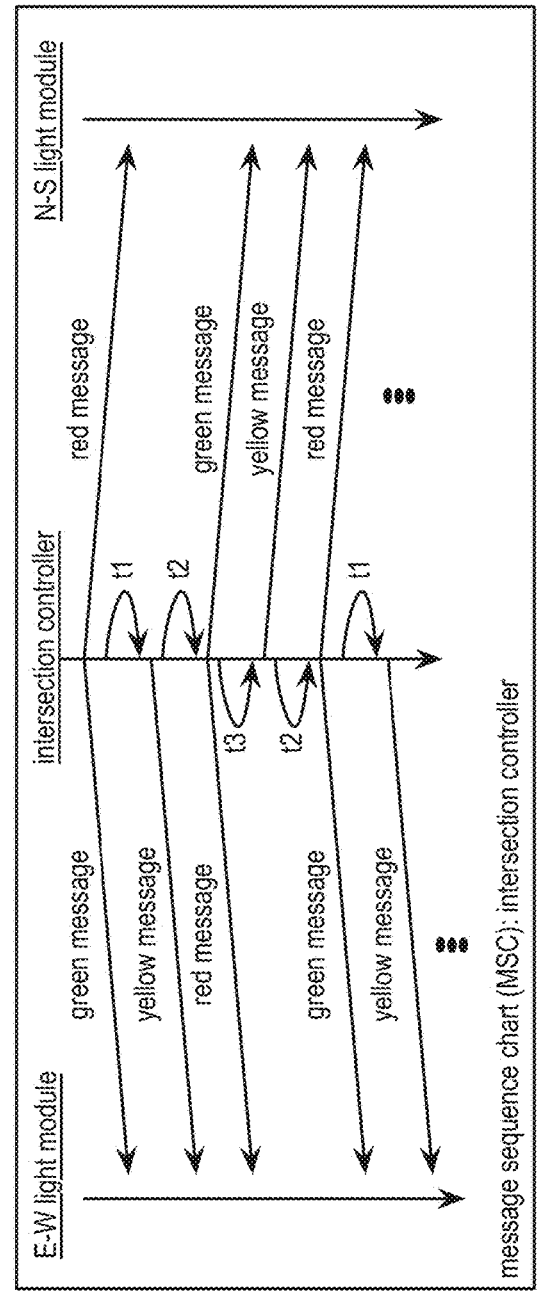

FIG. 49 is a diagram of a state table for the example traffic light control system. The system generates, or enables generation of, the state table based on the client inputted requirements discussed in one or more of FIGS. 56-61. As shown, the state table illustrates the states of an intersection controller, where a state includes an action (e.g., E-W light & N-S light) and a time duration for the corresponding action.

In this example, the state table has four sections: the first corresponds to N-S dominate traffic flow with north and south traffic flow of equal priority; the second corresponds to N-S dominate traffic flow with north-to-south traffic flow of higher priority; the third corresponds to N-S dominate traffic flow with south-to-north traffic flow of higher priority; and the fourth to flashing lights. As shown, the first section includes states 1, 2, 3, and 4; the second section includes states 5, 2, 6, and 4; the third section includes states 7, 2, 8, and 4, and the fourth section includes state 9.

FIG. 50 is a diagram of a message sequence chart (MSC) for the first four states of the state table of FIG. 49. As shown, the MSC indicates that the intersection controller sends a red message to the north south traffic lights and sends, after a delay, a green message to the east west traffic lights, which corresponds to state 1 of the state table. The MSC illustrates that the intersection controller then waits a time duration (T1) before transitioning to state 2 where it sends a yellow message to the east west traffic lights.

The MSC further illustrates that the intersection controller waits time duration T2 before transitioning to state 3, where it sends a red message to the east west traffic lights and sends, after some delay, a green message to the north south traffic lights. As shown in the MSC, the intersection controller waits time duration T3 before transitioning to state 4, where it sends a yellow message to the north south traffic lights. The MSC indicates that the intersection controller waits time duration T2 before transitioning back to state 1. Note that the MSC requirements format blends together the operational requirements, the timing diagram requirements, the architectural requirements, the state requirements, and new messaging between architectural elements requirements.

Figure 51:
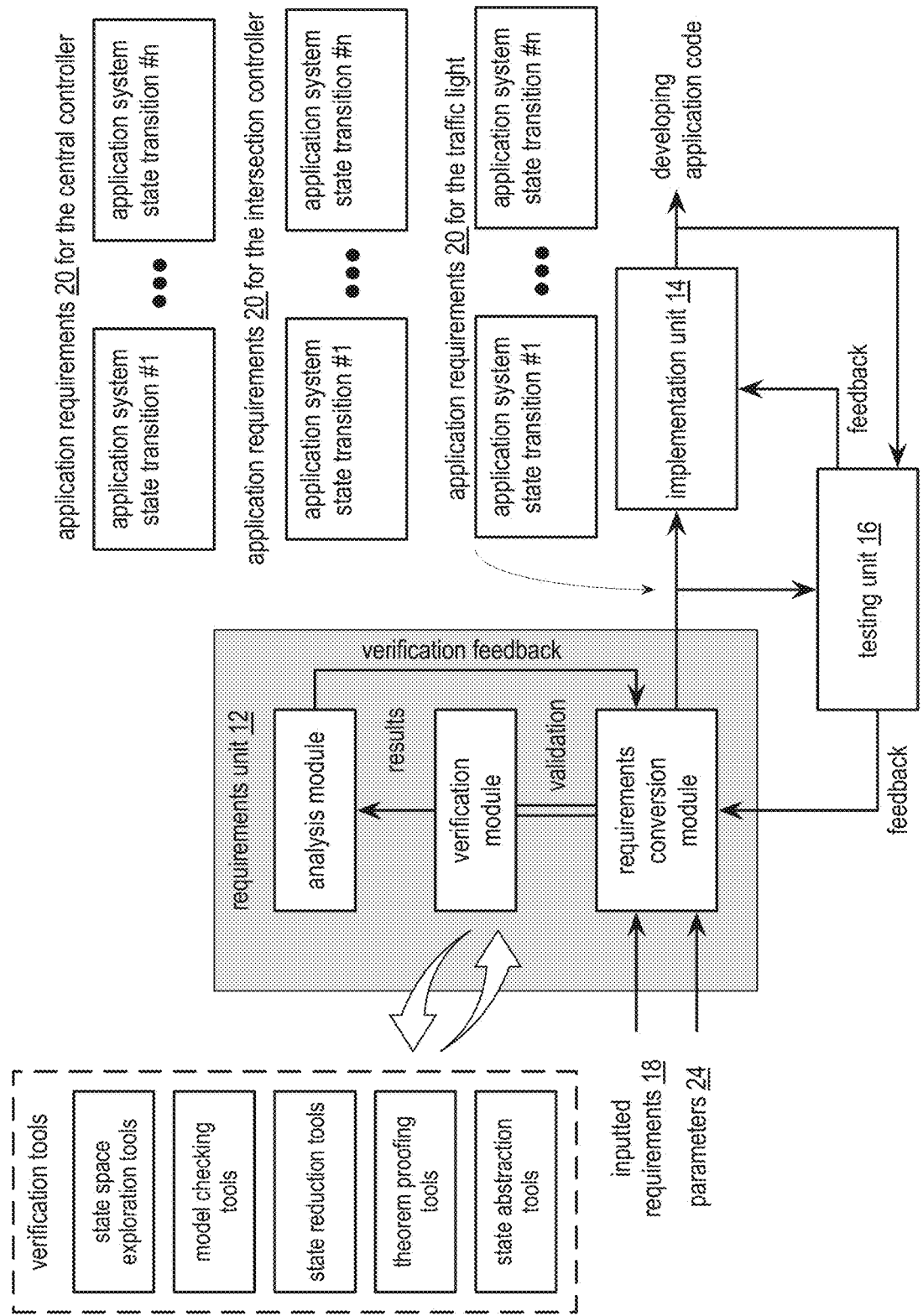

FIG. 51 is a diagram of the system 10 that includes the requirements unit 12, the implementation unit 14, and the testing unit 16. The requirements unit 12 includes the requirements conversion module (converting the customer inputted requirements into the inputted requirements and then converting the inputted requirements into the application requirements), the verification module, and an analysis module.

In an example of operation, the requirements conversion module generates the application requirements 20 for the traffic light, the intersection controller, and the central controller from the inputted requirements 18 and parameters 24 based on verification feedback. As previously discussed, the inputted requirements 18 may include conditionals, state tables, and/or MSCs, which may be generated from client inputted requirements. The parameters 24 include one or more of, but are not limited to, application system behavioral constraints, application system correctness conditions, an application system platform (e.g., an operating system, computing engines, a programming language of the application code), behavior definitions (e.g., operational tables, conditionals, etc.), and/or data definitions (e.g., message and command descriptions, etc.).

The requirements conversion module generates a plurality of application system state transitions as the application requirements 20 for the traffic light from the inputted requirements 18 and the verification feedback relevant to operation of the traffic light. The requirements conversion module also generates application system state transitions for the intersection controller from the inputted requirements 18 and the verification feedback relevant to operation of the intersection controller and generates application system state transitions for the central controller from the inputted requirements 18 and the verification feedback relevant to operation of the central controller.

As a further example of operation, the requirements conversion module produces verified application requirements 20 for each of the traffic light, intersection controller, and the central controller based on the inputted requirements 18 and verification module feedback. This is generally an iterative process where, for example, application requirements of iteration "n" are used to generate application requirements of iteration "n+1". The iterative process ends when the application requirements are verified to a desired level of completeness. For instance, the requirements conversion module may produce the plurality of application system state transitions by combining and/or converting the inputted requirements into the application system state transitions format over a series of iterations.

In addition, the requirements unit produces the application system state transitions in accordance with valid states of the application system's state space, which encompasses all possible states of the application system (e.g., millions, billions, or more possible states) for each of the traffic light, intersection controller and the central controller. As such, the resulting application requirements specify a valid subset of the application system state space where the application system may operate.

During the generation of the applications requirements, the requirements conversion module sends current representations of the application requirements to the verification module for feedback. The requirements conversion module adjusts the generation of the application requirements based on the verification feedback. In response to such feedback, the requirements conversion module may change individual application state transitions, it may add new application state transitions, or it may remove application state transitions from the current application requirements. The requirements conversion module may operate on all inputted requirements, or it may operate on incrementally larger portions of the inputted requirements.

The verification module receives the application system state transitions from the requirements conversion module as they are being generated to verify that they are consistent with the valid application system states and other correctness criteria (e.g., the application requirements should not create a safety violation, etc.). The verification module uses one or more verification tools to verify the application requirements, where the verification tools include, but are not limited to, theorem proofing tools, model checking tools, state space exploration tools, state abstraction tools, state reduction tools, and/or combinations of such tools). The verification tools may operate on concrete application system states (where all variables of the application system state have a determined value), or they may operate on symbolic application system states (where the variables of the application system state may not have a determined value).

The selection of a verification tool, or tools, may be based on one or more of, but are not limited to, a number of available application system state transitions, the number of previous conversion/verification iterations, verification tools previously used, previous and/or current verification results, a predetermination, a lookup, a command, and/or available verification tools. Note that the verification module may utilize one or more tools in sequence and/or in parallel prior to generating the verification feedback. For example, the verification module may determine to start with the theorem proving tool to verify correctness conditions for the application system state transitions and then utilize the model checking tool to determine the reachability of application system states that have been established to be incorrect.

As a further example, the verification module may select the tool to apply by consulting an expert system that has captured verification knowledge in the form of rules that guide the selection of the tool. As another example, the verification module may have a predetermined algorithm for selecting the tool. As yet another example, the verification module may select an applicable tool based on evolutionary programming principles. As a still further example, the verification module may select a tool as determined by an artificial-intelligence-based planning system. Other means for selecting the verification tools are also possible.

The verification module may select the verification tool(s) by taking into account the inputted requirements, application requirements generated so far, previous intermediate results of developing the application requirements, progress on creating application requirements, the verification module feedback of previous applications of a tool, the verification tools already used, the number of times verification tools have been used, and/or available verification tools.

The verification feedback, which may be produced by the analysis module based on the results of the verification module, indicates to the requirements conversion module whether the verification results compare favorably to one or more verification thresholds such as completeness (no deadlock states, i.e., in any application system state that is not a terminal state, another application system state transition may be performed), consistency (no non-deterministic states, i.e., in any application system state, at most one application system state transition may be performed), and/or safety (i.e., a certain condition holds at every application system state or does not hold at every application system state, e.g., resources are always released before they are acquired, timers always expire before they are set) as determined by the parameters 24). Note that the verification module may determine to utilize a different verification tool if the current verification tool is not producing verification results within a desired timeframe.

When the verification results do not compare favorably to a verification threshold, the analysis module generates an error indication and provides it to the requirements conversion module. Once the error is reported, the verification module may restart the verification process where it left off prior to when it discovered the error.

Figure 52:
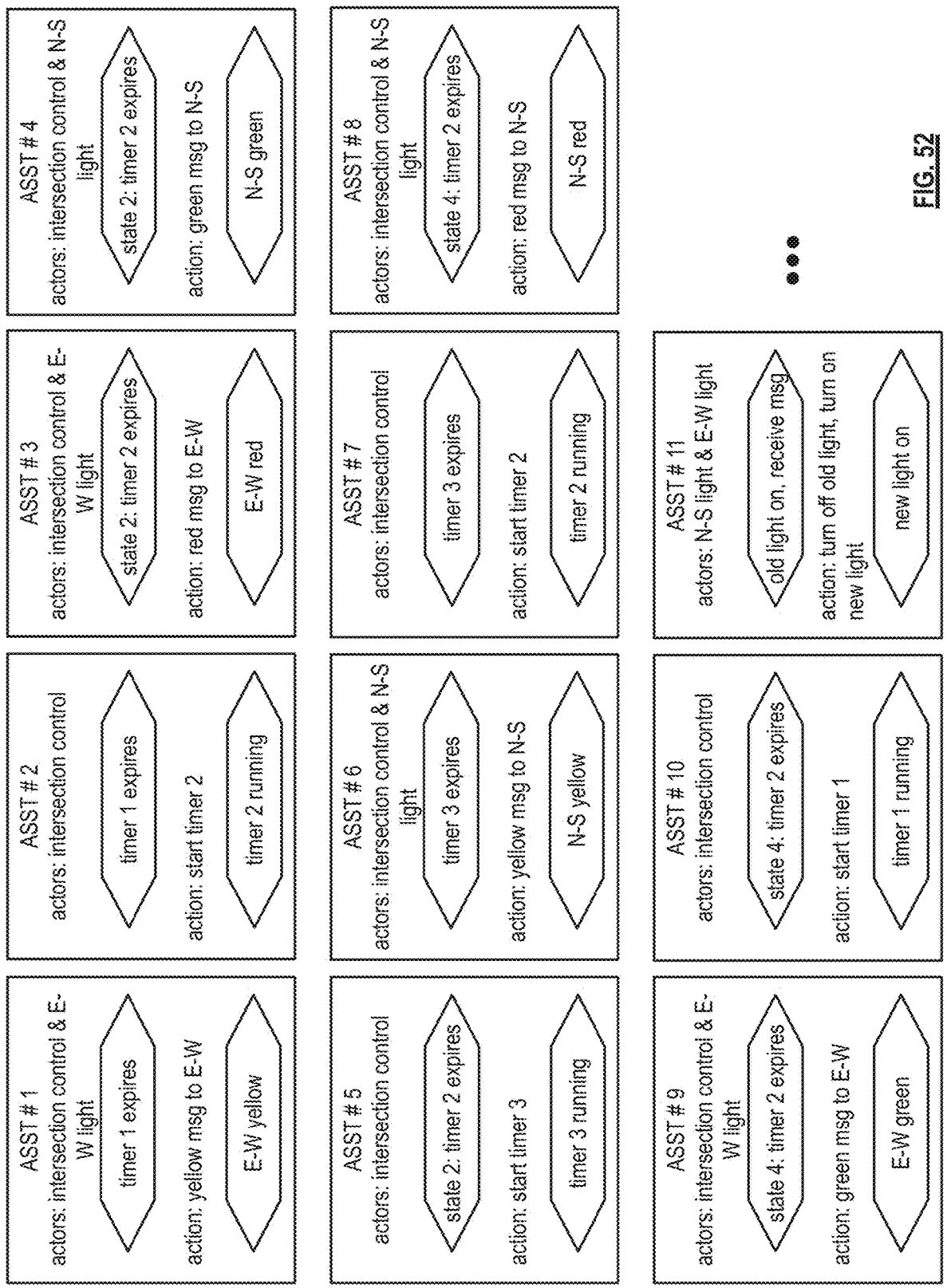

FIG. 52 is a diagram that illustrates a plurality of application system state transitions (ASSTs) 1-11 for an intersection controller of the example traffic light control system. Each ASST 1-11 indicates a pre-condition, an action, and a post-condition. For example, ASST 1 indicates that the intersection controller sends a yellow message to the east west light module (i.e., action) when the timer 1 expires (i.e., pre-condition) such that the E-W lights are yellow (i.e., post-condition). As another example, ASST 2 indicates that the intersection controller starts timer 2 when the timer 1 expires resulting in the action of timer 2 running.

Other examples include: ASST 3 indicates that the intersection controller, when in state 2, sends a red message to the east west light module when the timer 2 expires resulting in the E-W lights being red; ASST 4 indicates that the intersection controller sends, when in state 2, a green message to the north south light module when the timer 2 expires resulting in the E-W lights being green; ASST 5 indicates that when the intersection controller is in state 2, it starts timer 3 when the timer 2 expires resulting in timing 3 running; ASST 6 indicates that the intersection controller sends a yellow message to the north south light module when the timer 3 expires resulting in the N-S lights being yellow; ASST 7 indicates that the intersection controller starts timer 2 when the timer 3 expires resulting in timer 2; ASST 8 indicates that the intersection controller is in state 3, it sends a red message to the north south light module when the timer 2 expires resulting in N-S lights being red; ASST 9 indicates that the intersection controller is in state 4, it sends a green message to the east west light module when the timer 2 expires resulting in the E-W lights being green; ASST 10 indicates that the intersection controller is in state 4, it starts timer 1 when the timer 2 expires resulting in time 1 running; and ASST 11 indicates that the light module turns off the old light and turns on the new light when receiving a new light on message resulting in the new light being on and the old light being off.

Figures 53, 54:
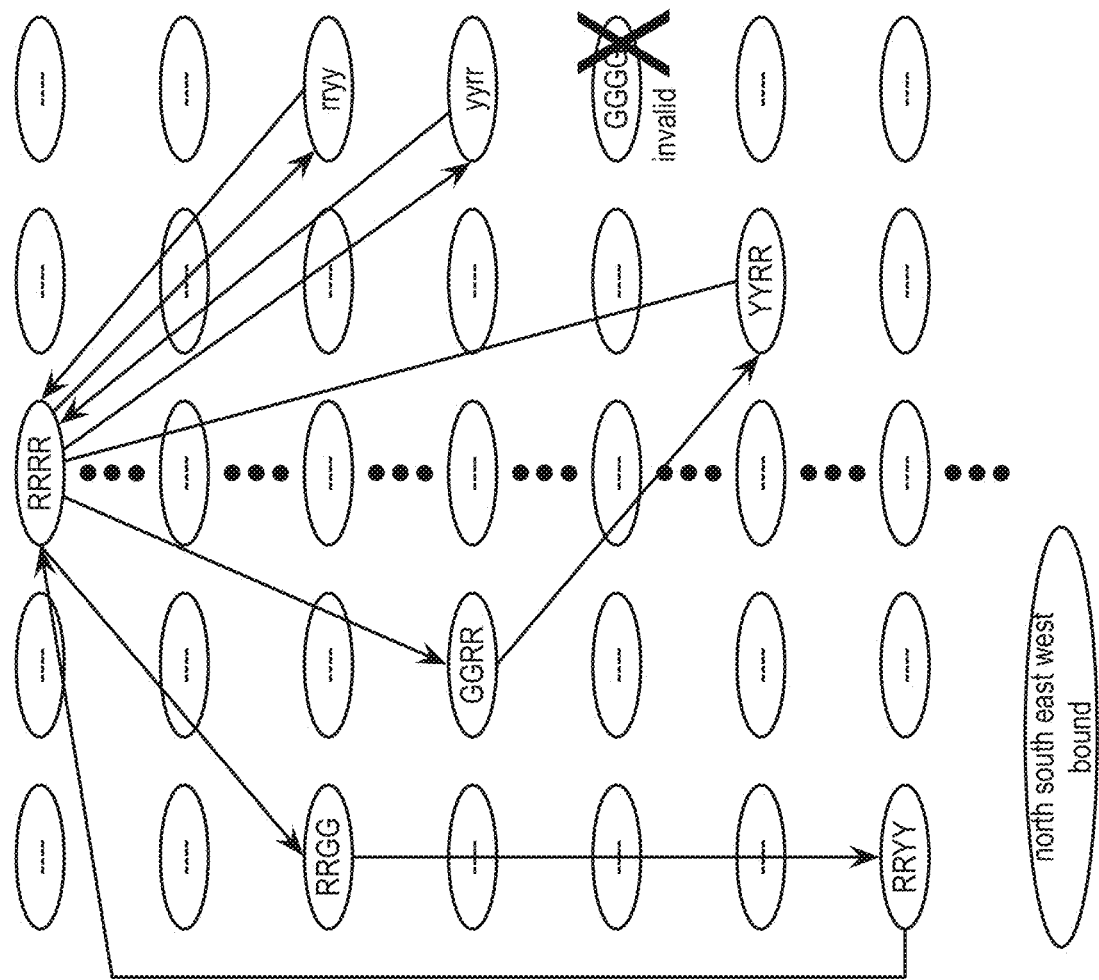

FIG. 53 is a diagram of an example state table for a traffic light in the traffic light control system example. As shown, a traffic light may be in one of five states: red, yellow, green, flashing red, or flashing yellow. With four traffic lights per intersection, there are 625 possible states (e.g., $5^4$ states). While there are 625 possible states at an intersection, there are only seven valid states in this example: RRRR, RRYY, RRGG, YYRR, GGRR, rrrr, rryy, and yyrr, where the R represents that a light is red, Y represents that a light is yellow, G represents that a light is green, r represents that a light is flashing red, and y represents that a light is flashing yellow, and where the first letter corresponds to the first N-S light, the second letter corresponds to the second N-S light, the third letter corresponds to the first E-W light, and the fourth letter corresponds to the second E-W light.

FIG. 54 is state space diagram of a traffic light control system example for an intersection that includes four traffic light modules. As previously discussed, there are 7 valid states for four traffic lights at an intersection from the possible 625 intersection states. The ovals include the color (e.g., red, yellow, green) and mode (e.g., steady on or flashing) of the light displayed for the state for the northbound, southbound, eastbound, and westbound traffic. For example, RRGG denotes the valid state of red for northbound, red for southbound, green for eastbound, and green for westbound. In another example, yyrr denotes the valid state of flashing yellow for northbound, flashing yellow for southbound, flashing red for eastbound, and flashing red for westbound. As another example, state GGGG (e.g., green lights simultaneously in all four directions) is an invalid intersection state.

When the intersection is in one state, the intersection controller determines the next valid state and sends messages to the traffic lights to transition to the next state. The intersection controller makes the determination based on the current state and an event (e.g., the time of day changes to a different time period) or input (e.g., a timer expires). For example, for the current state is RRGG, a next valid intersection state is RRYY, which is represented by a line from the current state oval to the next state oval.

The states and state transitions form the basis of an intersection controller state transition diagram (e.g., completely formed with the addition of inputs and actions). The requirements unit may produce state transition diagrams for each system element (e.g., central controller, intersection controller, light module) and send the state transition diagrams to the implementation unit.

Figure 55:
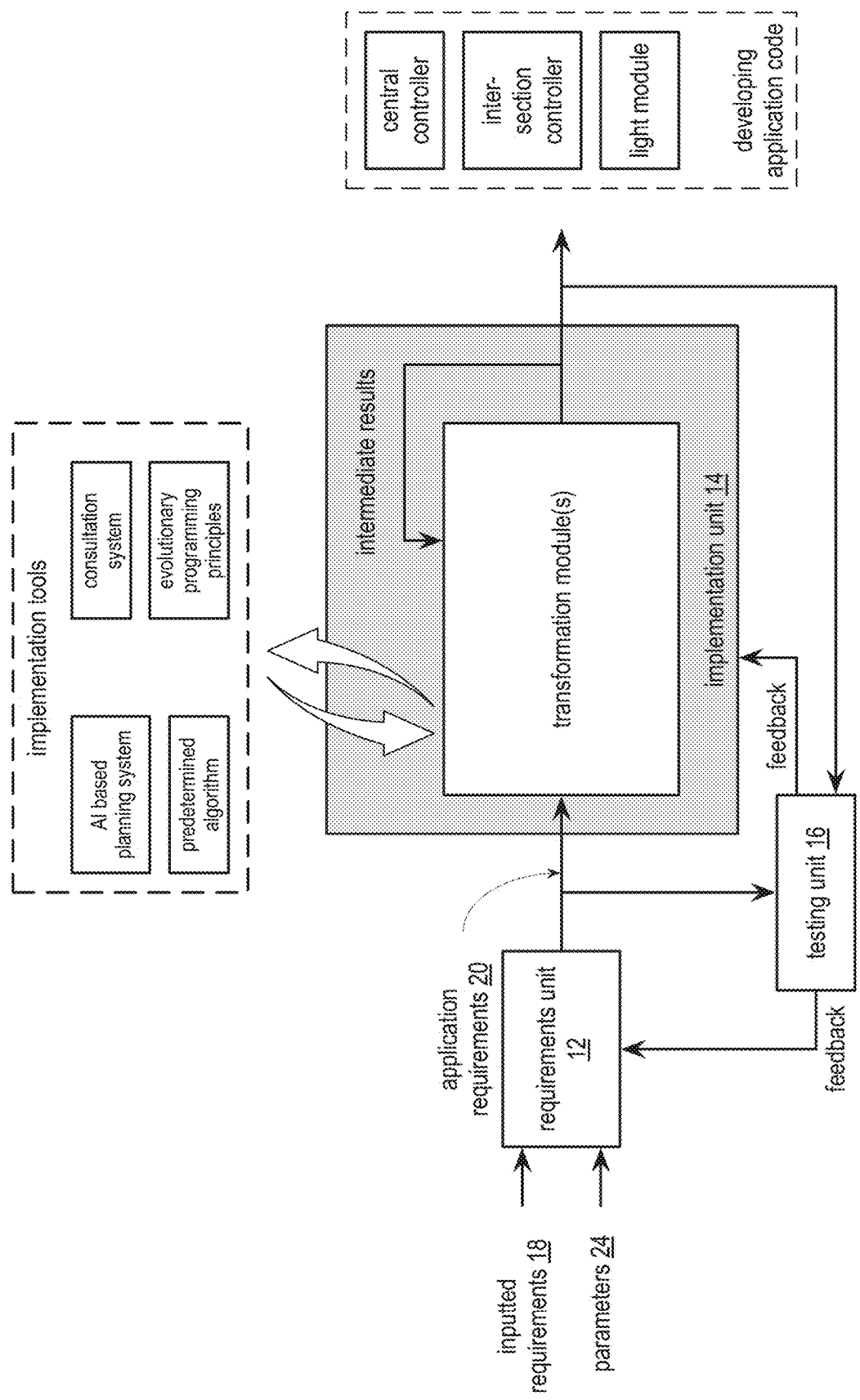

FIG. 55 is a diagram of the system 10 that includes the requirements unit 12, the implementation unit 14, and the testing unit 16. The implementation unit 14 includes one or more transformation modules to generate application code for each of the traffic light, the intersection controller, and the central controller from the corresponding application requirements 20.

As the implementation unit generates the application code from the application requirements, parameters and testing unit feedback, it selects one or more implementation tools. These implementation tools are used by the implementation unit to incrementally and/or iteratively create the implementation from the application requirements. This process may require thousands, millions, or more tool applications in order to produce the final implementation. The implementation unit may select one or more new implementation tools for each tool application or use the same implementation tools for numerous tool applications.

At each iterative or incremental application of the implementation unit, the implementation unit takes the result of the previous application (or the application requirements, if this is the first application) and generates a new intermediate result of the developing application code (or the application code, if this is the last application). The intermediate results may be in the form of, but are not limited to, message diagrams, state machine diagrams, state tables, state/event matrices, pseudo code, structure diagrams, models or diagrams of a modeling language such as, but not limited to UML, SDL, VHDL, Verilog, BPML, SysML, etc., or suitable extensions or profiles thereof, code in a programming language or a suitable extension of such programming language, activity diagrams, business process diagrams. For any of these, the intermediate results may be in either textual or graphical form.

In an example, the implementation unit selects the tool to apply by consulting an expert system that has captured programming knowledge in the form of rules that guide the selection of the tool. In another example, the implementation unit has a predetermined algorithm for selecting the tool. In yet another example, the implementation unit selects an applicable tool based on evolutionary programming principles. In a further example, the implementation unit selects a tool as determined by an artificial-intelligence-based planning system. Further, or in addition to, the implementation unit selects the implementation tool(s) by taking into account the application requirements, previous intermediate results of the developing application code, progress on creating application code, the testing unit feedback on previous intermediate results, the implementation tools already used, the number of iterations for which implementation tools have been used, and/or available implementation tools.

The implementation tools include specific-purpose development tools and/or general-purpose development tools in the form of artificial intelligence (AI) based planning system implementation tools, predetermined algorithm tools, consultation system tools, and/or evolutionary programming principles tools. The specific-purpose development tools include tools to implement application code for a particular target processor and other constraint parameters. The general-purpose development tools include tools to implement application code based on common computing principles that are not specific to a given target processor or other constraint parameters. Specific-purpose and general-purpose development tools may include, but are not limited to, one or more of the following: compilers, program rewriting systems, term rewriting systems, tree rewriting systems, graph transformation systems, model transformation systems, macro expansion systems, aspect-oriented development systems, source-to-source translators, data-type refinement systems, program slicing systems, program pre-processors, program comprehension systems, program morphing systems, algebraic manipulation systems, optimizations systems, or other systems that are able to make incremental changes to an existing model or program. The individual implementation tools range in size from simple transformation rules that make very small, localized, incremental changes to the syntactic form of the intermediate result (e.g., changing an increment operation into an "add 1" operation) to aspect-oriented systems that can make very large changes across the whole of the intermediate result.

The process of developing the application code may go through several incremental steps. For example, for the illustrative software development process described in FIG. 55, the incremental steps may include an architecture level design increment, a high-level design (HLD) increment, a low-level design (LLD) increment, and a code development increment (which is further described with reference to FIG. 61). The iterative process may be organized in arbitrary and convenient incremental steps and is not limited to the steps mentioned as examples. Note that the application code takes into account architectural limitations and/or target implementation parameters (e.g., computing device and/or communications limitations).

The testing unit generates feedback indicating whether or not the developing application is functioning in accordance with the application requirements. If the developing application is not functioning in accordance with the application requirements, the development process must be reverted to a previous step and corrected, up to and including revising the original requirements.

Figure 56:
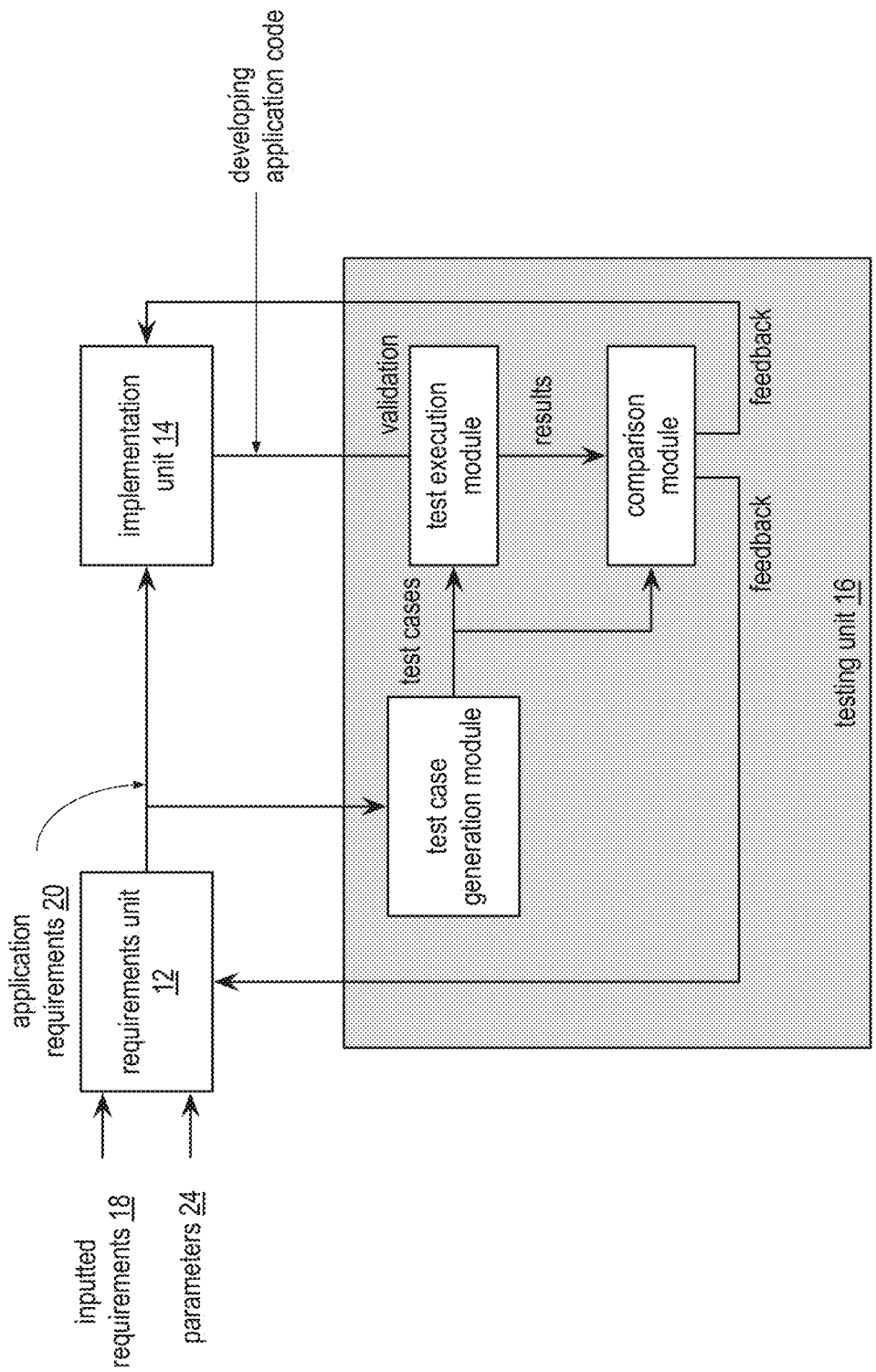

FIG. 56 is a diagram of the system 10 that includes the requirements unit 12, the implementation unit 14, and the testing unit 16. The testing unit 16 includes a test case generation module, a test execution module, and a comparison module. In general, the testing unit 16 tests the application code for each of the traffic light, the intersection controller, and the central controller as the implementation unit is generating it. The testing unit 16 may also test intermediate results of the developing application code during the generation of the application code.

In an example of operation, the system converts, or enables an operator of the system to convert, the application requirements into application system test cases, which are typically in a format indicating stimuli input into the application system and the corresponding responses emitted from the application system, if any. The test cases may be in a standardized format, such as TTCN, MSC, or in any other format suitable to express application system test cases. The test creation module may take into account parameters indicated desired application system behavioral scenarios or prohibited application system behavioral scenarios.

The test execution module accepts the application system test cases and converts them to the appropriate level of abstraction for the artifact to be tested. For example, when the implementation unit has generated a representation of the application system as high-level design model, the test execution module converts the test cases into tests suitable to exercise a high-level design model. When the application unit has generated application code, the test execution module converts the test cases into tests suitable to exercise the application code. The test execution module then stimulates the application system generated by the implementation unit with the test cases and collects the application system response.

The compare module accepts the test cases from the test creation module and the application system response from the test execution module and compares the observed behavior of the application system with the prescribed behavior described in the test cases. The compare module then generates a description of the observed application system behavior and its deviation from the prescribed behavior, if any. The deviation from the prescribed behavior may be result of transitioning to an invalid state (e.g., GGGG for the lights of an intersection) or may a violation of a correctness requirement (e.g., violation of applicable traffic laws, violation of a safety concern, violation of traffic light transition timing requirements, etc.). The compare module provides the feedback to the implementation unit, which uses the feedback to further transform the application system (e.g., generate the application code).

In a further example of operation, the implementation unit 14 generates application code based on the application requirements 20, parameters, and feedback from the testing unit 16 using one or more implementation tools. For instance, the application code may comprise a series of sequential or concurrent statements and declarations 1-n that implement the application system behavior. As the implementation unit generates the application code from the application requirements, parameters and testing unit feedback, it selects one or more implementation tools. As discussed above, the implementation unit may select one or more new implementation tools for each loop of generating the application code or use the same implementation tools for numerous loops.

Figure 57:
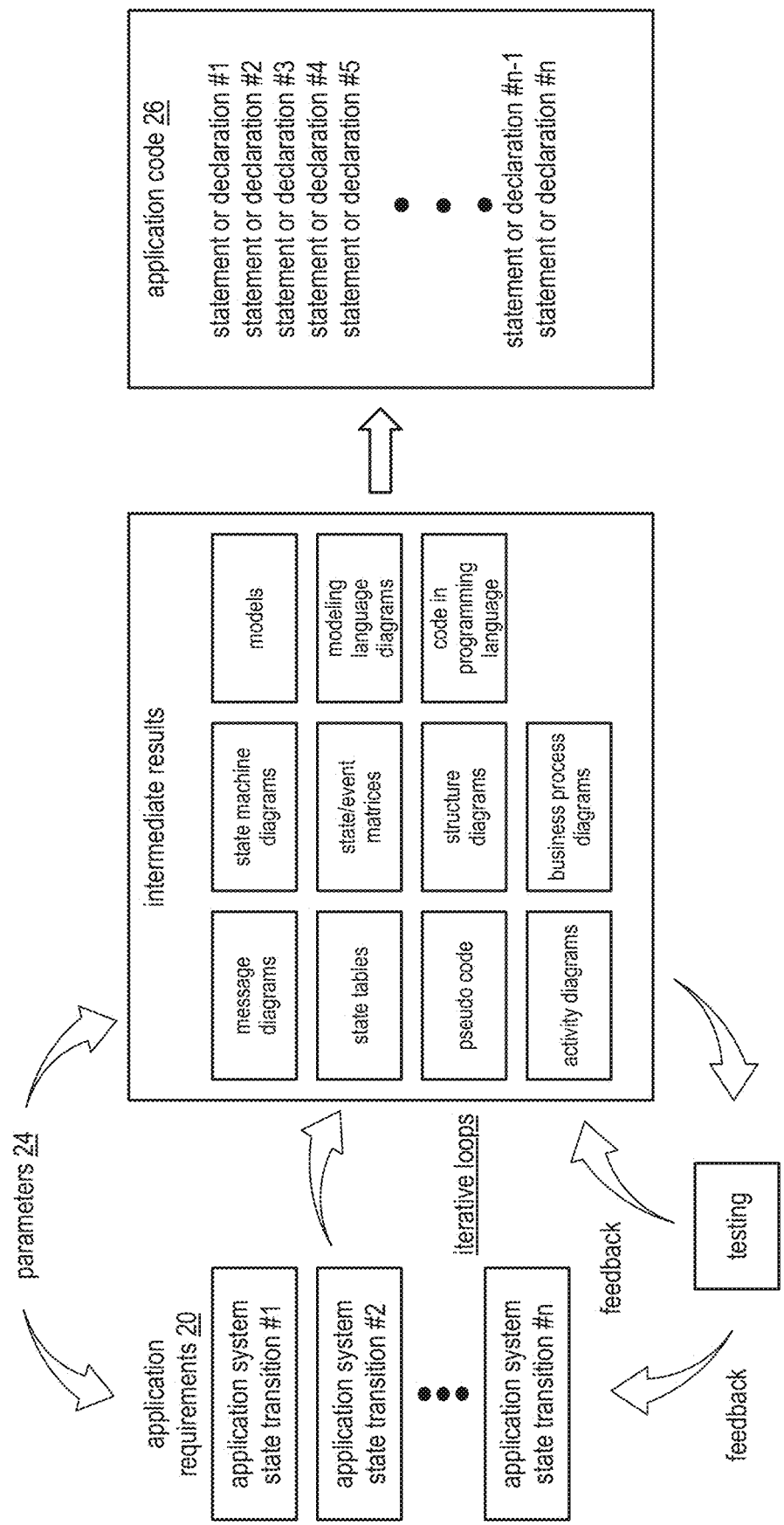

FIG. 57 is a graphical illustration representing the generation of the application code by the system 10. As shown, application requirements 20, in the form of application system state transitions (ASST), and parameters 24 are used to generate intermediate results, which are iteratively tested to produce the final application code 26. For example, one or more ASSTs and parameters may provide input to iteratively or incrementally generate an intermediate result. For each iterative or incremental application of one or more implementation tools to generate an intermediate result (e.g., one or more of the intermediate result types illustrated in this figure), the application of the tool(s) is tested as previously described to produce feedback for the requirements unit and/or the implementation unit. The feedback indicates whether the development of the intermediate result is error-free or includes errors. If the feedback indicates an error, the implementation unit modifies its implementation of the immediate result to circumvent the error. Depending on the nature of the error, the requirements unit may modify the application requirements 20.

As the implementation unit iteratively or incrementally generates the intermediate results towards the final application code 26, the various intermediate results are iteratively and/or incrementally tested. For instance, as the implementation unit is generating intermediate results of state tables, pseudo code, activity diagrams, state machine diagrams, state/event matrices, structure diagrams, business process diagrams, models, modeling language diagrams, and/or code in a particular programming language, the incremental or iterative development of such intermediate results is tested as previously described.

Figure 58:
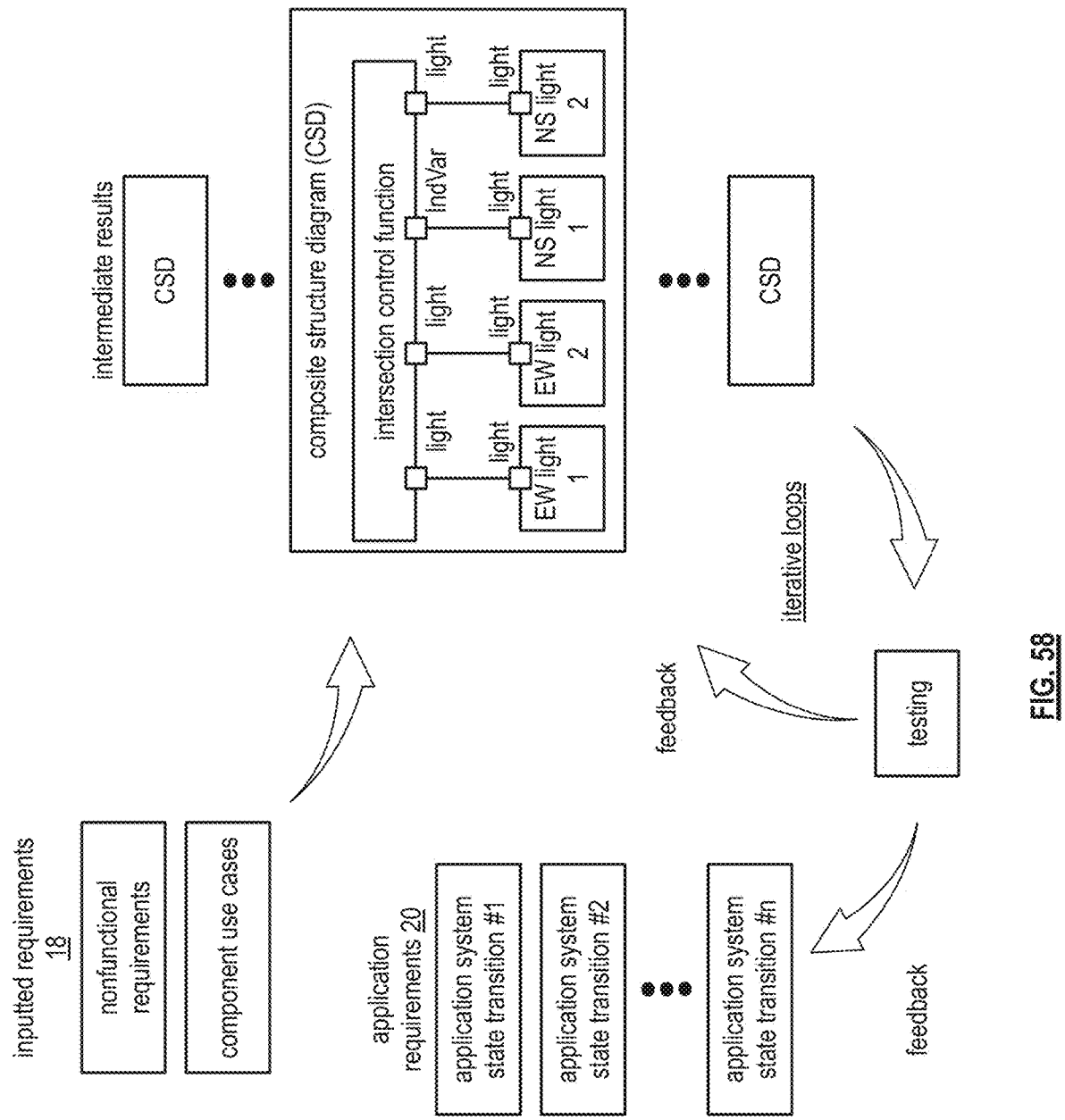

FIG. 58 is a diagram representing the architecture level design phase for the specific embodiment of developing application code following the illustrative software development process depicted in FIG. 33, producing one or more composite structure diagrams (CSD). In this example, the implementation unit 14 generates, in an iterative or incremental manner, composite structure diagram(s) (CSD) based on the application requirements 20 (in the form of ASSTs), some or all of the inputted requirements 18 (e.g., nonfunctional requirements and component use cases), and feedback from the testing unit 16 using one or more implementation tools. The intermediate result of the developing application code (i.e., the CSDs) includes a structure that is comprised of one or more parts of a class (e.g., a group of parts sharing a state and exhibiting interactive behavior), ports for communication (e.g., to interact with parts and other elements outside of the CSD), and connectors between the ports (e.g., binding two or more entities together). The composite structure includes the interconnected set of elements (e.g., parts) that operate and interact to achieve the application requirements.

To iteratively or incrementally generate a current representation of the application code (i.e., the CSDs during the architecture level design phase), the implementation unit selects one or more implementation tools (e.g., specific-purpose development tools and/or general-purpose development tools applicable at the architecture level design phase) based on the current intermediate result of the developing application code (e.g., the CSD diagrams), the application requirements, inputted requirements, and/or the testing unit feedback. Such a tool selection may be done for each iterative or incremental step of generating the application code or for groups of steps (i.e., the same implementation tool is used for numerous steps).

As the implementation unit iteratively or incrementally generates the intermediate result of the developing application code (e.g., the CSD diagrams), the testing unit tests it. As previously discussed, the testing unit generates test cases, tests the developing application code, compares the tested results with anticipated results, and generates feedback based on the comparison. In this example, the testing unit creates the test cases and performs the testing in accordance with the intermediate result of the developing application code at the architecture level design phase (e.g., the CSD diagrams).

FIG. 59 is a diagram representing the high-level design phase for the specific embodiment of developing application code following the illustrative software development process depicted in FIG. 33, producing state machine diagrams. In this example, the implementation unit 14 generates, in an iterative or incremental manner, state machine diagram(s) (SM) based on the application requirements 20 (in the form of ASSTs), some or all of the inputted requirements 18 (e.g., nonfunctional requirements and component use cases), and feedback from the testing unit 16 using one or more implementation tools.

To iteratively or incrementally generates the intermediate result of the developing application code at the high-level design phase (i.e., state diagrams), the implementation unit selects one or more implementation tools (e.g., specific-purpose development tools and/or general-purpose development tools applicable at the high-level design phase) based on the application requirements, previous iteration(s) of the developing application code, progress on creating application code, the testing unit feedback of previous loop(s), the implementation tools already used, the number of iterations for which implementation tools have been used, and/or available implementation tools. Such a tool selection may be done for each iterative or incremental step of generating the application code or for groups of steps (i.e., the same implementation tool is used for numerous steps).

As the implementation unit iteratively or incrementally generates the intermediate result of the developing application code at the high-level design phase (e.g., the state diagrams), the testing unit tests it. As previously discussed, the testing unit generates test cases, tests the developing application code, compares the tested results with anticipated results, and generates feedback based on the comparison. In this example, the testing unit creates the test cases and performs the testing in accordance with the intermediate result of the developing application code at the high-level design phase (e.g., the state machine diagrams). This intermediate result includes one or more of components, interfaces, and/or data flow between the components.

Figure 60:
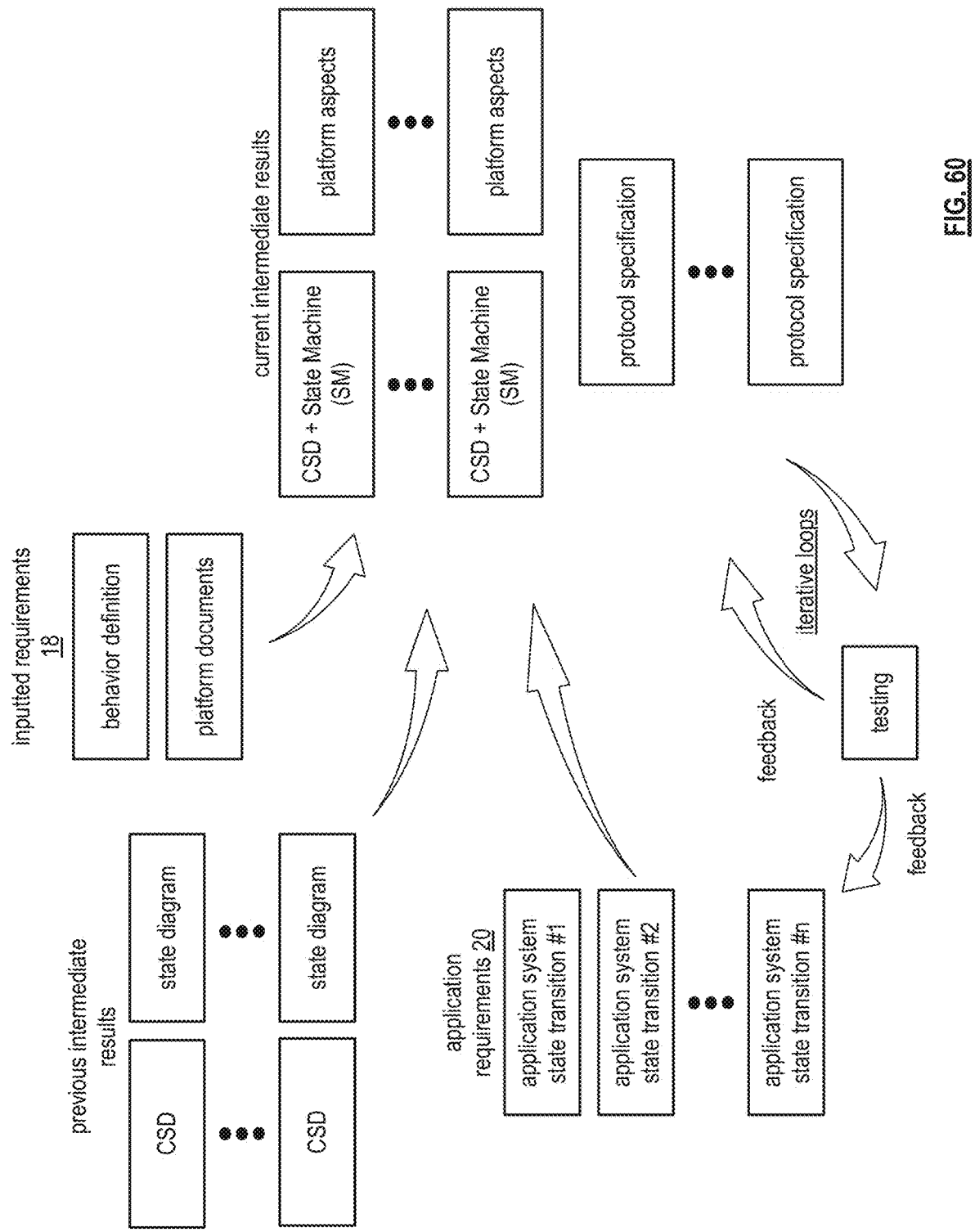

FIG. 60 is a diagram representing the low-level design phase for the specific embodiment of developing application code following the illustrative software development process depicted in FIG. 55, producing the detailed CSD plus state machine (SM) diagrams, platform aspects, and/or protocol specifications. In this example, the implementation unit 14 generates, in an iterative or incremental manner, the intermediate result of the developing application code at the low-level design phase based on the application requirements 20, input requirements (e.g., behavior definition), previous intermediate results, and/or feedback from the testing unit 16 using one or more implementation tools.

To iteratively or incrementally generates the intermediate result of the developing application code at the low-level design phase (i.e., detailed CSD plus SM diagrams, platform aspects, and/or protocol specifications), the implementation unit selects one or more implementation tools (e.g., specific-purpose development tools and/or general-purpose development tools applicable at the low-level design phase) based on the application requirements, previous iteration(s) of the developing application code, progress on creating application code, the testing unit feedback of previous loop(s), the implementation tools already used, the number of iterations for which implementation tools have been used, and/or available implementation tools. Such a tool selection may be done for each iterative or incremental step of generating the application code or for groups of steps (i.e., the same implementation tool is used for numerous steps).

As the implementation unit iteratively or incrementally generates the intermediate result of the developing application code at the low-level design phase (i.e., detailed CSD plus SM diagrams, platform aspects, and/or protocol specifications), the testing unit tests it. As previously discussed, the testing unit generates test cases, tests the developing application code, compares the tested results with anticipated results, and generates feedback based on the comparison. In this example, the testing unit creates the test cases and performs the testing in accordance with the intermediate result of the developing application code at the low-level design phase (i.e., detailed CSD plus SM diagrams, data structure definitions, platform aspects, protocol specifications, and/or protocol tests). The intermediate results include one or more of sub-components, interfaces, functional logic, tables, interface details, dependencies, and/or input/output data flow between the sub-components and between the sub-components and external components. The intermediate results may also specify the operation of logical functions alone or as part of data structure definitions. For example, the compare logical function outputs a signal externally that the timer has expired and the compare logical function sends a data flow to the reset logical function to reset the counter when the compare logical function determines that a comparison of the counter and the register indicates that a counter value is the same as a register value (e.g., the timer has expired).

Figure 61:
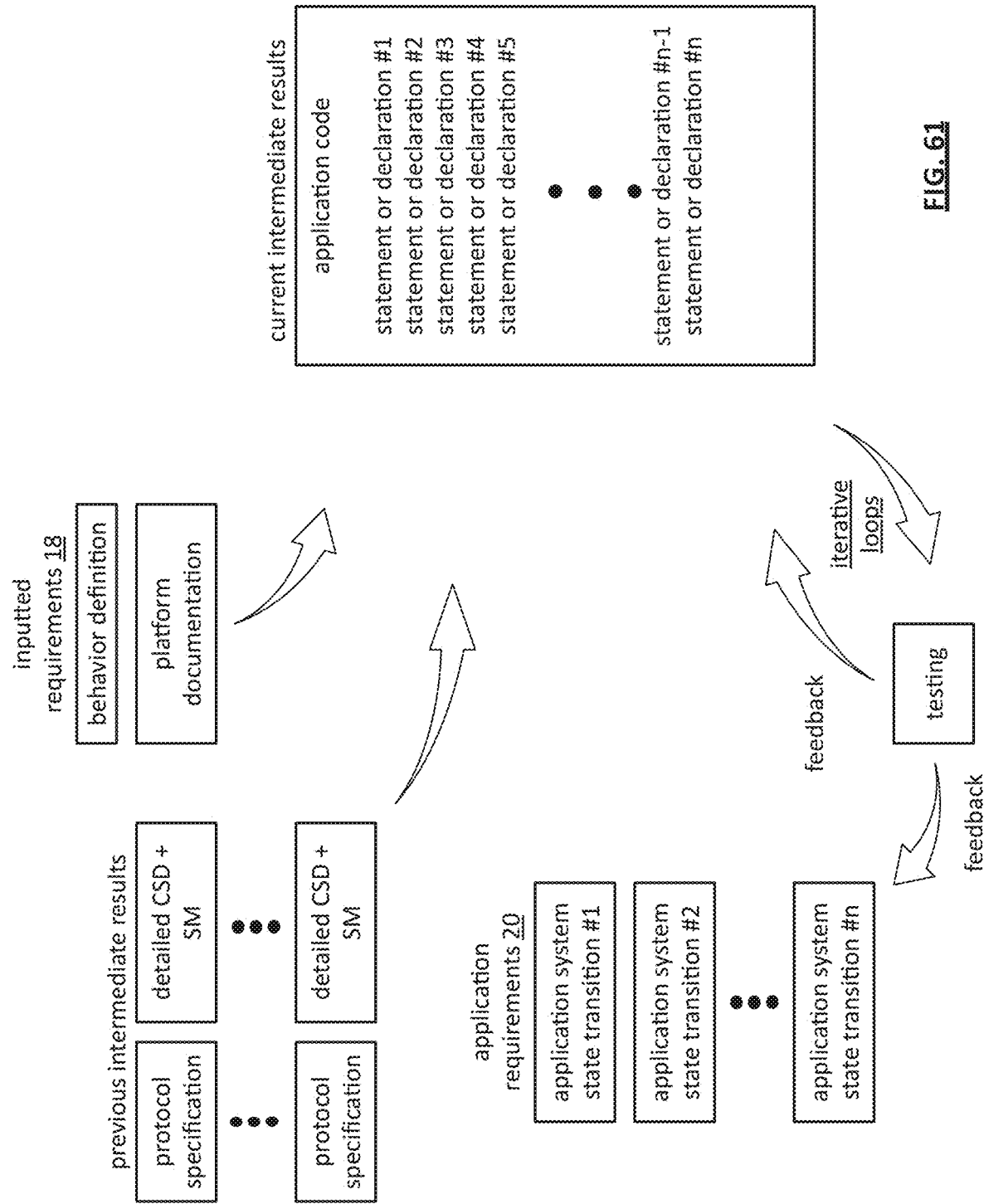

FIG. 61 is a diagram representing the code development phase for the specific embodiment of developing application code following the illustrative code development process phase depicted in FIG. 55, producing the application code. In this example, the implementation unit 14 generates, in an iterative or incremental manner, application code based on the application requirements 20, input requirements (e.g., behavior definition and platform documentation), previous intermediate results, and/or feedback from the testing unit 16 using one or more code level implementation tools. For instance, the application code includes a series of sequential or concurrent statements and declarations 1-n that implement the application system behavior. The application code includes one or more of sub-components, interfaces, functional logic, tables, interface details, dependencies, and/or input/output data flow between the sub-components and between the sub-components and external components. The generated artifacts may also include user code and integration tests.

To iteratively or incrementally generate the application code, the implementation unit 14 selects one or more implementation tools (e.g., specific-purpose development tools and/or general-purpose development tools applicable at the code development phase) based on the application requirements 20, parameters, previous iteration(s) of the developing application code, progress on creating application code, the testing unit 16 feedback of previous loop(s), the implementation tools already used, the number of iterations for which implementation tools have been used, and/or available implementation tools. Such a tool selection may be done for each iterative or incremental step of generating the application code or for groups of steps (i.e., the same implementation tool is used for numerous steps).

As the implementation unit iteratively or incrementally generates the application code, the testing unit tests it. As previously discussed, the testing unit generates test cases, tests the application code, compares the tested results with anticipated results, and generates feedback based on the comparison. In this example, the testing unit creates the test cases and performs the testing in accordance with the application code.

While the example of FIGS. 40-61 focused on a simple traffic light system, the teachings of the present invention are applicable to generating application code for a wide variety of devices, applications, and/or application systems. For example, the teachings of the present invention may be used to generate application code for a cellular telephone, a personal digital audio/video player, etc. In general, the teachings of the present invention may be used to generate software for an almost endless list of devices and/or applications.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution b one or more computing entities, the method comprises:
    iteratively generating application code utilizing one or more implementation tools and by:
        generating, automatically by the one or more computing entities, a plurality of requirements artifacts based on a component use case input requirement artifact, a scenario input requirement artifact, and a correctness criteria input requirement artifact;
        generating, automatically by the one or more computing entities for an architecture level design phase, a plurality of architecture level artifacts based on at least some of the plurality of requirements artifacts and the component use case input requirement artifact;
        generating, automatically by the one or more computing entities for a high-level design (HLD) phase, a plurality of HLD artifacts based on at least some of the plurality of architecture level artifacts, at least a second some of the plurality of requirement artifacts, non-functional input requirements, and protocol document input requirements;
        generating, automatically by the one or more computing entities for a low-level design (LLD) phase, a plurality of LLD artifacts based on at least a second some of the plurality of architecture level artifacts, at least some of the plurality of HLD artifacts, behavior definition input requirement artifacts, and platform document input requirement artifacts; and
        generating, automatically by the one or more computing entities for an application code level development phase, a plurality of code artifacts based on at least some of the plurality of LLD artifacts, at least a second some of the plurality of HLD artifacts, and at least a third some of: the plurality of requirement artifacts, the behavior definition input requirement artifacts, and the platform document input requirement artifacts, wherein at least one of the plurality of code artifacts includes the application code.

2. The method of claim 1, wherein the plurality of architecture level artifacts comprises:
    one or more structure models; and
    one or more test models.

3. The method of claim 1, wherein the plurality of HLD artifacts comprises:
    one or more architecture models;
    one or more structure models;
    one or more state models;
    one or more sanity test models; or
    one or more protocol specification models.

4. The method of claim 1, wherein the plurality of LLD artifacts comprises:
    one or more structure models;
    one or more state models;
    one or more behavior models;
    one or more platform models; or
    one or more protocol test models.

5. The method of claim 1, wherein the plurality of code artifacts further comprises:
    one or more user code models;
    one or more user application code;
    one or more model code;
    one or more platform code;
    one or more protocol code; or
    one or more platform test models.

6. A computing device comprising:
memory;
an input/output module operable to output application code;
a processing module operably coupled to the memory and the input/output module, wherein the processing module is operable to implement production of application code in an iterative manner using one or more implementation tools and to:
generate a plurality of requirements artifacts based on a component use case input requirement artifact, a scenario input requirement artifact, and a correctness criteria input requirement artifact;
generate, for an architecture level design phase, a plurality of architecture level artifacts based on at least some of the plurality of requirements artifacts and the component use case input requirement artifact;
generate, for a high-level design (HLD) phase, a plurality of LLD artifacts based on at least some of the plurality of architecture level artifacts, at least a second some of the plurality of requirement artifacts, non-functional input requirements, and protocol document input requirements;
generate, for a low-level design (LLD) phase, a plurality of LLD artifacts based on at least a second some of the plurality of architecture level artifacts, at least some of the plurality of HLD artifacts, behavior definition input requirement artifacts, and platform document input requirement artifacts; and
generate, for an application code level development phase, a plurality of code artifacts based on at least some of the plurality of LLD artifacts, at least a second some of the plurality of HLD artifacts, and at least a third some of the plurality of requirement artifacts, the behavior definition input requirement artifacts, and the platform document input requirement artifacts wherein at least one of the plurality of code artifacts includes the application code.

7. The computing device of claim 6, wherein the plurality of architecture level artifacts comprises:
one or more structure models; and
one or more test models.

8. The computing device of claim 6, wherein the plurality of HLD artifacts comprises:
one or more architecture models;
one or more structure models;
one or more state models;
one or more sanity test models; and
one or more protocol specification models.

9. The computing device of claim 6, wherein the plurality of LLD artifacts comprises:
one or more structure models;
one or more state models;
one or more behavior models;
cine or more platform models; and
one or more protocol test models.

10. The computing device of claim 6, wherein the plurality of code artifacts further comprises:
one or more user code models;
one or more user application code;
one or more model code;
one or more platform code;
one or more protocol code; and
one or more platform test models.

11. A computing device comprising:
memory;
an input/output module operable to output application code; and
a processing module operably coupled to the memory and the input/output module, wherein the processing module is operable to:
implement production of the application code in an iterative manner using one or more implementation tools;
during an architecture level design phase, automatically produce architecture artifacts based on application requirements, parameters, and architecture phase feedback;
during a high-level design (HLD) phase, automatically produce HLD artifacts based on the architecture artifacts, the application requirements, the parameters, and HLD phase feedback;
during a low-level design (LLD) phase, automatically produce LLD artifacts based on the architecture artifacts, the HLD artifacts, the application requirements, the parameters, and LLD phase feedback;
during a code development phase, automatically produce code artifacts based on the HLD artifacts, the LLD artifacts, the application requirements, the parameters, and a code development phase feedback, wherein at least one code artifact of the code artifacts includes the application code; and
generate a final application code based on the architecture level design, HLD, LLD, and code development phases.

12. The computing device of claim 11, wherein the architecture level design phase provides one or more of: model tests or structure models.

13. The computing device of claim 11 further comprises a testing unit generating the architecture phase feedback by testing the results corresponding to a development of the architecture artifacts using architecture level test cases.

14. The computing device of claim 11, wherein the HLD artifacts include one or more of: structure models or state models.

15. The computing device of claim 11 further comprises a testing unit generating the HLD feedback by testing the results corresponding to a development of the HLD artifacts using HLD level test cases.

16. The computing device of claim 11, wherein the LLD artifacts include one or more of: structure models, state models, behavior models, or protocol tests.

17. The computing device of claim 11 further comprises a testing unit generating the LLD feedback by testing the results corresponding to a development of the LLD artifacts using LLD level test cases.

18. The computing device of claim 11, wherein the code artifacts include one or more of: user codes, application codes, or integration tests.

19. The computing device of claim 11 further comprises a testing unit generating the code development phase feedback by testing the code artifacts using code level test cases.

20. The computing device of claim 11, wherein a group of the architecture, HLD, LLD and code artifacts include any of: nonfunctional requirements, component use cases, scenarios, correctness criteria, behavior definitions, platform documents, data definitions, formalized requirements, verified requirements, application system state transitions (ASST), composite structure diagrams, state machine diagrams (SM), architecture model(s), protocol specification(s), design tests, sanity tests, detailed composite structure diagrams state machine diagrams, data structure definitions (DD), platform model(s), protocol tests, user code, model code, platform code, protocol code or integration tests.

* * * * *